(12) United States Patent
Ensslin

(10) Patent No.: US 11,427,311 B1
(45) Date of Patent: Aug. 30, 2022

(54) CASTERING WHEEL LANDING SYSTEM FOR UNMANNED AERIAL VEHICLES

(71) Applicant: Meta Platforms, Inc., Menlo Park, CA (US)

(72) Inventor: Oliver Ensslin, Gerlikon (CH)

(73) Assignee: Meta Platforms, Inc., Menlo Park, CA (US)

( * ) Notice: Subject to any disclaimer, the term of this patent is extended or adjusted under 35 U.S.C. 154(b) by 543 days.

(21) Appl. No.: 16/542,124

(22) Filed: Aug. 15, 2019

(51) Int. Cl.
| | | |
|---|---|---|
| *B64C 25/36* | (2006.01) |
| *B64C 25/20* | (2006.01) |
| *B64C 39/02* | (2006.01) |
| *B64C 25/44* | (2006.01) |
| *B64C 25/00* | (2006.01) |
| *B64C 25/16* | (2006.01) |
| *B64C 25/50* | (2006.01) |

(52) U.S. Cl.
CPC ............ *B64C 25/36* (2013.01); *B64C 25/001* (2013.01); *B64C 25/20* (2013.01); *B64C 25/44* (2013.01); *B64C 39/024* (2013.01); *B64C 25/16* (2013.01); *B64C 25/505* (2013.01); *B64C 2201/187* (2013.01)

(58) Field of Classification Search
CPC ....... B64C 25/001; B64C 25/10; B64C 25/16; B64C 25/20; B64C 25/36; B64C 25/44; B64C 25/50
See application file for complete search history.

(56) References Cited

U.S. PATENT DOCUMENTS

| | | | | |
|---|---|---|---|---|
| 2,192,282 A * | 3/1940 | Raymond | ............... | B64C 25/50 244/109 |
| 2,494,482 A * | 1/1950 | Belford | .................... | B64C 25/50 244/50 |
| 2,529,932 A * | 11/1950 | Geisse | .................... | B64C 25/50 244/103 W |
| 2,529,933 A * | 11/1950 | Geisse | .................... | B64C 25/50 244/103 W |
| 4,720,063 A * | 1/1988 | James | .................... | B64C 25/14 244/102 R |
| 5,333,816 A * | 8/1994 | Del Monte | ............ | B64C 25/50 244/50 |
| 2006/0144998 A1 * | 7/2006 | Chicharro Gonzalez | .................... | B64C 25/16 244/102 R |

(Continued)

*Primary Examiner* — Richard R. Green
*Assistant Examiner* — Arfan Y. Sinaki
(74) *Attorney, Agent, or Firm* — Keller Preece PLLC

(57) ABSTRACT

The present disclosure relates to unmanned aerial vehicles ("UAVs"), systems, and methods for efficiently and safely landing while improving flight performance. In particular, the disclosure incudes a light-weight, gravity-fed, self-deploying landing gear assembly that aligns to the direction of the runway upon landing. For example, the landing gear assembly can include a pin switch and a tear-through barrier that releases and deploys the landing gear assembly. Additionally, the landing gear assembly can include castering wheels that rotate (i.e., swivel) while the UAV is in flight. Furthermore, the landing gear assembly can include friction-disks to reduce the rotation of the castering wheels when the landing gear assembly contacts the ground and receives the weight of the UAV. Moreover, the landing gear assembly can detect that the UAV has landed and can signal the UAV to initiate a roll stop mechanism.

18 Claims, 34 Drawing Sheets

(56) References Cited

U.S. PATENT DOCUMENTS

| | | | |
|---|---|---|---|
| 2015/0021434 A1* | 1/2015 | Young | B64C 25/50 244/103 R |
| 2015/0151832 A1* | 6/2015 | Filho | B64C 25/16 244/102 R |
| 2016/0167771 A1* | 6/2016 | Beringer | B60B 33/0065 244/103 R |
| 2020/0354042 A1* | 11/2020 | Schmidt | B64C 25/20 |

* cited by examiner

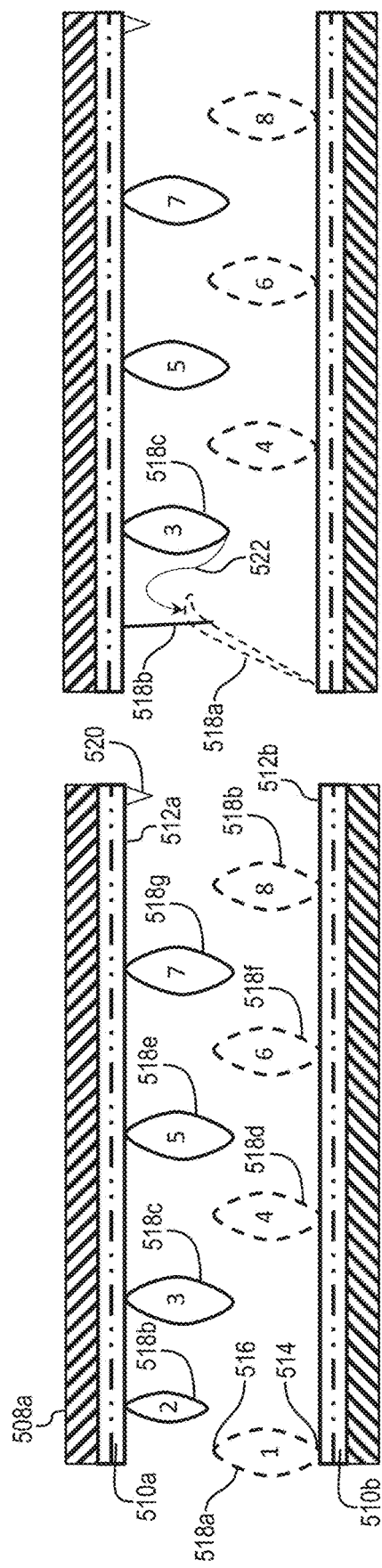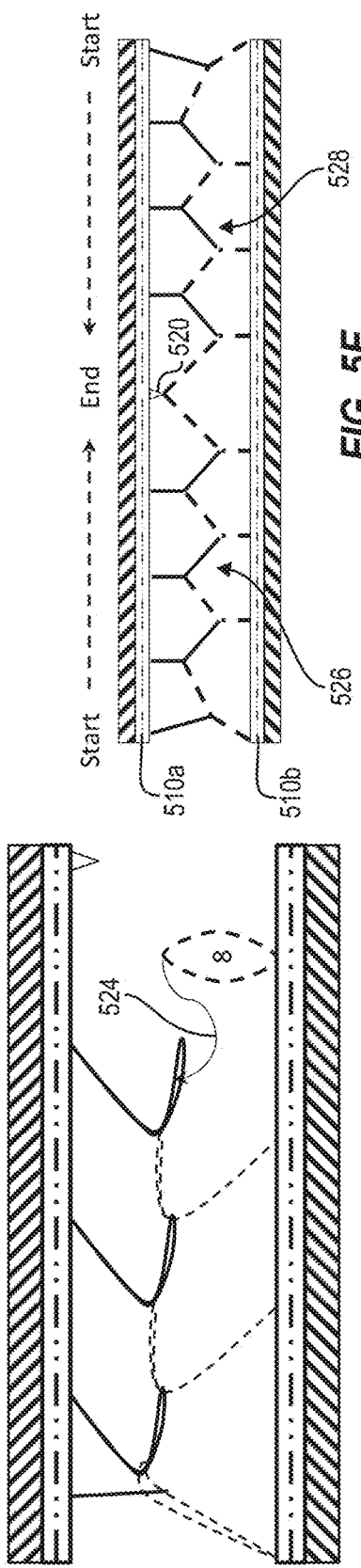

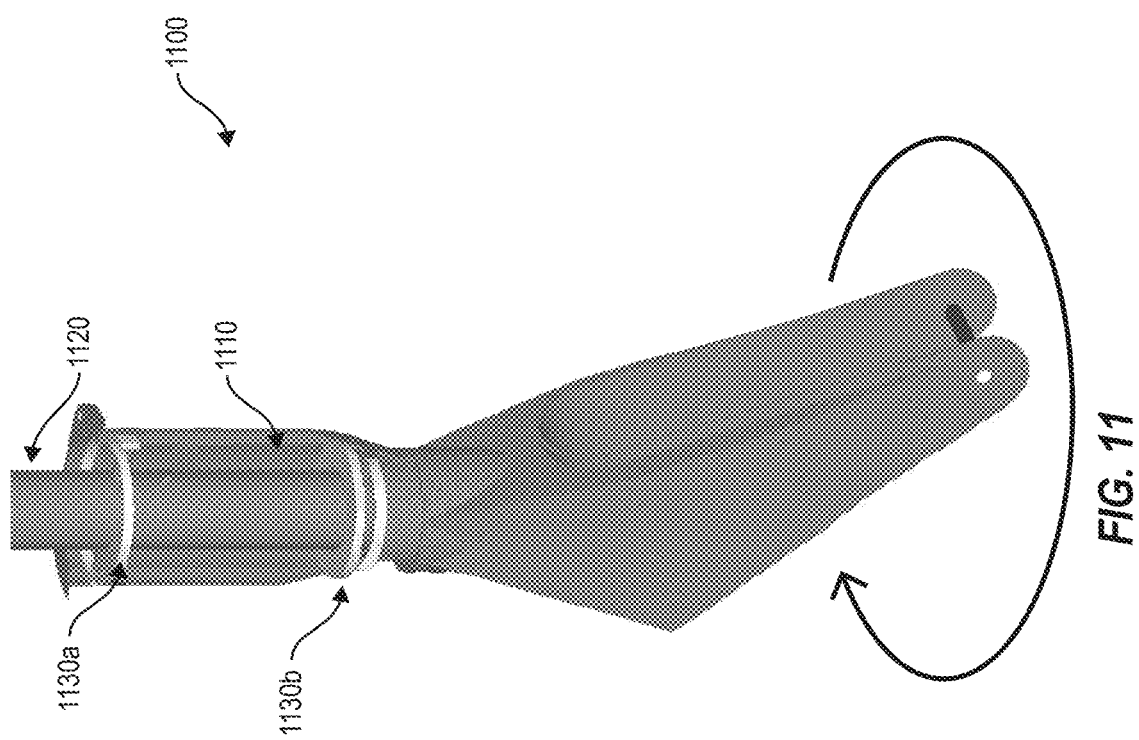

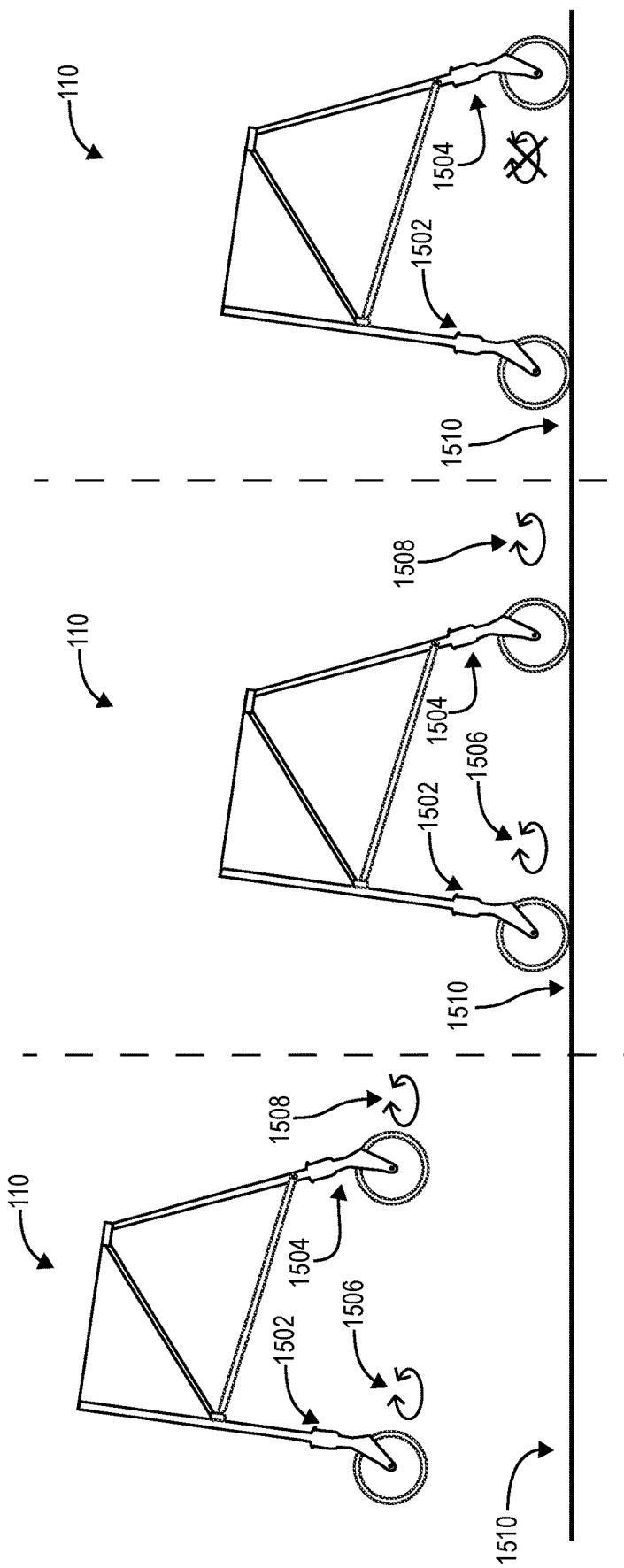

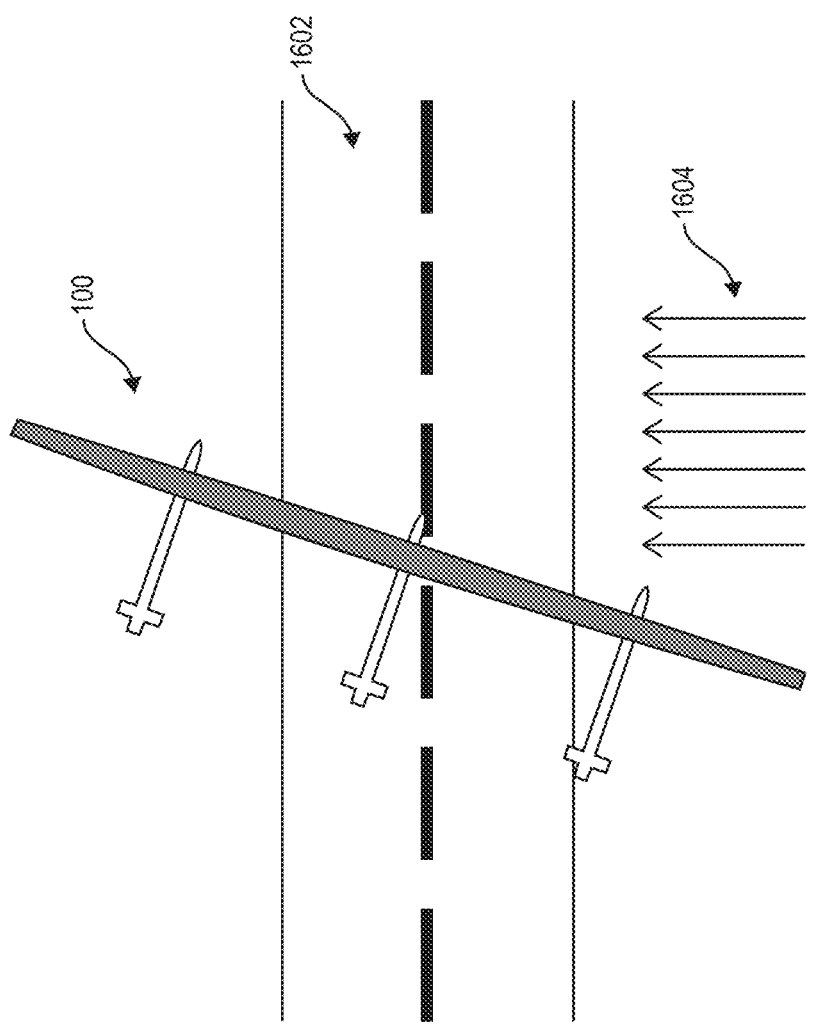

CASTERING WHEEL LANDING SYSTEM FOR UNMANNED AERIAL VEHICLES

BACKGROUND

Engineers have made significant improvements in operability and functionality of high-altitude, long-endurance aerial vehicles. For example, unmanned aerial vehicles (UAVs) can now fly long-distance, high-altitude missions to perform various operations. To illustrate, developers have generated solar-powered, high-altitude, long-endurance aircraft that provide internet connectivity in regions without other viable means of internet access. Solar-powered aircraft offer the capability of staying airborne with the ability to station-keep under gusts for several weeks at a time (or longer).

While developers have made significant advancements in high altitude, long-endurance UAVs, they continue to suffer from a variety of different drawbacks. In particular, the components of conventional UAVs reduce aerodynamic performance and place unnecessary burdens on UAV subsystems. For example, UAVs often implement mechanical components, electrical housing, circuitry, power supplies, computer components and other components that contribute to the overall weight of the UAV. Each additional ounce of weight required for such UAV components reduces the efficiency and flexibility of UAV performance. For example, increased and more complicated components cause UAVs to consume more power and increase the frequency of docking and maintenance.

In addition, reliably landing a UAV is a major consideration in UAV operation. Accordingly, UAV landing systems often include high-weight components. For example, many UAVs include a variety of heavy-weight mechanical and electronic components to deploy landing gear, align and engage landing systems, and ultimately cause a UAV to come to a stop on the ground. These components, when implemented as part of a UAV landing system, contribute substantially to the overall weight and size of the UAV, and reduce UAV efficiency and performance. In addition, conventional landing components contribute to the costs of developing, producing, servicing, and operating the UAV.

These and other problems exist with regard to conventional UAVs.

SUMMARY

One or more embodiments of the present disclosure provide benefits and/or solve one or more of the foregoing problems in the art with UAVs, landing systems, and methods that improve the efficiency and reliability of landing and performing high-altitude, long endurance flight missions. For instance, the present disclosure includes a lightweight and compact landing gear assembly that can self-deploy from a UAV under the force of gravity through a tear-through barrier (e.g., the fuselage fairing or a set of flaps held together by linked loop lacing) to prepare the UAV for landing. Moreover, in one or more embodiments, the landing gear assembly further includes a castering wheel assembly that automatically aligns to the direction of movement during landing to efficiently and safely guide the UAV in landing (even when the UAV itself is flying at an angle to account for cross-winds). Furthermore, the landing gear assembly can also include a multi-disk shimmy reduction and braking system that automatically engages upon detecting a threshold weight to align the wheel to the runway, reduce (or eliminate) wheel shimmy, and slow (or stop) the UAV after landing. The described UAVs, landing systems, and methods can thus safely and efficiently land a UAV while also improving aerodynamic performance during a flight mission by eliminating a variety of high-weight, power-driven components (and thus extend the amount of time the UAV can remain in flight with an onboard energy source).

For example, upon initiation of a landing process, the UAV can release a gravity fed landing gear assembly to cause the landing gear assembly to pivot outwards from the UAV. Additionally, the UAV can include a tear-through barrier on the bottom side of the landing gear assembly housing of the UAV to enable the landing gear assembly to exit the UAV (without the necessity of high-weight, mechanical deployment doors). For example, the UAV can release a landing gear assembly to cause the landing gear assembly to pivot into an open position outside of the housing of the UAV by piercing through a tear-through barrier utilizing a gravitational force of the landing gear assembly.

Moreover, in one or more embodiments, the landing gear assembly includes castering wheels that can rotate while the UAV is in-flight (i.e., airborne) and align the UAV on the runway when the castering wheels contact the ground. In particular, the castering wheel assembly can rotate freely when in flight and then align to the direction of movement of the UAV upon contacting the ground. Thus, even where the UAV is not aligned to the runway (e.g., when landing with a cross-wind), the castering wheel assembly can automatically align to the direction of the runway and movement of the UAV relative to the ground.

Furthermore, in one or more embodiments, the landing gear assembly causes a reduction of rotation in the castering wheels when the castering wheels receive a threshold weight (e.g., the weight of the UAV) upon contacting the ground. For example, in some embodiments, the landing gear assembly includes a multi-disk friction brake system that causes a reduction of rotation in the castering wheels when the multi-disk friction brake system receives a threshold weight. Additionally, the landing gear assembly can include a sensor that causes the UAV to initiate a roll stop mechanism when the sensor receives a threshold weight.

The following description sets forth additional features and advantages of one or more embodiments of the disclosed UAVs, landing systems, and methods. In some cases, such features and advantages will be obvious to a skilled artisan from the description or may be learned by the practice of the disclosed embodiments.

BRIEF DESCRIPTION OF THE DRAWINGS

The detailed description is described with reference to the accompanying drawings, in which:

FIGS. 5A-5J illustrate a bottom view of an example tear-through barrier that is penetrable by a landing gear assembly for a UAV in accordance with one or more embodiments; FIG. 11 illustrates an example wheel fork of a landing gear assembly of a UAV in accordance with one or more embodiments; FIGS. 15A-15C illustrate an example landing gear assembly of a UAV utilizing castering wheels to land the UAV in accordance with one or more embodiments; and FIGS. 16A-16D illustrate an example landing gear assembly of a UAV utilizing castering wheels to correct the alignment of the UAV in accordance with one or more embodiments.

DETAILED DESCRIPTION

Figure 1:
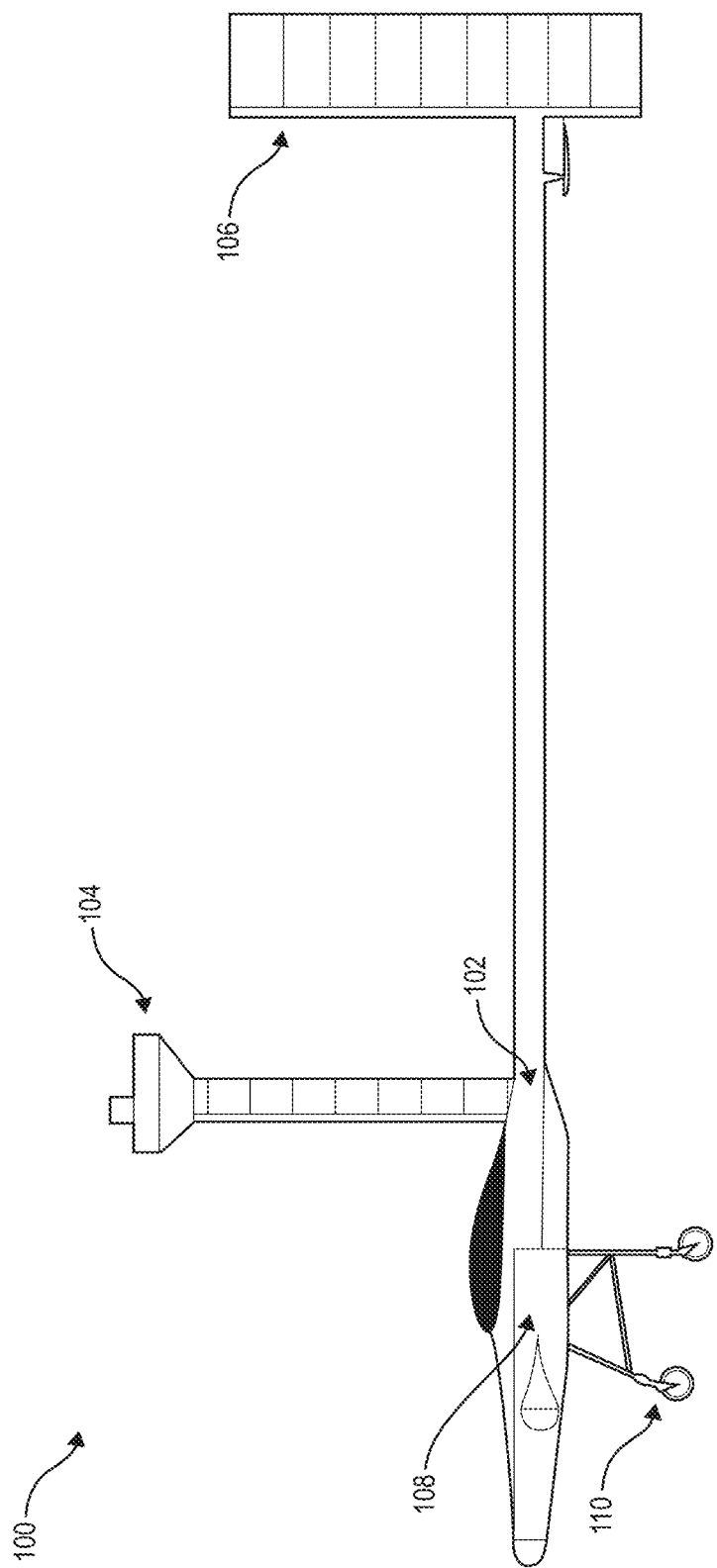
FIG. 1 illustrates an example unmanned aerial vehicle ("UAV") including a landing gear assembly in accordance with one or more embodiments.

One or more embodiments described herein include a UAV, a landing gear system, and/or methods for accurately and efficiently landing a UAV. In particular, in one or more embodiments, the disclosure includes a self-deploying, gravity fed landing gear assembly that deploys through a tear-through barrier on a fuselage of a UAV. Additionally, in one or more embodiments, the landing gear assembly includes castering wheels that align to a runway during landing without the need of complex components for alignment correction of the UAV. In addition, in some embodiments, the landing gear assembly also includes a multi-disk friction brake system that can slow the UAV and reduce and/or lock the rotation of the castering wheels after the UAV is on the ground.

To illustrate, in one or more embodiments, the UAV includes a light weight, single deployment landing gear assembly that is attached to the UAV with one or more hinges and one or more releasable pins and is configured to withdraw from the UAV when the one or more releasable pins are released. Additionally, the UAV can include a tear-through barrier, under a housing where the landing gear assembly is stored, that is capable of opening (or tearing) when the landing gear assembly is deployed. For example, the UAV can release the one or more releasable pins attached to the landing gear assembly to cause the landing gear assembly to drop downwards due to gravity and puncture the tear-through barrier to be positioned outside of the UAV. Indeed, in one or more embodiments, the UAV deploys the landing gear assembly without utilizing powered components that are conventionally used to move a landing gear system and to open a bottom barrier of a housing where the landing gear system is stored.

Furthermore, in some embodiments, the landing gear assembly includes components to assist in landing a UAV even where the UAV is not angularly aligned to a landing surface. In particular, in one or more embodiments, the landing gear assembly includes castering wheels that are configured to rotate relative to the landing gear assembly (i.e., swivel). Moreover, during a landing process, the castering wheels of the landing gear assembly can rotate freely. Additionally, upon contacting the ground, the castering wheels of the landing gear assembly can align towards the direction of movement of the UAV on the runway.

Furthermore, the landing gear assembly can cause the castering wheels to reduce rotation and/or lock when the castering wheels contact the ground and receive a threshold weight (e.g., the weight of the UAV). For example, in some embodiments, the landing gear assembly includes a multi-disk friction brake system that does not utilize powered components to reduce the rotational movement of the castering wheels. For instance, upon receiving the threshold weight when the castering wheels contact the ground, disks that are coupled to a wheel fork of a castering wheel that rotates relative to a strut of the landing gear assembly can press together with disks that are coupled to the strut to cause a friction (i.e., an anti-shimmy torque) that reduces rotation of the wheel fork of the castering wheel relative to the strut of landing gear assembly. Indeed, the disks of the of the wheel fork and the disks of the strut, when pressed together, can reduce the rotation of the castering wheel in relation to the strut. Moreover, the reduction in the rotation of the castering wheel in relation to the strut can prevent shimmy in the landing gear assembly when the UAV lands.

Additionally, the landing gear assembly can include a weight-on-wheel sensor that initiates a roll stop mechanism for the UAV when the UAV contacts the ground. For example, in some embodiments, the weight-on-wheel sensor can trigger when the UAV is in contact with the ground by causing a threshold weight to press a switch on the weight-on-wheel sensor. Indeed, when the weight-on-wheel sensor is triggered, the weight-on-wheel sensor can send a signal to the UAV to initiate a roll stop mechanism. For instance, in one or more embodiments, the UAV initiates a roll stop mechanism by operating one or more propellers of the UAV in reverse to slow down the UAV when the UAV is on the runway.

In one or more embodiments, the described lightweight and compact landing gear assembly can assist in safely and reliably landing a UAV while also improving efficiency and flight performance of the UAV. Indeed, the described landing gear assembly can reduce the number and weight of components, both mechanical and electrical, relative to conventional systems. For instance, in one or more embodiments, the landing gear assembly removes the need for components for opening a bay door, components for mechanically lowering landing gear, components for aligning a wheel assembly, components for mechanically applying a brake to landing gear, or components for initiating a braking mechanism. Accordingly, the landing gear assembly can reduce the overall weight of the UAV, enabling the UAV to reduce consumption of energy and increase flight range and time. Thus, a UAV equipped with the landing gear assembly can also reduce the need to land and dock for recharging and/or refueling compared to conventional UAVs.

As used herein, the term "unmanned aerial vehicle" (sometimes referred to as a "UAV") refers to an aircraft that can be operated remotely or autonomously. In particular, the term "unmanned aerial vehicle" refers to an aircraft that can be operated remotely or autonomously through onboard computers without the physical presence of a person onboard the aircraft. For example, a UAV is a remote or autonomous aircraft that can be used for multiple purposes (e.g., surveillance, weather monitoring, providing digital communication services such as internet connectivity to regions, aerial research, agriculture, military, etc.). In one or more embodiments, the UAV is a multi-fuselage aerial vehicle that includes a wing that spans the multiple fuselages, solar panels, one or more batteries, a landing gear assembly for each fuselage, various electronic components, or various sensors or receivers for flight control and monitoring and/or conducting another purpose. The UAV can also include a computing device that allows the UAV to operate various aspects of a flight mission such as, but not limited to, taking off, flying, conducting the purpose of the UAV, and landing.

As used herein, the term "landing gear assembly" refers to mechanical and/or electronic components configured to assist in landing a UAV. In particular, the term "landing gear assembly" refers to mechanical and/or electronic components such as, but not limited to, one or more wheels, one or more wheel forks, one or more struts, one or more pins, one or more hinges, one or more disks, and one or more sensors assembled to assist in landing the UAV.

As used herein, the term "landing gear pin" (sometimes referred to as "pin") refers to a mechanical apparatus that engages the landing gear assembly to the UAV. In particular, the term "landing gear pin" can include a removable mechanical apparatus that can engage (or secure) the landing gear assembly to the UAV and can partially disengage the landing gear assembly from the UAV when removed. For example, the landing gear pin can include mechanical apparatuses such as, but not limited to, a locking pin, a hook, a bolt, a rod, a wire, a cable, a clip, or other fasteners or inserts.

As used herein, the term "pin switch" (sometimes referred to as an "electronic pin switch" or "landing gear pin puller") refers to an apparatus that partially engages and/or disengages a landing gear assembly from a UAV. In particular, the term "pin switch" can include a mechanical and/or electronic apparatus, coupled to the UAV or the landing gear assembly, that removes one or more landing gear pin connections to partially disengage a landing gear assembly from a UAV. For example, the pin switch can include mechanical and/or electronic apparatuses such as, but not limited to, a moveable latch, a moveable puller, a moveable hook, an adjustable socket, or other components enabled to receive and hold a landing gear pin.

As used herein, the term "tear-through barrier" (sometimes referred to as a "barrier") refers to a penetrable surface of a UAV. In particular, the term "tear-through barrier" can include a penetrable surface of a UAV (e.g., a fuselage fairing) that can be penetrated and/or punctured by a landing gear assembly. For example, a tear-through barrier can include materials such as, but not limited to, fabrics (i.e., cotton, polyester, nylon, etc.), foam, fiberglass, plastic, and/or foil. In one or more embodiments, the tear-through barrier covers the bottom portion of the fuselage of a UAV and is capable of opening (i.e., rupturing) when the barrier receives a puncture threshold weight (e.g., the weight of the landing gear assembly). In some embodiments, the tear-through barrier includes perforations in the material to enable the tear-through barrier to open and/or tear. Additionally, in one or more embodiments, the tear-through barrier includes resealable materials. For example, in some embodiments, the tear-through barrier includes two or more separate portions (e.g., flaps and/or panels) that are connected by a sealing material (e.g., a resealable material).

Moreover, as used herein, the term "resealable material" refers to a penetrable material that can seal after opening. For example, resealable materials can include a tear-through barrier having two or more separate portions connected together by a sealing material such as, but not limited to, adhesive or Velcro. Furthermore, resealable materials can include materials that are pliable. For example, resealable materials can include a material that can bend to an open position from a puncture threshold weight (e.g., the weight of the landing gear assembly) and can also bend back to a closed position. Moreover, resealable materials can include a linked loop harness (or linked loop lacing) that secures two or more separate portions of the tear-through barrier together and enables the two or more separate portions of the tear-through barrier to open.

As used herein, the term "threshold weight" refers to a force tolerance acting on an object as a measure of mass (i.e., a downward force). In one or more embodiments, threshold weight can include to a weight of individual and/or combined components of a UAV. For example, in some embodiments, a threshold weight includes a weight of a UAV. Furthermore, in one or more embodiments, threshold weight refers to a weight of the landing gear assembly. Indeed, a threshold weight can include any percentage of weight of a UAV and/or one or more components of the UAV (e.g., 90% of the weight of the UAV, 70% of the weight of the UAV, and/or 80% of the weight of a landing gear assembly).

As used herein, the term "housing" refers to a portion of a UAV with an enclosed space. In particular, the term "housing" includes a portion of a UAV enclosing a space where components are stored. For example, the housing can surround a cavity and/or space within the fuselage that the landing gear assembly occupies.

Furthermore, as used herein, the term "fuselage" refers to a main body of the UAV. In particular, the term "fuselage" refers to a main body section of the UAV that holds components of the UAV and supports a wing structure of the UAV. For example, the fuselage can hold components such as, but not limited to, a battery, the landing gear assembly, one or more computing devices.

As used herein, the term "wheel stop" refers to an apparatus or mechanism that keeps one or more wheels stationary. In particular, the term "wheel stop" can include an apparatus that attaches (or secures) a wheel to the UAV to keep a castering wheel stationary (i.e., prevents the castering wheel from freely rotating). For instance, the wheel stop can include an apparatus such as, but not limited to, a releasable clip, a releasable fastener, or a slot. In one or more embodiments, the wheel stop attaches the castering wheel to the UAV (e.g., the fuselage of the UAV) to prevent movement of the castering wheel when the landing gear assembly is positioned within a housing of the UAV. Moreover, in some embodiments, the wheel stop can self-release when the landing gear assembly is not held in the housing (e.g., after release of the landing gear pins). Indeed, the wheel stop can include a clip having a hold strength that fails to hold the castering wheel when the landing gear assembly releases (i.e., when the weight of the landing gear assembly is acting against the hold strength of the wheel stop).

As used herein, the term "dampener" refers to an apparatus that resists and/or slows down a moving object. In particular, the term "dampener" can include an apparatus that counteracts the force of a moving object to slow down the moving object. For example, a dampener can include apparatuses such as, but not limited to, a hydraulic brake, a spring, or a restraining band. Furthermore, the dampener can include an air viscous regulator. Indeed, in one or more embodiments, the dampener attaches between the landing gear assembly and a housing of the UAV to counteract the force of gravity when the landing gear assembly is released and pivots (or rotates) downward. Indeed, the dampener can reduce the velocity and/or acceleration at which the landing gear assembly deploys by acting against the gravitational forces acting on the landing gear assembly.

As used herein, the term "hydraulic brake" refers to an apparatus that utilizes compressed air and/or fluid mechanics to resist and/or slow down a moving object. In particular, the term "hydraulic brake" can include an apparatus that counteracts the force of a moving object by utilizing compressed air and/or fluid mechanics to slow down the moving object. For example, in one or more embodiments, a hydraulic brake can include a cylinder and a piston rod positioned partially within the cylinder such that the piston rod moves into the cylinder at an increased resistance because of air compression and/or fluid mechanics.

As used herein, the term "castering wheel" refers to a wheel assembly that utilizes a mechanism to enable the wheel to rotate relative to a steering axis of the wheel. In particular, the term "castering wheel" can include a wheel assembly that utilizes a mechanism that attaches to a wheel and pivots to enable the wheel to rotate and/or swivel relative to a steering axis (i.e., a vertical axis) of the wheel. For instance, in one or more embodiments, a castering wheel can include a wheel that is connected to a wheel fork that can engage other components to create a rotational joint. The castering wheel can include apparatuses such as, but not limited to, a wheel fork, a bearing, a ball joint, or a swivel. Indeed, in one or more embodiments, a wheel fork engages a strut by encompassing the strut and rotates relative to the strut to create a castering wheel.

As used herein, the term "disk" (sometimes referred to as a "friction-disk" or a "shim") refers to a flat circular object. For example, a disk can include objects such as, but not limited to, a shim, a rotor, and/or a ring. Furthermore, a disk can include materials such as, but not limited to, tempered steel (i.e., spring-temper 301 CRES steel), other metals, rubber, and/or plastic. In one or more embodiments, a disk includes notches and/or protrusions on the inside and/or outside of the disk to enable the disk to engage other objects. Furthermore, in some embodiments, the disk includes a hollow center to enable the disk to encircle other objects.

As used herein, the term "strut" refers to a member (e.g., a bar or rod) forming a part of a structure. In particular, as used herein, the term "strut" can include a bar or rod and other components that engages a wheel fork, connects to other strut members, and attaches to a fuselage of a UAV to form a structural part of the landing gear assembly. The strut includes materials such as, but not limited to, steel, aluminum, or carbon (or carbon fiber).

As used herein, the term "wheel fork" refers to an apparatus that holds a wheel on one portion of the apparatus and engages other objects on another portion of the apparatus. In particular, the term "wheel fork" refers to an apparatus that includes an axle connection for a wheel on one end of the apparatus and includes a hollow section to engage other objects on another portion of the apparatus. For example, in one or more embodiments, the wheel fork can hold a wheel through an axle to enable the wheel to rotate relative to the axle and can engage a strut on a hollow portion of the wheel fork. The wheel fork can include materials such as, but not limited to, steel or carbon.

As used herein, the term "compression member" (sometimes referred to as a "crushing member") refers to an apparatus that compresses upon receiving a force. In particular, the term "compression member" can include a hollow cylindrical apparatus positioned between a strut and a wheel fork that compresses upon receiving a force to enable a wheel fork to move vertically relative a strut. For example, a compression member can include apparatuses such as, but not limited to, springs, foam, compressible metals, compressible plastics, or telescopic metals and/or plastics. In some embodiments, the compression member can be fabricated using a metal (or metal alloy) honeycomb structure (e.g., a low density, aluminum honeycomb structure that can absorb a significant amount of energy and has minimal spring back).

As used herein, the term "weight-on-wheel sensor" (sometimes referred to as a "weight-on-wheel switch") refers to a mechanism that can detect that a UAV has landed and initiate stopping mechanism for the UAV. In particular, the term "weight-on-wheel sensor" can include a mechanism that detects that a landing gear assembly of a UAV has received a threshold weight (e.g., the weight of the UAV) and, in response, sends a signal to the UAV to initiate a roll stop mechanism. Indeed, in one or more embodiments, the weight-on-wheel sensor can send a signal through means such as, but not limited to, radio, wire, Bluetooth, or Wi-Fi. Additionally, the weight-on-wheel sensor can include a mechanical micro switch.

As used herein, the term "spring element" refers to an apparatus that compresses upon receiving a force. In particular, the term "spring element" refers to an apparatus that compresses upon receiving a force to prevent accidental activation of the weight-on-wheel sensor (e.g., to prevent accidental initiation of the roll stop mechanism). For example, the spring element can compress when the complete weight of the UAV is exerted on the spring element. Additionally, the spring element can create a barrier between the weight-on-wheel sensor pin and the weight-on-wheel switch (i.e., enabling the weight-on-wheel pin to activate the weight-on-wheel switch only upon compression of the spring element). Moreover, the spring element can include a wave spring.

As used herein, the term "roll stop mechanism" refers to an apparatus or process to stop a UAV. In particular, the term "roll stop mechanism" can include actions taken by a UAV to bring the UAV to a stop after the UAV contacts the ground. For example, a roll stop mechanism can include operating propellers in reverse to slow down the UAV, applying brakes on the wheels of a UAV to slow down the UAV, raising wing flaps to slow down the UAV, or deploying parachutes to slow down a UAV. In one or more embodiments, upon receiving a signal from the weight-on-wheel sensor, the roll stop mechanism operates propellers in reverse to counteract the momentum of the UAV on the runway until the UAV slows down to a stop.

Additional detail will now be given in relation to illustrative figures portraying exemplary embodiments. To aid in description of the landing gear assembly and methods of utilizing the landing gear assembly to land a UAV, an overview of an unmanned aerial vehicle and a flight mission are first described with reference to FIGS. 1-3. One will appreciate that the configuration of the UAV and the flight mission are exemplary embodiments and the later described landing gear assembly can operate with a variety of UAVs, flight missions, and UAV landing systems.

As just mentioned, the landing gear assembly is capable of self-deployment from a UAV and is capable of correcting alignment of the UAV on a runway by utilizing gravity. For example, FIG. 1 illustrates an exemplary side view embodiment of a UAV 100 with the landing gear assembly. As shown in FIG. 1, the exemplary embodiment of the UAV 100 includes a fuselage 102, a payload mast 104, a tail wing 106, a landing gear housing 108, and a landing gear assembly 110.

As shown in FIG. 1, the main structure of the UAV 100 includes the fuselage 102. The fuselage 102 supports a wing structure of the UAV, the payload mast 104, and the tail wing 106. Furthermore, the fuselage 102 holds the landing gear assembly 110 in the housing 108. Additionally, the fuselage 102 can also hold other components such as a battery, computing devices, circuitry, and other mechanisms. Indeed, the fuselage 102 can include computing devices to remotely and/or autonomously pilot the UAV.

Furthermore, as illustrated in FIG. 1, the fuselage 102 attaches to and supports the payload mast 104. In one or more embodiments, the payload mast 104 can hold components for a flight purpose such as, but not limited to, weather monitoring or providing digital communication services. For instance, the payload mast 104 can include sensors, radar, cameras, communication equipment, and other equipment to conduct the purpose of the UAV flight.

Moreover, as shown in FIG. 1, the fuselage 102 also attaches to and supports the tail wing 106. Indeed, in one or more embodiments, the tail wing 106 provides stability and control to the UAV 100 during flight. For instance, the tail wing 106 can assist the UAV 100 in adjusting for changes in position when there is a change in speed, altitude, and/or weight of the UAV 100.

Furthermore, as illustrated in FIG. 1, the fuselage 102 also attaches the landing gear assembly 110 to the bottom side of the fuselage 102. Indeed, in FIG. 1, the landing gear assembly 110 is shown in an open position outside of the housing 108. For example, the landing gear assembly 110 attaches to the top of the housing 108 which is a part of the fuselage 102. The landing gear assembly 110 is discussed in greater detail in the figures below.

Figure 2:
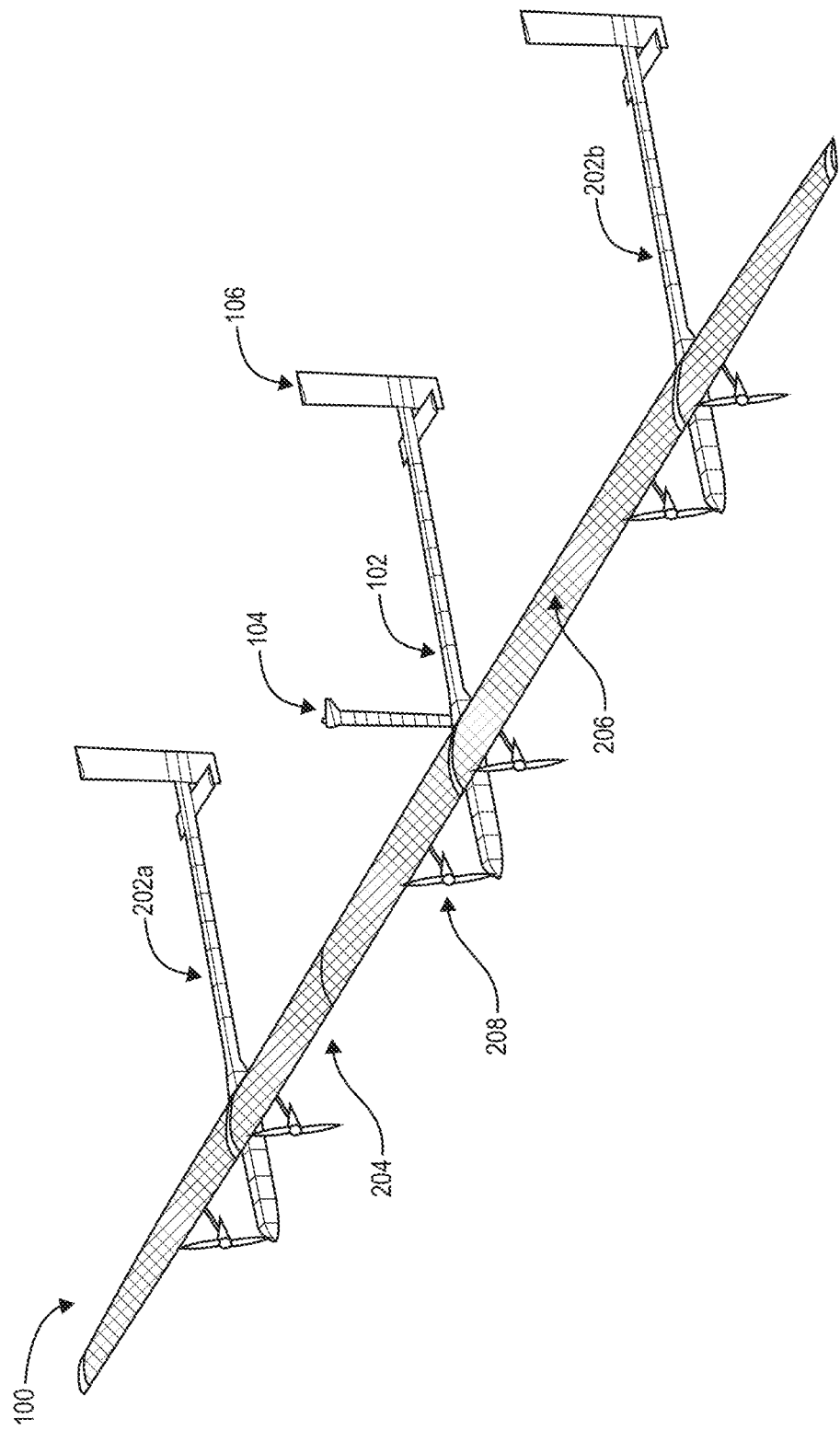
FIG. 2 illustrates an example UAV including three fuselages in accordance with one or more embodiments.

As just mentioned, a UAV can be a multi-fuselage aerial vehicle that includes a wing that spans the multiple fuselages. For instance, as illustrated in FIG. 2, the UAV 100 is a multi-fuselage aerial vehicle. Indeed, as shown in FIG. 2, the UAV 100 includes two additional fuselages 202a and 202b and a wing assembly 204 that spans across the three fuselages 102 and 202a-202b to connect the fuselages 102 and 202a-202b. Furthermore, as shown in FIG. 2, the wing assembly 204 includes the solar panels 206 and the one or more propellers 208.

In one or more embodiments, the two additional fuselages 202a and 202b of the UAV 100 also hold a landing gear assembly. Indeed, the multi-fuselage UAV 100 can deploy a landing gear assembly from all three fuselages (or from only a single fuselage, such as the fuselage 102). Additionally, the multi-fuselage UAV 100 can also hold additional components such as computing devices, batteries, and or electrical and/or mechanical mechanisms to operate the UAV 100 in the additional fuselages 202a and 202b.

As just mentioned, a UAV can be, remotely or autonomously, used for multiple purposes. Indeed, a UAV can be a high altitude, long-endurance aerial vehicle used for purposes such as, but not limited to, providing digital communication services. Moreover, a flight mission for a UAV can include taking off, conducting the purpose of the UAV in flight, and landing. For example, FIG. 3 illustrates the UAV 100 in flight and providing internet connectivity to a region without other viable means of internet access.

Figure 3:
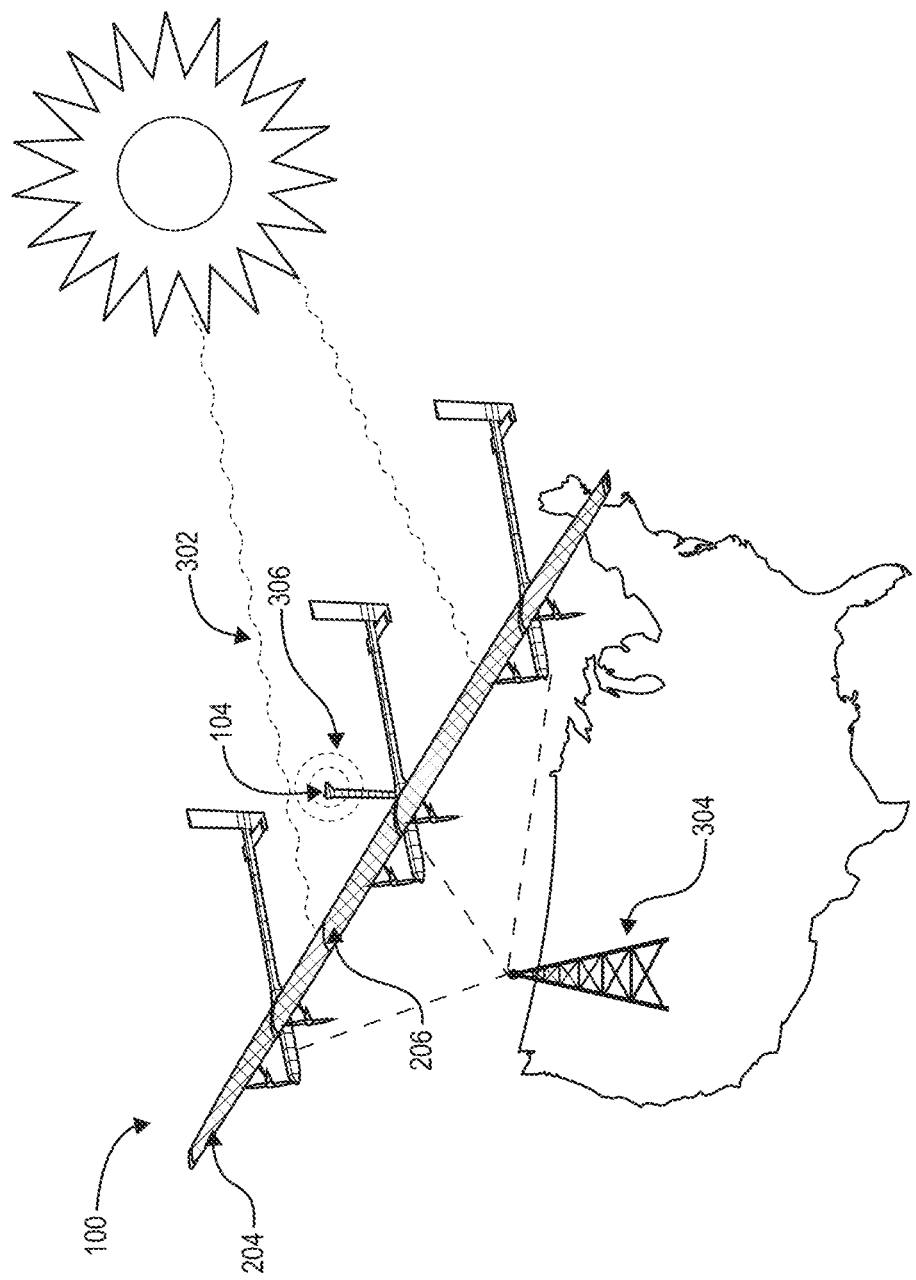
FIG. 3 illustrates an example environment in which a UAV operates in accordance with one or more embodiments.

Indeed, as shown in FIG. 3, the UAV 100 conducts a long-term flight mission above a determined region and provides internet connectivity to the region through communication components in the payload mast 104 of the UAV 100. In some embodiments, the UAV 100 can stay inflight over a region for a prolonged amount of time, such as three months, to provide internet connectivity to a region through communication components in the payload mast 104 before having to land to refuel and/or recharge the energy source of the UAV. For example, as shown in FIG. 3, the UAV 100 can connect to a communication source 304 and provide internet connectivity to a region by emitting an internet signal 306 from the payload mast 104 over the region.

In one or more embodiments, the UAV 100 can remain in flight for prolonged periods of time by utilizing rechargeable batteries to operate the UAV and the components of the UAV. Indeed, the UAV can, while in flight, provide energy to the batteries of the UAV by utilizing solar panels. For example, as shown in FIG. 3, the UAV 100 includes solar panels 206 on the wing assembly 204 of the UAV 100. Furthermore, the solar panels 206 generate energy from solar rays 302 in order to recharge batteries onboard the UAV 100. Indeed, in some embodiments, the solar panels 206 can continue to recharge the batteries onboard the UAV 100 until the batteries deplete of energy at a rate that is faster than the rate at which the solar panels recharge the batteries on the UAV 100 (i.e., the batteries are diminishing due to a large number of power cycles). In some embodiments, an increase in weight of the UAV 100 causes the UAV 100 to utilize more energy to remain in flight and depletes the onboard batteries at a faster rate. Thus, the UAV 100 can remain in flight for longer periods of time when the UAV 100 weighs less. Indeed, in one or more embodiments, the UAV 100 lands to recharge or replace batteries when the batteries are diminishing and when the UAV 100 can no longer sustain flight on solar energy.

Figure 4:
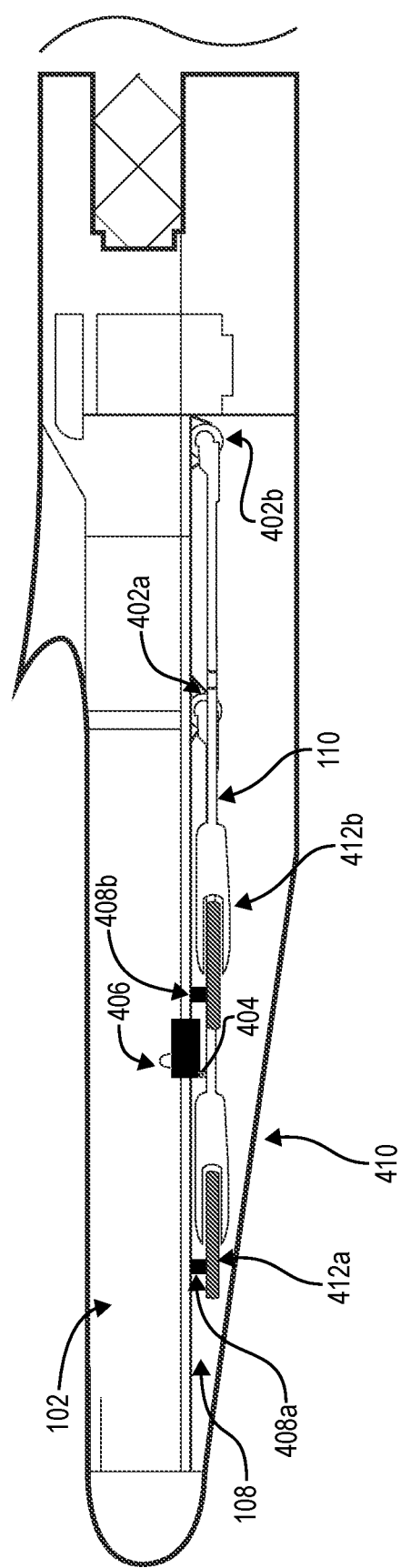
FIG. 4 illustrates an example landing gear assembly housed within a fuselage of a UAV in accordance with one or more embodiments.

As just mentioned, the UAV 100 can utilize a lightweight and compact landing gear assembly that self deploys from the UAV 100 and aligns to a runway during a landing process. In one or more embodiments, a landing gear assembly can be positioned within a housing of the UAV 100. For example, as illustrated in FIG. 4, the landing gear assembly 110 is positioned within the housing 108 of the fuselage 102. Indeed, in some embodiments, the landing gear assembly 110 occupies less space in the fuselage than some conventional landing gear systems.

As mentioned, the UAV 100 can store the landing gear assembly 110 inside the housing 108 of the fuselage 102. Indeed, in one or more embodiments, the landing gear assembly 110 can fold to occupy the space within the housing 108. For example, as shown in FIG. 4, the landing gear assembly 110 pivots (or rotates) along hinges 402a and 402b to fold into the housing 108. Moreover, the landing gear assembly 110 can also include other joints that enable the landing gear assembly 110 to fold into the housing 108.

Furthermore, the landing gear assembly 110 is encompassed by the housing 108 of the fuselage 102 and a barrier 410 on the bottom side of the fuselage 102. Indeed, in some embodiments, the housing 108 of the fuselage 102 can be sized to fit the landing gear assembly 110 without any other major components because the landing gear assembly 110 utilizes gravity to self-deploy and align to the runway utilizing gravity, instead of utilizing power-driven components that occupy more space in the housing 108. In one or more embodiments, the barrier 410 is a tear-through barrier that does not utilize power-driven components (that occupy more space in the housing 108) to open the barrier 410 when deploying the landing gear assembly 110.

Furthermore, the landing gear assembly 110 can remain in a closed position within the housing 108 by utilizing a landing gear pin, an electronic pin switch, and hinges. For example, as shown in FIG. 4, the landing gear assembly 110 attaches to the hinges 402a and 402b and to a landing gear pin 404 through an electronic pin switch 406 to keep the landing gear assembly 110 inside the housing 108. In one or more embodiments, the landing gear pin 404 can be released to cause the landing gear assembly 110 to deploy as discussed in greater detail in the figures below. Moreover, in one or more embodiments, the landing gear assembly 110 can be held inside the housing 108 with any number of hinges, landing gear pins, and electronic pin switches.

Additionally, the wheels of the landing gear assembly 110 can be rotated to the side in order to fit within the housing 108. As shown in FIG. 4, the wheels 412a and 412b are rotated (e.g., in relation to a longitudinal axis of one or more structural members of the landing gear assembly 110) to a horizontal position in order to fit within the housing 108. Furthermore, as illustrated in FIG. 4, the wheels 412a and 412b connect to wheel stops 408a and 408b to prevent (or prohibit) the wheels from rotating out of the horizontal position before the landing gear assembly is deployed. Indeed, the wheel stops 408a and 408b hold the wheels 412a and 412b and can release the wheels 412a and 412b from the wheel stops 408a and 408b when the landing gear assembly 110 deploys. Although the one or more embodiments herein describe the landing gear assembly 110 having wheels, the landing gear assembly 110 can include other ground contact structures such as skids or skies (e.g., for snow and ice), floats (for water), or a combination thereof (e.g., a wheel combined with a skid of a float).

Figure 5A:
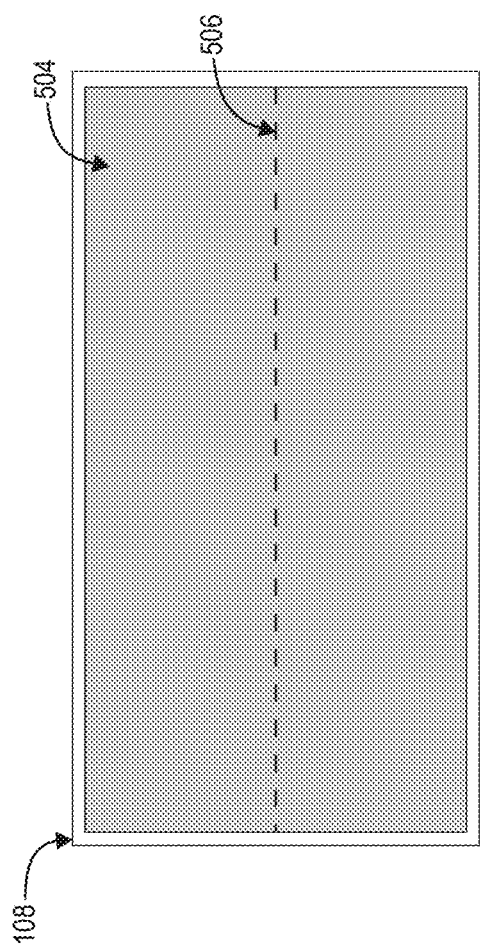
Figure 5B:
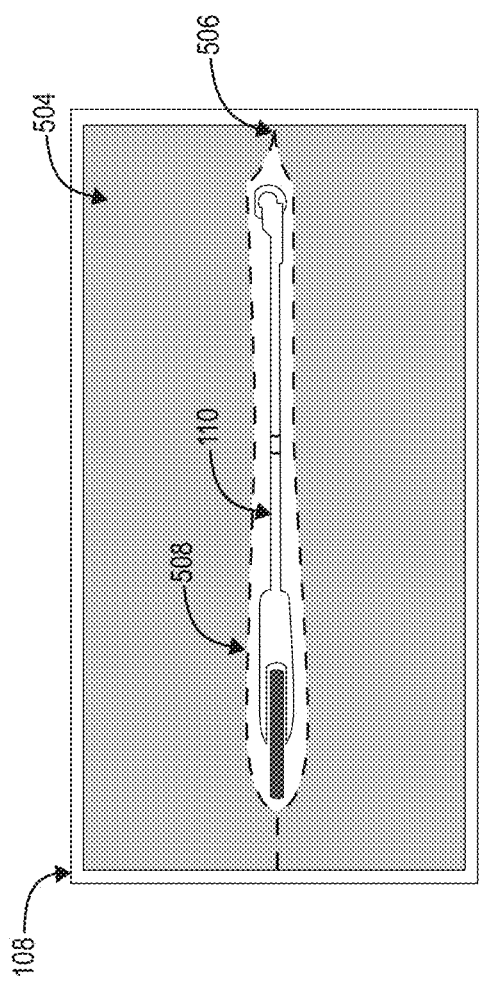

As just mentioned, the UAV can deploy the landing gear assembly through a tear-through barrier. For example, FIGS. 5A and 5B illustrate the tear-through barrier from a bottom view. Indeed, as shown in FIGS. 5A and 5B, the landing gear assembly 110 can self-deploy by puncturing and/or rupturing the tear-through barrier (e.g., by protruding the tear-through barrier). In one or more embodiments, the UAV 100 can deploy the landing gear assembly 110 and enable the landing gear assembly 110 to leave the fuselage 102 without having to utilize power-driven components to open the barrier under the fuselage to allow the landing gear assembly 110 to leave the fuselage 102.

More specifically, FIG. 5A illustrates a tear-through barrier in a closed state prior to the deployment of a landing gear assembly. For example, as shown in FIG. 5A, the bottom of the housing 108 of the UAV 100 includes a tear-through barrier 504. In one or more embodiments, the tear-through barrier 504 remains in a closed position until the landing gear assembly deploys. Furthermore, in some embodiments, the tear-through barrier 504 does not utilize other mechanisms to remain in a closed position.

Additionally, in some embodiments, the tear-through barrier can utilize alterations to the material of the tear-through barrier to enable the tear-through barrier to open when a landing gear assembly deploys. For example, as shown in FIG. 5A, the tear-through barrier 504 includes perforations 506 to enable the tear-through barrier to open when the landing gear assembly deploys. In one or more embodiments, the perforations 506 create a weak point in the tear-through barrier 504 to ensure that the landing gear assembly 110 can puncture the tear-through barrier 504 upon deployment.

Furthermore, FIG. 5B illustrates a tear-through barrier in an opened state when a landing gear assembly is deployed by the UAV 100. For example, as shown in FIG. 5B, the tear-through barrier 504 on the bottom of the housing 108 of the UAV 100 opens as the landing gear assembly 110 deploys. Indeed, as illustrated in FIG. 5B, the tear-through barrier 504 opens along the perforations 506 to create a barrier opening 508 when the landing gear assembly 110 contacts the tear-through barrier 504. Moreover, in one or more embodiments, the tear-through barrier 504 can open along the perforations 506 to create a barrier opening 508 that is wide enough to allow the landing gear assembly 110 to exit the housing 108.

Indeed, in one or more embodiments, the tear-through barrier 504 is constructed to open along the perforations 506 when a threshold amount of weight (e.g., the weight of the landing gear assembly 110) is applied to the tear-through barrier 504. For example, in one or more embodiments, the tear-through barrier 504 is constructed to open along the perforations 506 when the tear-through barrier is subjected to the threshold weight. Indeed, as mentioned above, the tear-through barrier 504 can include any material that is capable of opening upon receiving the threshold weight.

Furthermore, in one or more embodiments, after landing the UAV 100 and retracting the landing gear assembly 110, a tear-through barrier 504 can be resealed. For instance, the tear-through barrier 504 can be resealed by a maintenance crew after landing the UAV 100. In particular, the tear-through barrier 504 can be resealed along the perforations 506 after landing the UAV 100. As mentioned above, the tear-through barrier 504 can include a resealable material (e.g., Velcro or adhesive). For example, in one or more embodiments, the two portions of the tear-through barrier 504 in FIG. 5B can be attached at the perforations 506 by pressing the tear-through barrier 504 together along the perforations 506 to activate the resealable property of the resealable material of the tear-through barrier 504.

In addition to the tear-through barrier described in FIGS. 5A and 5B, FIGS. 5C-5J describe a tear-through barrier with two or more portions (e.g., flaps or panels) that are secured together utilizing a linked loop harness mechanism as the resealable material. As shown in FIG. 5C, the tear-through barrier can include a fixed edge 508a and a fixed edge 508b, each attached to one or more components of the UAV 100 (e.g., attached to the housing 108 of the UAV 100). Moreover, the fixed edge 508a corresponds to tear-through barrier portion 510a and the fixed edge 508b corresponds to tear-through barrier portion 510b. In one or more embodiments, attaching the fixed edge 508a and the fixed edge 508b to the one or more components of the UAV 100 enables the tear-through barrier portion 510a and the tear-through barrier portion 510b to pivot open to open the bottom of the housing 108 of the UAV 100. Additionally, as illustrated in FIG. 5C, the tear-through barrier portion 510a includes a free edge 512a and the tear-through barrier portion 510b includes a free edge 512b. In one or more embodiments, the free edge 512a and the free edge 512b can be secured to one another (e.g., to close the bottom of the housing 108) via a resealable material such as a linked loop harness mechanism. In some embodiments, the linked loop harness mechanism is covered with a sealing lip to prevent air interaction during flight of the UAV 100.

For instance, FIGS. 5C-5F illustrate a process for securing two portions of a tear-through barrier utilizing an ultralight linked loop harness mechanism (or lacing) as the resealable material. As illustrated in FIG. 5C, each of the two portions of the tear-through barrier (e.g., tear-through barrier portion 510a and tear-through barrier portion 510b) include a plurality of loops (e.g., loops 518a-518h). For instance, as shown in FIG. 5C, the tear-through barrier portion 510a includes loop (2) 518b, loop (3) 518c, loop (5) 518e, and loop (7) 518g attached to the free edge 512a. Furthermore, as illustrated in FIG. 5C, the tear-through barrier portion 510b includes loop (1) 518a, loop (4) 518d, loop (6) 518f, and loop (8) 518h attached to the free edge 512b. Each of the loops 518a-518h include an attached end 514 and a loose end 516. Indeed, the plurality of loops are capable of combining multiple seams (e.g., seams that form a seal between the tear-through barrier portion 510a and the tear-through barrier portion 510b) in one release action.

In one or more embodiments, the loops 518a-518h may be fabricated from materials such as, but not limited to, polypropylene, manila, nylon, para-aramid synthetic fibers (e.g., Kevlar™), and/or polyester. Additionally, the loops 518a-518h may be fabricated utilizing a single strand and/or multiple strands that are twisted and/or braided together into a larger and strong form (e.g., a rope). For example, a single-strand or multi-strand string may be shaped to form a circular and/or oval loop that defines an opening and is tied at its distal ends (i.e., the free ends) to each other and/or the free edges 512. Furthermore, the diameter of the loops 518a-518h may be of any diameter. In addition, the tear-through barrier portion 510a and/or the tear-through barrier portion 510b can include any number of attached loops. In some embodiments, the ratio of the distance between the two or more tear-through barrier portions and the linked harness loop seal created by the loops is kept similar.

Furthermore, to reinforce the free edges 512 of the tear-through barrier portions 510, each of the free edges 512 may be folded upon itself (e.g., along the perimeter) and sewn together (e.g., hemmed). Therefore, as illustrated, the free edges 512 may include thicker and/or reinforced edges to mitigate rips and tears to the tear-through barrier portions caused by the attached end of the loops. Moreover, the thicker and/or reinforced edges can also distribute the point load of the seal created by the linked loop harness mechanism. Additionally, metal eyelets or buttons may be used to reinforce the area to which each attached end of the loops are attached to the portions of the tear-through barriers.

Referring to FIGS. 5C-5F, the loops 518 can be interleaved (or interfaced) to create the linked loop harness mechanism (or linked loop lacing) that creates a seal between the tear-through barrier portion 510a and the tear-through barrier portion 510b. In particular, as shown in FIG. 5D, to create a laced seal between the tear-through barrier portions 510, the loose end 516 of loop (1) 518a can be inserted into the opening of loop (2) 518b. Then, as shown in FIG. 5D-5E, the loose end of loop (3) 518c can be inserted into the opening of loop (1) 518a (or loop (2) 518b) in act 522. Furthermore, as shown in FIG. 5E, the loose end of each subsequent loop from the loops 518 can be inserted into the opening of the following loops from the loops 518 (e.g., the loose end of loop (4) 518d is inserted into the opening of loop (3) 518c, the loose end of loop (5) 518e is inserted into the opening of loop (4) 518d, the loose end of loop (6) 518f is inserted into the opening of loop (5) 518e, the loose end of the loop (7) 518g is inserted into the opening of loop (6) 518f, and the loose end of loop (8) 518h is inserted into the opening of loop (7) 518g in act 524). In one or more embodiments, the looping process described above can be repeated for any number of loops and/or for any length of free edges of the tear-through barrier portions.

Upon interleaving the loops (e.g., loops 518), the loose end of a final loop can be pulled away from the laced loops until the lacing of the loops is taught and free edges of portions of a tear-through barrier are brought together (e.g., the free edge 512a and the free edge 512b are brought together to create a seal between the tear-through barrier portion 510a and the tear-through barrier portion 510b to close the bottom of the housing 108). In particular, as shown in FIG. 5F, after inserting the loose end of the loop (8) 518h into the opening of loop (7) 518g, the loose end of the loop (8) 518h can be attached to the loop attachment component 520. Indeed, as shown in FIG. 5F, upon lacing (or interleaving) the loops and attaching the loose end of the loop (8) 518h to the loop attachment component 520, a linked loop seal 526 is created between the tear-through barrier portion 510a and the tear-through barrier portion 510b. Similarly, the linked loop harness mechanism can include interleaved loops, interleaved as described above, on a second side of the loop attachment component 520 to create a seal 528 between the tear-through barrier portion 510a and the tear-through barrier portion 510b. Specifically, the interleaving (or lacing) process described above may be started on each end of the free edges 512 of the tear-through barrier portions 510 and continued until a loop is attached to the loop attachment component 520.

Furthermore, the loop attachment component 520 can attach to one or more loops to keep the interleaved loops taught and the tear-through barrier portions 510 in a closed position (e.g., as shown in FIG. 5F by the loop seal 526 and the loop seal 528). The loop attachment component can be passive or active. For instance, the loop attachment component may include a hook or other mechanism to secure one or more loose ends of loops (e.g., the loose end of the loop 8 518h) to the loop attachment component. Indeed, the loop attachment component can release the one or more loose ends of the loops upon contact by the landing gear assembly 110 during deployment (e.g., a motion triggered attachment component). Moreover, the loop attachment component can include an actuator (e.g., an electric component) to secure the one or more loose ends of loops and can be configured to release the loose ends of the loops upon deployment of the landing gear assembly 110 (e.g., designated by a signal from the UAV 100). Additionally, as shown in FIG. 5F, the loop attachment component 520 is attached to a tear-through barrier portion (e.g., the tear-through barrier portion 510a) to maintain a seal between the tear-through barrier portions under the housing 108. In some embodiments, the loop attachment component 520 can be positioned at a terminal end of the tear-through barrier portions and attached to the one or more loops positioned at the terminal ends of the tear-through barrier portions.

Figure 5H:
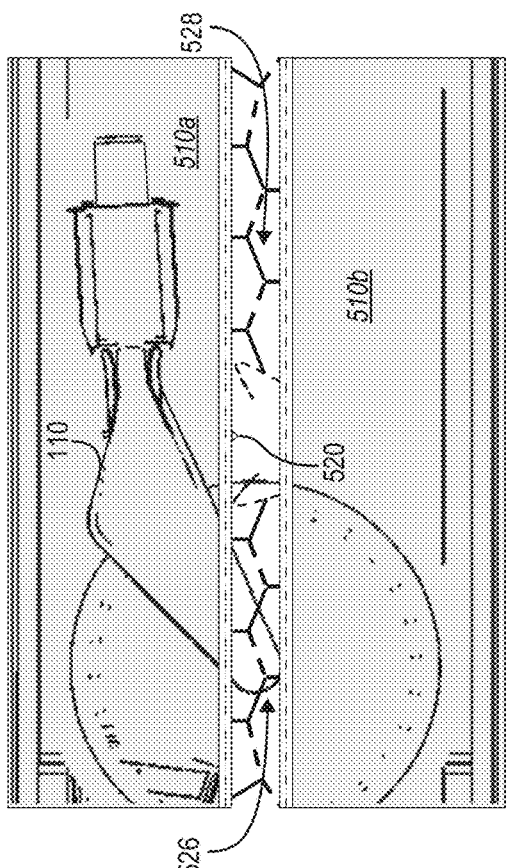
Figure 5G:
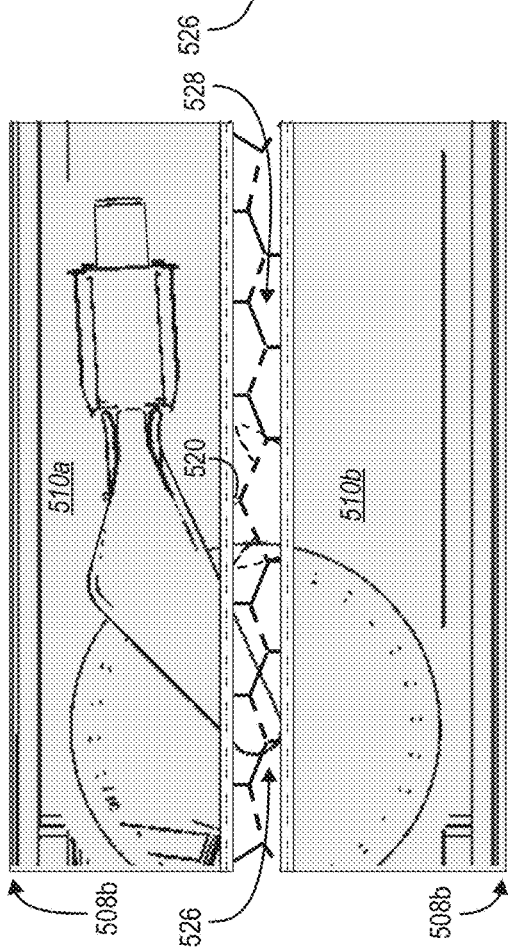

In addition, the linked loop harness mechanism can open the tear-through barrier upon deployment of the landing gear assembly 110. For instance, FIGS. 5G-5H illustrate the linked loop harness mechanism unsealing the seal between tear-through barrier portions (or flaps) upon deployment of the landing gear assembly 110. FIG. 5G illustrates the underside of the housing 108 with the linked loop seal 526 and the linked loop seal 528 creating a seal between the tear-through barrier portion 510*a* and the tear-through barrier portion 510*b* when the linked loops are attached to the loop attachment component 520. Furthermore, referring to FIG. 5G, the fixed edge 508*a* and the fixed edge 508*b* can be attached to the housing 108 to create pivot points for the tear-through barrier portion 510*a* and the tear-through barrier portion 510*b*.

Figure 5J:
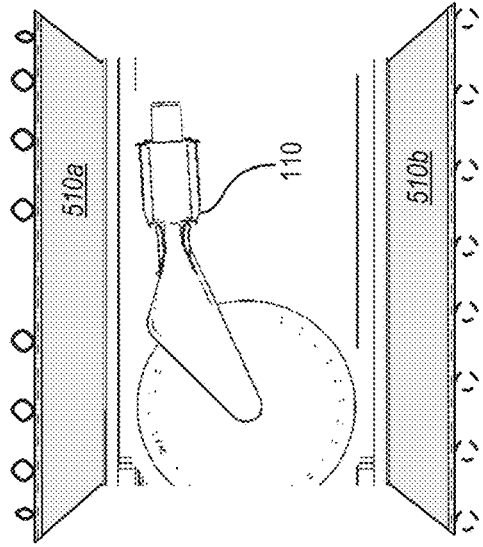
Figure 5I:
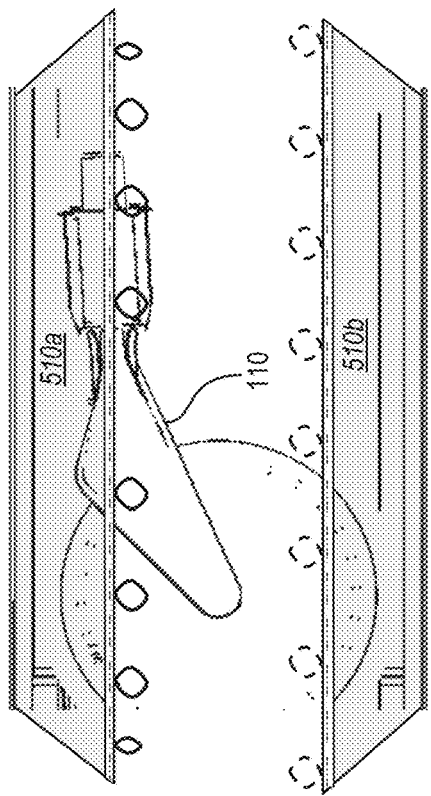

Upon deployment of the landing gear assembly 110, the loop attachment component 520 can release the loose ends of the interleaved loops that are connected to the loop attachment component 520 (e.g., the loose end of loop 8 518*h*) to unravel the seal created by the linked loop seal 526 and the linked loop seal 528 between the tear-through barrier portion 510*a* and the tear-through barrier portion 510*b*. For instance, as shown in FIGS. 5H and 5I, the loop attachment component 520 can release the loose ends of the interleaved loops that are connected to the loop attachment component 520 to unravel the interleaved loops in the linked loop seal 526 and the linked loop seal 528. Indeed, when the interleaved loops unravel, the tear-through barrier portion 510*a* and the tear-through barrier portion 510*b* open as shown in FIGS. 5I and 5J. Indeed, the downward gravitational force of the landing gear assembly 110 after deployment assists in the unraveling of the interleaved loops in the linked loop seal 526 and the linked loop seal 528 to open the tear-through barrier (e.g., the flaps of the tear-through barrier). For instance, the linked loop harness mechanism can cause the tear-through barrier to open utilizing less force (or movement) in comparison to some conventional sealing mechanisms such as a continuous string release. Furthermore, the trigger loads of the linked loop mechanism do not significantly change (or vary) based on tension loads on the tear-through barrier.

Indeed, by utilizing a tear-through barrier, the UAV 100 can deploy the landing gear assembly 110 without utilizing conventional components for opening a bay door. For example, the UAV 100 does not utilize motorized and/or power-driven components (which add additional weight to the UAV 100) to open and close a bay door for the landing gear assembly 110 to deploy. For instance, the UAV 100 can deploy the landing gear assembly 110 without utilizing a motor, hydraulic levers, or a power-driven pulley system to open a bay door and to close a bay door beneath a housing of the UAV 100.

Figure 6A:
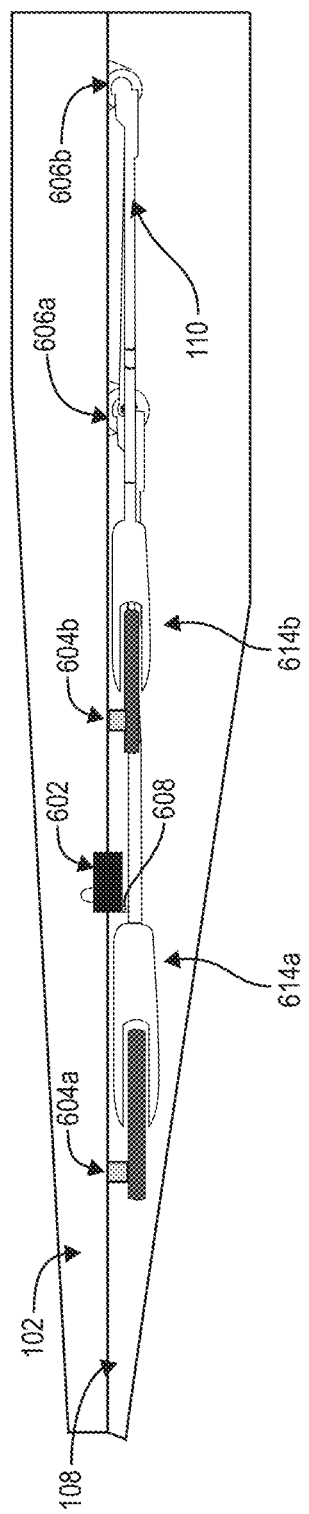
FIGS. 6A-6C illustrate an example gravity fed, self-deploying landing gear assembly deploying from a UAV in accordance with one or more embodiments.
Figure 6B:
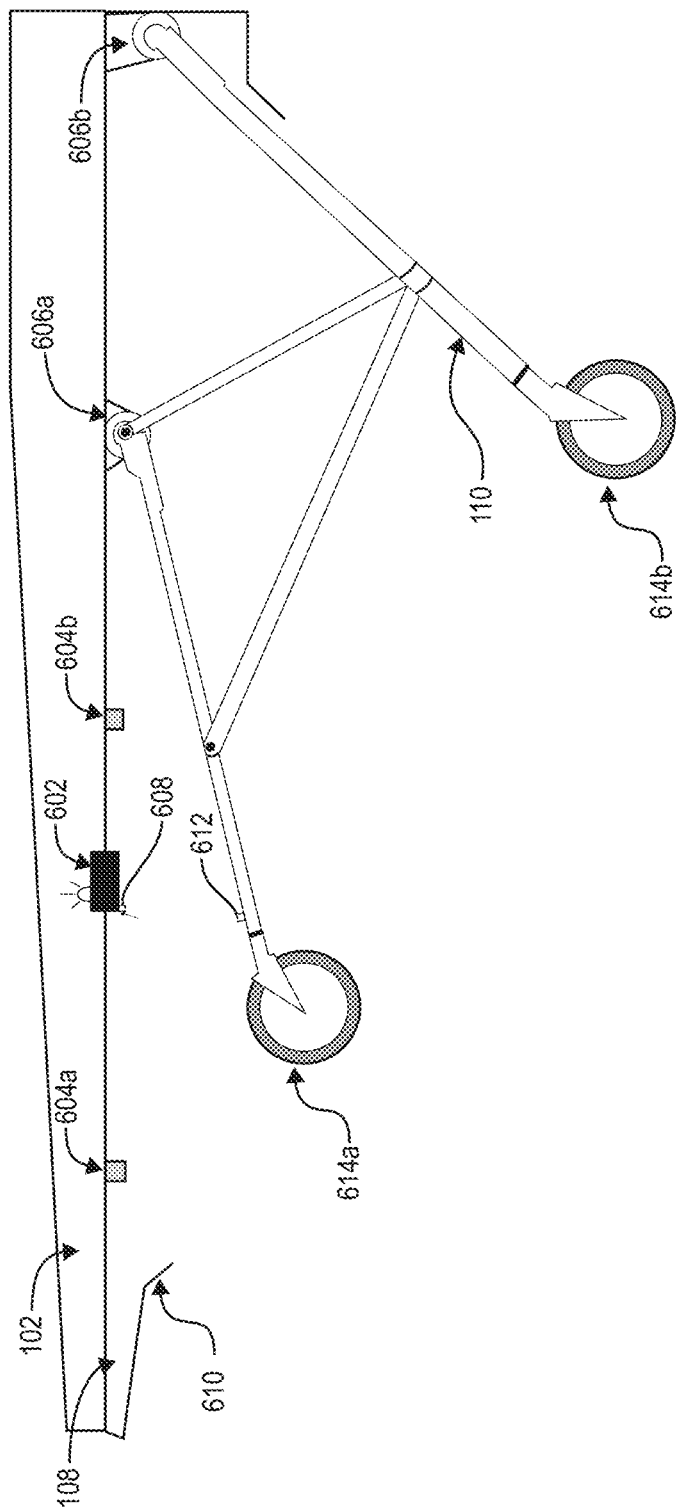
Figure 6C:
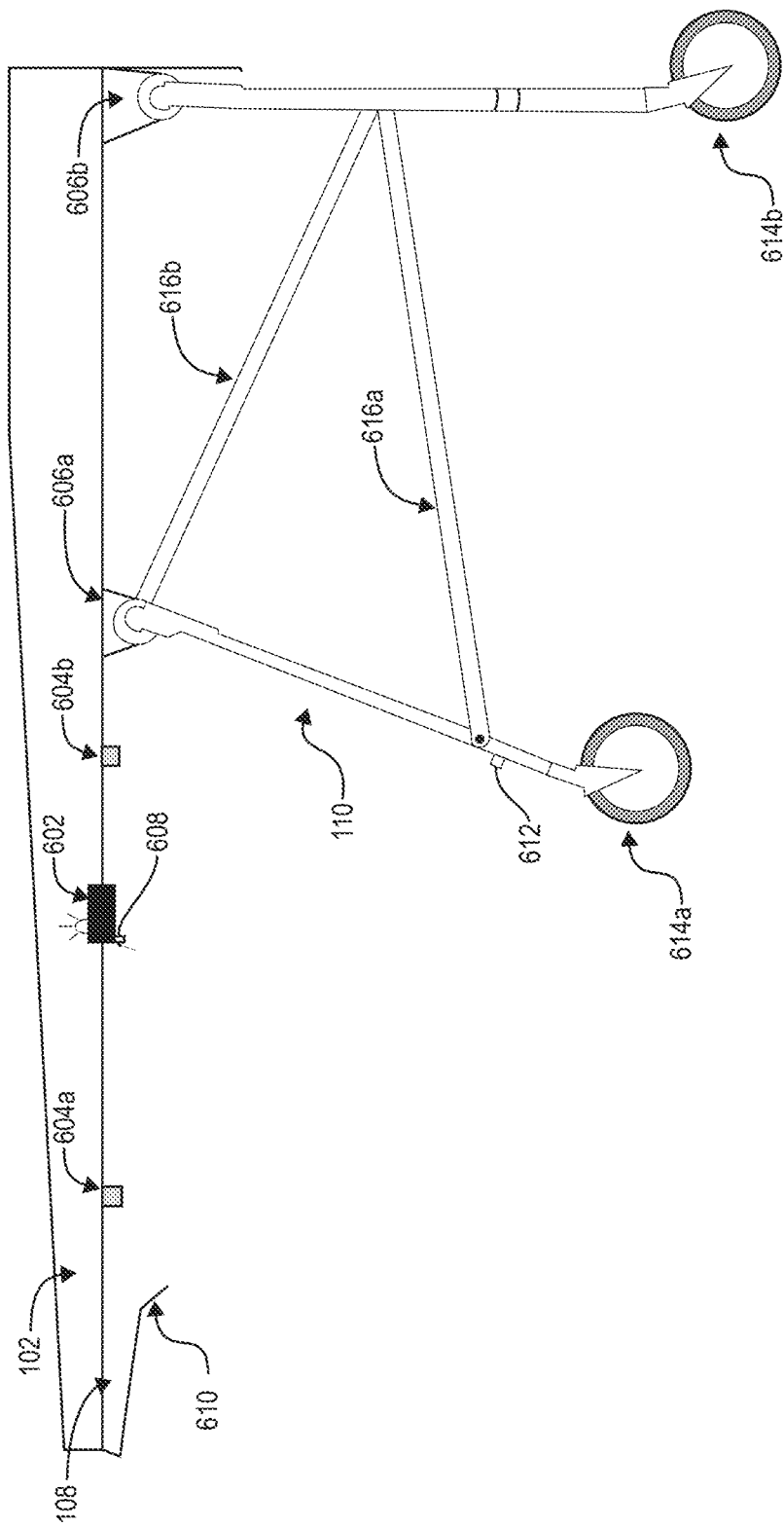

As just mentioned, the UAV 100 can disengage the landing gear assembly 110 to self-deploy the landing gear assembly utilizing gravity. For example, FIGS. 6A-6C illustrate the landing gear assembly 110 deploying from the UAV 100. For instance, FIG. 6A illustrates the landing gear assembly 110 in a closed position, FIG. 6B illustrates the landing gear assembly 110 deploying to an open position outside of the housing 108, and FIG. 6C illustrates the landing gear assembly 110 in an open position outside of the housing 108.

For example, FIG. 6A illustrates the landing gear assembly 110 in a closed position within the housing 108. Indeed, as shown in FIG. 6A, the landing gear assembly 110 is held in the closed position within the housing 108 by the electronic pin switch 602 and the landing gear pin 608. For example, the UAV 100 can utilize a landing gear pin and an electronic pin switch to engage the landing gear assembly to the fuselage 102. In particular, as shown in FIG. 6A, the landing gear assembly 110 is partially held in place by a landing gear pin 608. Indeed, the landing gear pin 608 attaches to the landing gear assembly 110 and to the electronic pin switch 602. For instance, as shown in FIG. 6A, the landing gear pin 608 inserts into a bracket on the electronic pin switch 602 (which is attached to the fuselage 102) and a bracket on the landing gear assembly 110. This creates a connection between the landing gear assembly 110 and the electronic pin switch 602. In some embodiments, the landing gear pin 608 can attach the landing gear assembly 110 directly to the fuselage 102.

Furthermore, in FIG. 6A, the electronic pin switch 602 is in an inactive state and has not received a signal from the UAV 100 to deploy the landing gear assembly. Therefore, the electronic pin switch 602 maintains the landing gear pin 608 in a position that holds the landing gear assembly 110 in the housing 108. The electronic pin switch 602 can maintain the landing gear pin 608 in a position that holds the landing gear assembly 110 until the electronic pin switch 602 is activated by the UAV 100.

Moreover, the landing gear assembly 110 is also attached to the fuselage 102 at hinges 606*a* and 606*b*. For instance, in one or more embodiments, the hinges 606*a* and 606*b* keep at least one or more portions of the landing gear assembly 110 attached to the fuselage 102 before, during, and after deployment of the landing gear assembly. Furthermore, in some embodiments, the hinges 606*a* and 606*b* create a pivot point for the landing gear assembly 110 relative to the fuselage 102. Additionally, as mentioned above in FIG. 4, the castering wheels 614*a* and 614*b* of the landing gear assembly 110 are also held in place by the wheel stops 604*a* and 604*b*.

As just mentioned, the UAV 100 can disengage the landing gear assembly 110 to deploy the landing gear assembly utilizing gravity. For example, FIG. 6B illustrates the UAV 100 disengaging the landing gear assembly 110 to deploy the landing gear assembly 110. For instance, the UAV 100 can signal an electronic pin switch to disengage the landing gear assembly and cause the landing gear assembly 110 to pivot downwards utilizing a gravitational force through a tear-through barrier. Furthermore, the landing gear assembly 110 can remain attached to the housing 108 at one or more hinges during deployment.

For example, the UAV 100 can activate an electronic pin switch by sending a signal to the electronic pin switch (e.g., upon initiating a landing sequence or upon reaching a threshold distance from a landing surface). For instance, FIG. 6B illustrates the electronic pin switch 602 in an active state after the UAV 100 sends a signal to the electronic pin switch 602. Additionally, in one or more embodiments, the UAV 100 can send a signal to the electronic pin switch 602 via a wired connection between a computing device within the fuselage 102 and the electronic pin switch 602. Furthermore, in some embodiments, the electronic pin switch 602 can be enabled to receive a wireless signal. Moreover, the UAV 100 can send a signal to the electronic pin switch 602 upon the occurrence of events such as, but not limited to, receiving a remote command from a control center of the UAV 100 to deploy the landing gear assembly, detecting that the UAV 100 is flying at a low altitude, or detecting that the UAV 100 is a threshold time or distance from landing.

Additionally, in some embodiments, the electronic pin switch disengages a landing gear assembly after receiving a signal from the UAV 100. For example, as illustrated in FIG. 6B, the electronic pin switch 602 can reposition the landing gear pin 608 to disengage the landing gear assembly 110 from the landing gear pin 608 after the electronic pin switch 602 is activated. Indeed, the electronic pin switch 602 can utilize motorized and/or mechanical means to reposition the landing gear pin 608 and cause the landing gear pin 608 to detach from the landing gear assembly 110. For example, as shown in FIG. 6B, the electronic pin switch 602 pulls the landing gear pin 608 and causes the landing gear pin 608 to detach from the bracket 612 on the landing gear assembly 110. In some embodiments, the electronic pin switch 602 performs actions such as, but not limited to, disengaging the landing gear pin 608, removing the landing gear pin 608, severing the landing gear pin 608, or detaching the landing gear pin 608. Furthermore, as shown in FIG. 6B, by removing the landing gear pin 608 from the bracket 612, the landing gear assembly 110 and the electronic pin switch 602 are no longer engaged at the bracket 612.

Furthermore, disengaging the landing gear assembly 110 causes the landing gear assembly to drop downwards. For instance, as shown in FIG. 6B, after the electronic pin switch 602 removes the landing gear pin 608 from the bracket 612 on the landing gear assembly 110, the landing gear assembly 110 becomes partially detached from the fuselage 102. Indeed, as shown in FIG. 6B, the landing gear assembly 110 begins pivoting downward on hinges 606*a* and 606*b* once the front end of the landing gear assembly 110 is not attached to the fuselage 102. For instance, gravity causes the landing gear assembly 110 to drop downward from the fuselage once the landing gear assembly 110 has no attachment to the fuselage on the opposite side of where the landing gear assembly 110 is attached to the fuselage using hinges 606*a* and 606*b*. Additionally, as illustrated in FIG. 6B, the landing gear assembly 110 remains attached to the fuselage 102 through the hinges 606*a* and 606*b* after deployment.

Moreover, the landing gear assembly 110 can disengage from wheel stops upon disengaging from the electronic pin switch. For instance, FIG. 6B illustrates the landing gear assembly 110 disengaged from wheel stops 604*a* and 604*b*. Indeed, in one or more embodiments, the wheel stops 604*a* and 604*b* include clips that fail to hold the wheels of the landing gear assembly 110 when the landing gear assembly 110 disengages from the electronic pin switch and is pulled downwards by a gravitational force. Furthermore, the castering wheels of the landing gear assembly 110 can rotate after disengaging from the wheel stops in the UAV 100. For instance, as shown in FIG. 6B, the castering wheels 614*a* and 614*b* begin to rotate after disengaging from wheel stops 604*a* and 604*b*.

Furthermore, the landing gear assembly 110 can puncture through a tear-through barrier on the bottom of the fuselage when the landing gear assembly 110 is deployed. For example, as shown in FIG. 6B, the landing gear assembly 110 punctures through the tear-through barrier 610. Indeed, as shown in FIG. 6B and as described in FIG. 5, the landing gear assembly 110 punctures through the tear-through barrier 610 when a downward gravitational force causes the landing gear assembly 110 to come into contact with the tear-through barrier 610.

Additionally, the landing gear assembly 110 can utilize a gravitational force to pivot into an open position outside of the fuselage 102 after the electronic pin switch 602 disengages the landing gear assembly 110. For example, FIG. 6C illustrates the landing gear assembly 110 in an open position outside of the fuselage 102. Indeed, the landing gear assembly 110 continues pivoting downwards on the hinges 606*a* and 606*b* to an open position after the landing gear assembly 110 disengages from the electronic pin switch 602, the landing gear pin 608, and the wheel stops 604*a* and 604*b* (i.e., to enable the castering wheels 614*a* and 614*b* to rotate). For example, as shown in FIG. 6C, the landing gear assembly 110 pivots downwards on the hinges 606*a* and 606*b* until the landing gear assembly 110 is in a position outside the housing 108 of the fuselage 102 and past the tear-through barrier 610.

Furthermore, the landing gear assembly 110 can pivot into an open position by utilizing one or more moving structural members of the landing gear assembly 110. For example, as shown in FIG. 6C, the landing gear assembly 110 includes structural members 616*a* and 616*b*. For instance, the structural members 616*a* and 616*b* include a pivoting mechanism at both ends to enable the landing gear assembly 110 to fold from a closed position within the housing 108 into an open position as shown in FIG. 6C.

Additionally, in one or more embodiments, the landing gear assembly 110 includes locking mechanisms to lock the landing gear assembly 110 into an open position outside of the fuselage 102. For example, the landing gear assembly 110 can include locking mechanisms in structural members of the landing gear assembly 110. For instance, the structural members 616*a* and 616*b* can include a locking mechanism in the pivoting mechanism of the structural members. Indeed, the locking mechanism in the structural members 616*a* and 616*b* can cause the structural members to lock when the landing gear assembly 110 fully opens outside of the fuselage 102.

Furthermore, in one or more embodiments, the UAV 100 also includes a locking mechanism in hinges. For instance, the UAV 100 can include locking mechanisms in the hinges 606*a* and 606*b* that activate once the landing gear assembly 110 fully opens outside of the fuselage 102. Indeed, the locking mechanisms on the structural members of the landing gear assembly 110 and/or the hinges on the fuselage 102 can lock the landing gear assembly 110 in an open position.

Indeed, by utilizing the landing gear assembly 110, the UAV 100 can deploy the landing gear assembly 110 without utilizing components that require power to deploy the landing gear assembly 110. For example, the UAV 100 can deploy the landing gear assembly 110 without utilizing a motorized component (which adds weight to the UAV 100) to lower and retract the landing gear assembly. For example, in one or more embodiments the UAV 100 does not utilize a motor to lift or deploy the landing gear assembly 110. Furthermore, in one or more embodiments, the UAV 100 does not include a motorized landing gear assembly retraction component which also reduces the weight of the UAV 100.

Figure 7A:
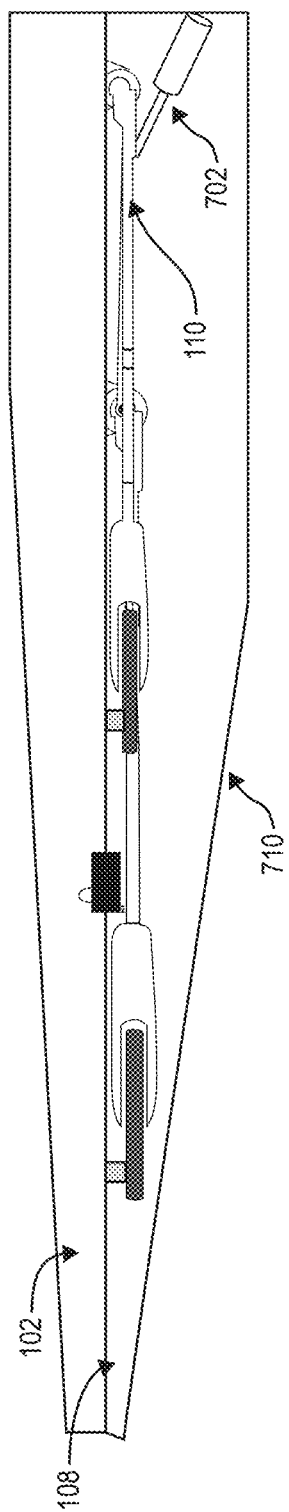
FIGS. 7A-7J illustrate an example gravity fed, self-deploying landing gear assembly deploying from a UAV with dampeners in accordance with one or more embodiments.
Figure 7B:
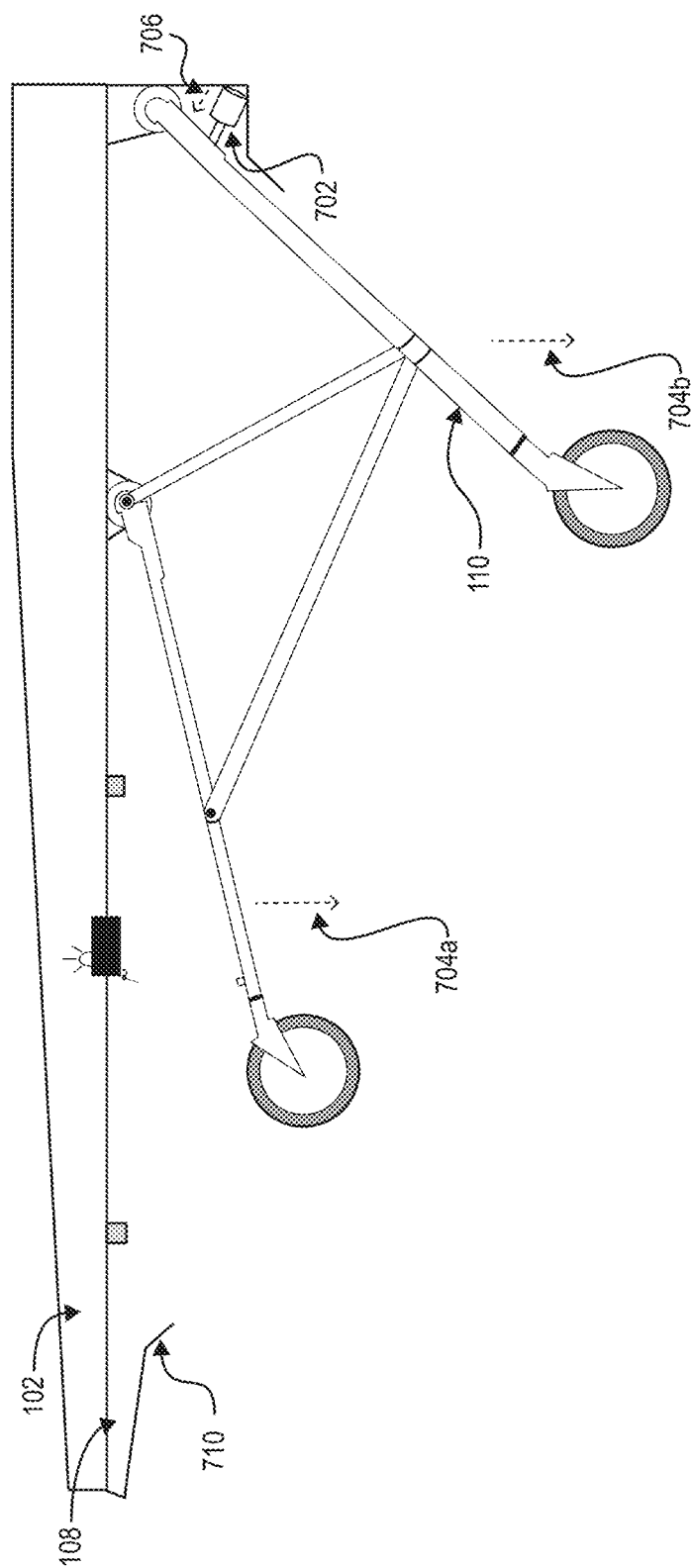

As mentioned above, the UAV 100 can utilize dampeners on the landing gear assembly 110 to control the speed at which the landing gear assembly 110 deploys. For example, FIGS. 7A and 7B illustrate the landing gear assembly 110 in a closed position and self-deploying with dampeners. Indeed, in one or more embodiments, a dampener controls the speed and/or acceleration at which the landing gear assembly 110 deploys from the fuselage 102 by utilizing gravity.

For example, FIG. 7A illustrates the landing gear assembly 110 in a closed position within the housing 108. Indeed, the landing gear assembly 110 can be held in the closed position within the housing 108 of the fuselage 102 as described in FIGS. 4-6. Additionally, as shown in FIG. 7A, the housing 108 includes a dampener 702. Indeed, as shown in FIG. 7A, the dampener 702 can engage the housing 108 and the landing gear assembly 110. For instance, as illustrated in FIG. 7A, the dampener 702 engages the housing 108 and the landing gear assembly 110 such that the dampener 702 can push (or pull) against the direction of movement of the landing gear assembly 110.

Furthermore, as shown in FIG. 7B, the UAV 100 can disengage the landing gear assembly 110 to deploy the landing gear assembly 110. Indeed, the landing gear assembly 110 can disengage and deploy from the housing 108 as described in FIGS. 4-6. For instance, as shown in FIG. 7B, the landing gear assembly 110 deploys from the housing 108 by utilizing a downward force of gravity 704a and 704b. In one or more embodiments, the downward force of gravity 704a and 704b can cause the landing gear assembly 110 to pivot downward very quickly and abruptly.

In order to prevent quick and abrupt deployment of the landing gear assembly 110, the UAV 100 can utilize dampeners. For instance, as shown in FIG. 7B, the dampener 702 is positioned to push (or pull) against the direction of movement of the landing gear assembly 110. For example, as illustrated in FIG. 7B, the dampener 702 causes an upward force 706 that acts against the downward gravitational forces 704a and 704b. In one or more embodiments, the dampener 702 is a hydraulic brake that resists the downward movement of the landing gear assembly 110. Indeed, the dampener 702 can move to prevent a complete obstruction of movement for the landing gear assembly 110 while providing resistance by configuring the dampener 702 to move at a slower rate when the downward gravitational forces 704a and 704b are applied to the dampener 702.

Indeed, the upward force 706 can reduce the downward acceleration of the landing gear assembly. For example, in some embodiments, the dampener 702 is configured to provide an upward force 706 that reduces the downward acceleration caused by the downward gravitational forces 704a and 704b. For instance, the dampener 702 can cause the landing gear assembly 110 to accelerate downward at half the acceleration as caused by the downward gravitational forces 704a and 704b. In one or more embodiments, the dampener 702 is configurable to reduce acceleration by any chosen amount.

Furthermore, the upward force 706 can limit the velocity at which the landing gear assembly pivots downward by utilizing the downward gravitational forces 704a and 704b. For example, in some embodiments, the dampener 702 is configured to provide an upward force 706 that limits the velocity of the landing gear assembly 110 caused by the downward gravitational forces 704a and 704b. For instance, the dampener 702 can cause the landing gear assembly 110 to accelerate downward at an acceleration that would not provide the landing gear assembly 110 enough time and/or distance to attain a threshold velocity. Additionally, in one or more embodiments, the dampener 702 is configurable to limit velocity of the landing gear assembly 110 to any chosen amount (i.e., a threshold velocity).

Moreover, the tear-through barrier 710 can be configured to puncture according to the dampened downward movement of the landing gear assembly 110. For example, as shown in FIG. 7B, the landing gear assembly 110 can puncture the tear-through barrier 710 when the dampener 702 provides an upward force 706 to act against the downward gravitational forces 704a and 704b on the landing gear assembly 110.

Additionally, the UAV 100 can utilize more than one dampener to control the deployment of the landing gear assembly 110. For example, multiple dampeners can engage the landing gear assembly 110 and the housing 108 to dampen the downward movement of the landing gear assembly 110. Additionally, a dampener can engage any component of the UAV 100 and the landing gear assembly 110 to dampen the downward movement of the landing gear assembly 110. Although FIGS. 7A and 7B illustrate the dampener 702 in a specific position, one or more dampeners can be positioned in other locations within the UAV 100 to prevent quick and abrupt deployment of the landing gear assembly 110. Furthermore, in some embodiments, the dampeners are built into the hinges attached to the landing gear assembly 110 and reduce the acceleration at which the hinges enable the landing gear assembly 110 to pivot downwards.

Figure 7C:
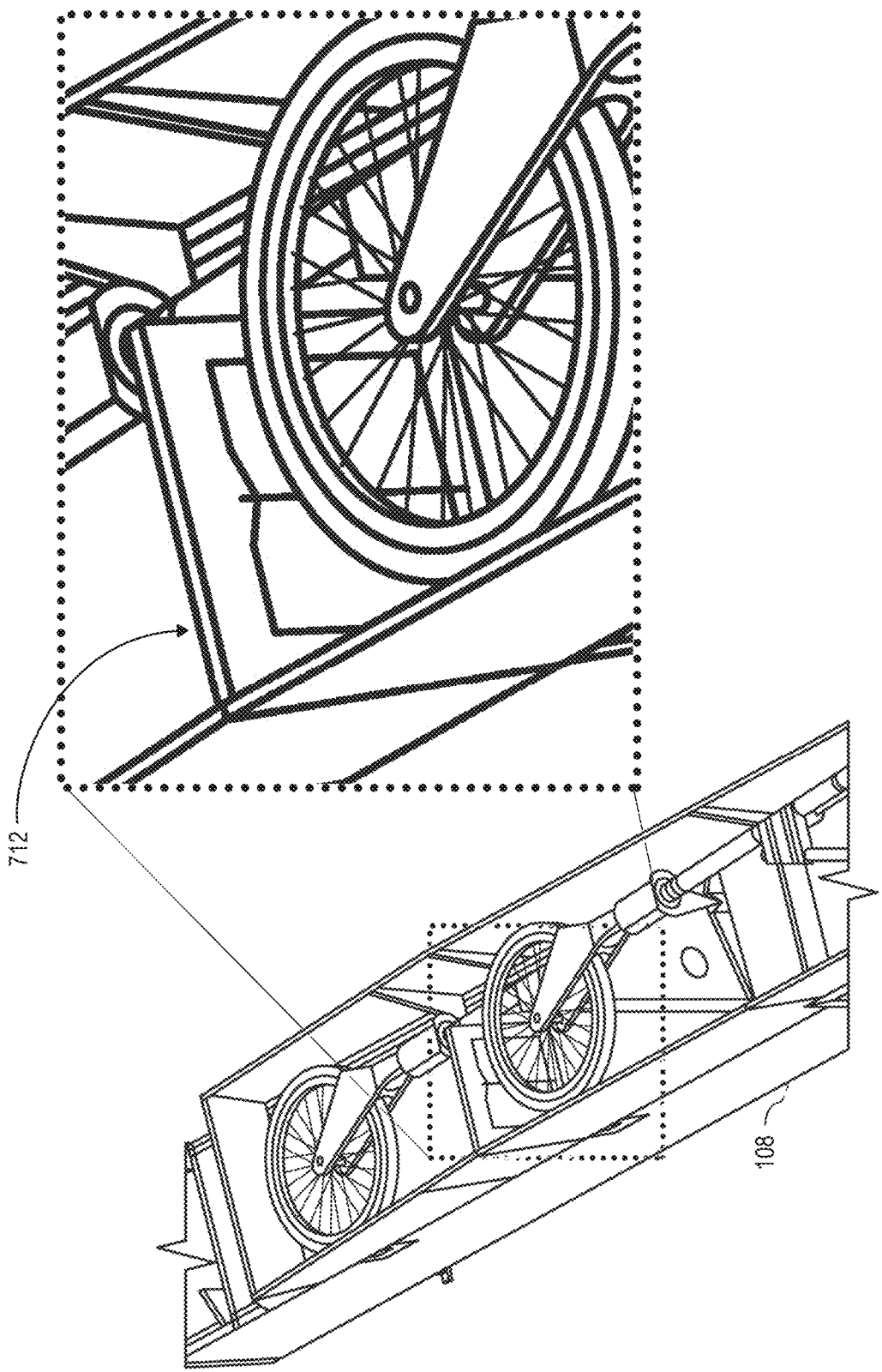
Figure 7D:
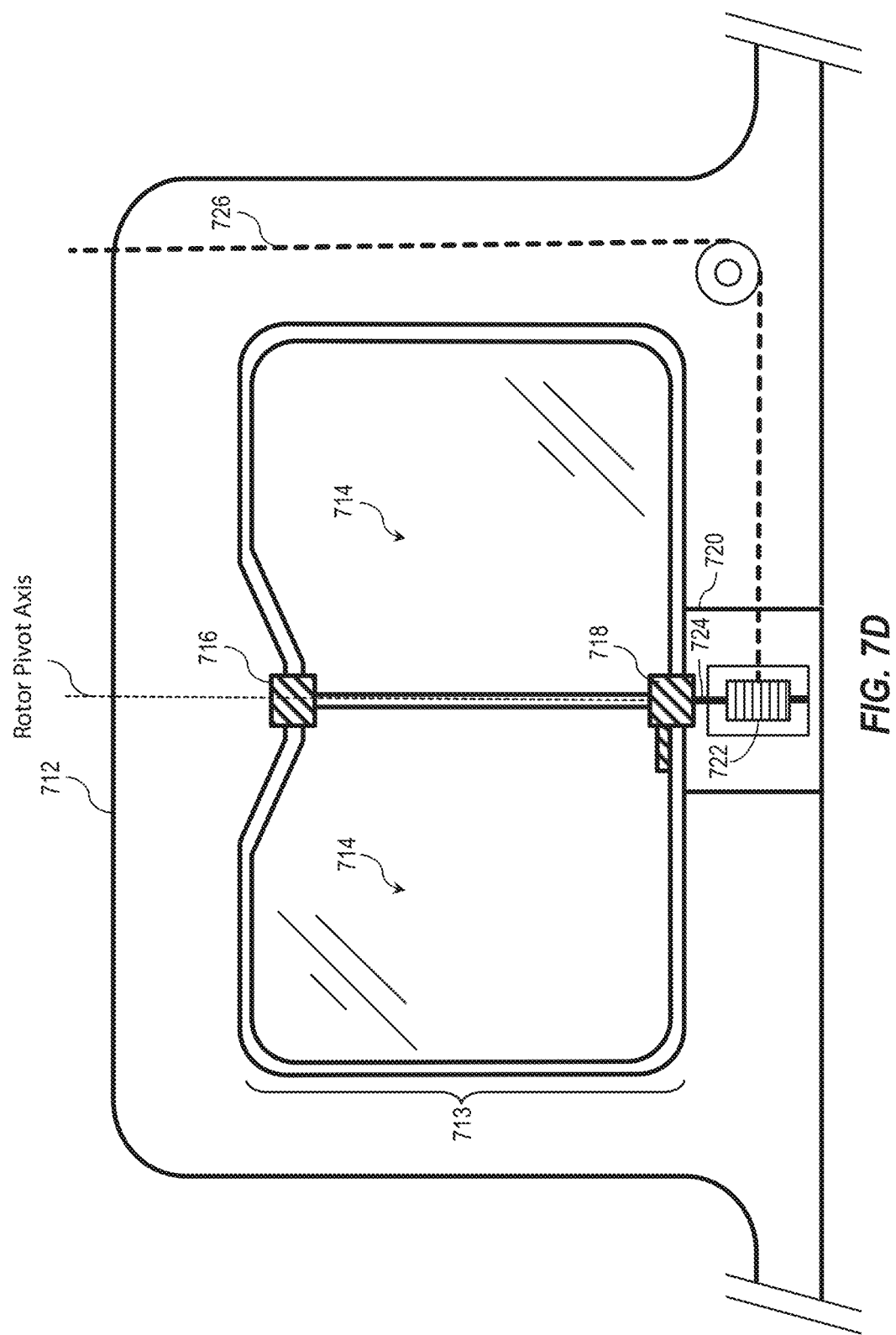

Additionally, in some embodiments, the dampener can include an air viscous regulator that reduces the acceleration at which the landing gear assembly 110 pivots downwards. For example, FIGS. 7C-7J illustrate an air viscous regulator, as the dampener, that dampens the downward movement of the landing gear assembly 110. As illustrated in FIG. 7C, the housing 108 can include an air viscous regulator 712. In particular, FIG. 7D illustrates the structure of the air viscous regulator 712. For instance, as shown in FIG. 7D, the air viscous regulator includes a rotor 713, pivot bearing 716, and pivot bearing 718 to pivotally mount the rotor 713 to a spool 722 via the pivot shaft 724. Furthermore, the rotor 713 may include two or more panels 714 (e.g., flat blades) on opposite sides of the pivot shaft 724 to create a high resistance rotor. In some embodiments, the landing gear assembly 110 can block (or hold in place) the rotor 713 when the landing gear assembly 110 is stowed in the closed position within the housing 108 (e.g., from unintentionally unwinding when the landing gear assembly 110 is in the closed position).

Moreover, as shown in FIG. 7D, the structure of the air viscous regulator 712 includes the spool assembly 720. The spool assembly 720 includes a string 726 that connects to the spool 722 at one end and can attach to the landing gear assembly 110 at another end. In addition, the string 726 can be wound around the spool 722. In one or more embodiments, the string 726 can be fabricated from a tough, lightweight, synthetic polymer, such as nylon, polyvinylidene fluoride (PVDF, also called fluorocarbon), polyethylene, Dacron (polyethylene terephthalate), or ultra-high molecular weight polyethylene (UHMWPE), such as Dyneema, etc. Although FIG. 7D illustrates the string 726, other components can be utilized in the air viscous regulator 712 such as timing belts, chains, axles, hydraulics, etc. Furthermore, the air viscous regulator 712 can also include one or more pulleys (or low friction rings) to guide the string 726 from the spool 722 to the landing gear assembly 110 during deployment of the landing gear assembly 110 (e.g., to avoid the spinning rotor 713). Additionally, the string 726 can include some slack to assure that the landing gear assembly 110, during deployment, is out of the way before the rotor 713 begins moving.

During deployment of the landing gear assembly 110, the air viscous regulator 712 reduces the acceleration at which the landing gear assembly 110 pivots downwards when deployed by utilizing the rotor 713 as a speed limiter. In particular, as the landing gear assembly 110 deploys under gravitational forces, the string 726 pulls and begins to unspool from the spool 722. While the string 726 pulls and begins to unspool from the spool 722, the rotor 713 spins about the rotor pivot axis and the air resistance (e.g., air resistance from the air flow caused by the flight of the UAV 100) placed upon the surface area of the panels 714 slows the rotation of the pivot shaft 724 which in turn slows the rotation of the spool 722. In some embodiments, the air viscous regulator 712 can include an intermediate gear train between the rotor 713 and the spool 722. Indeed, the rotor 713 utilizes air resistance to control the release of the string 726 from the spool 722, which reduces the acceleration at which the landing gear assembly 110 pivots downwards when deployed.

Figure 7E:
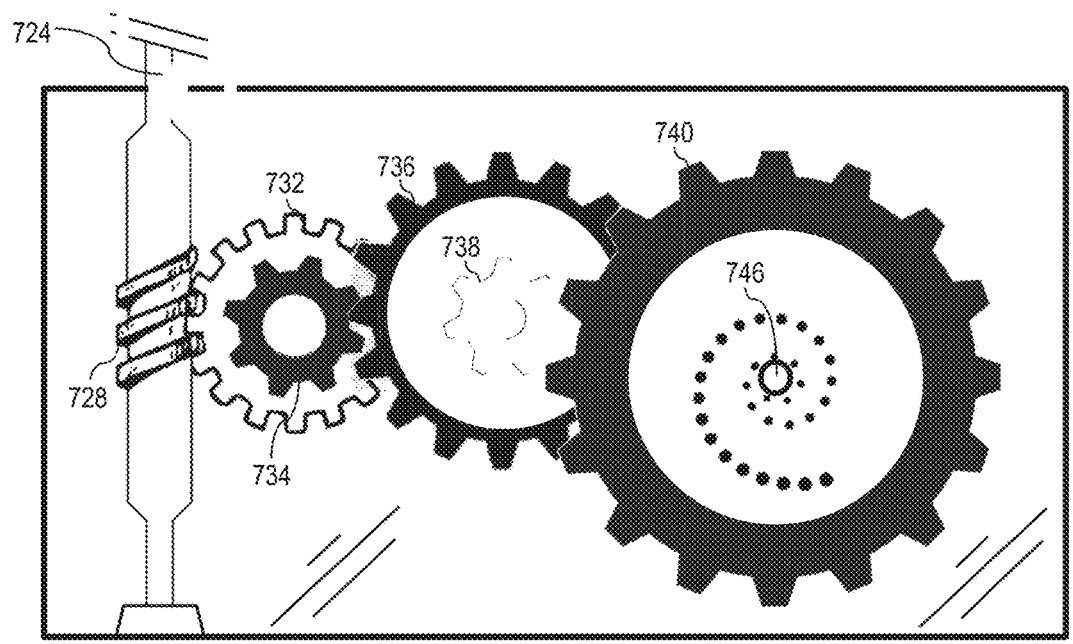
Figure 7F:
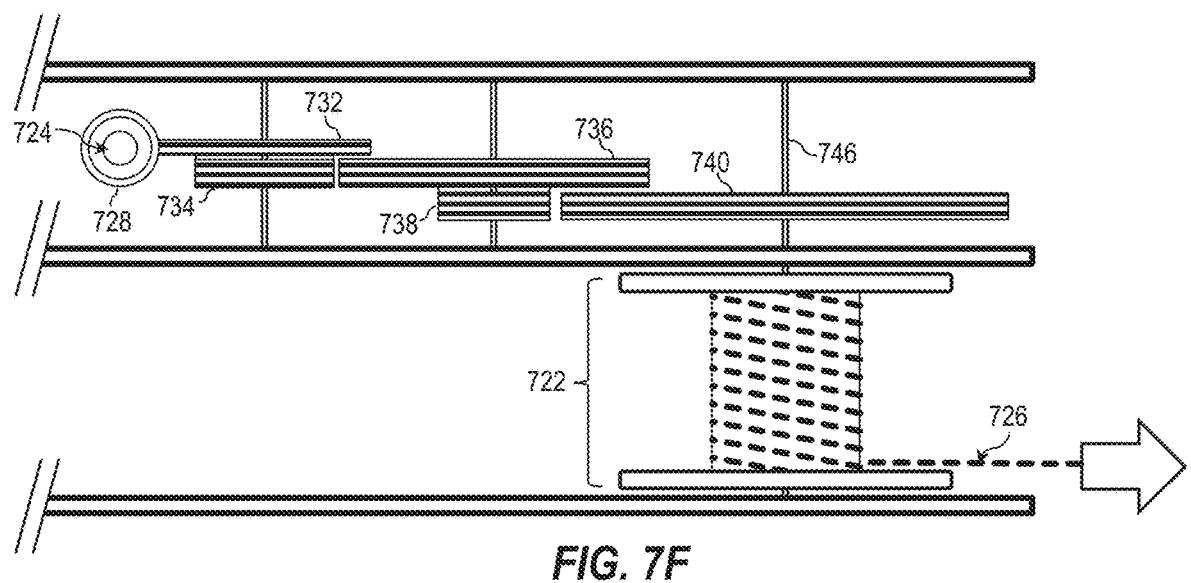
Figure 7J:
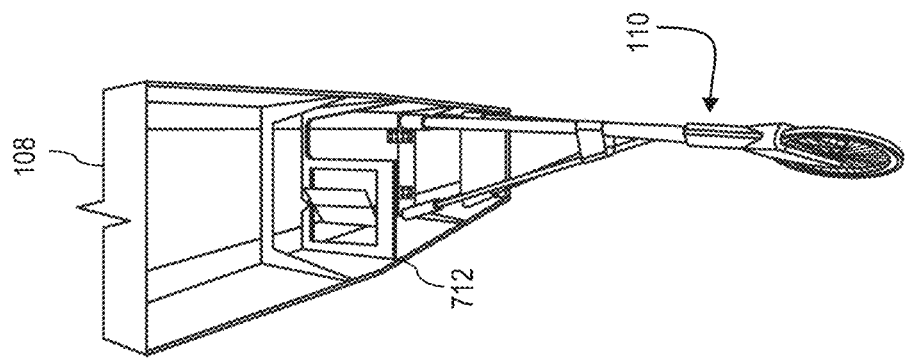
Figure 7I:
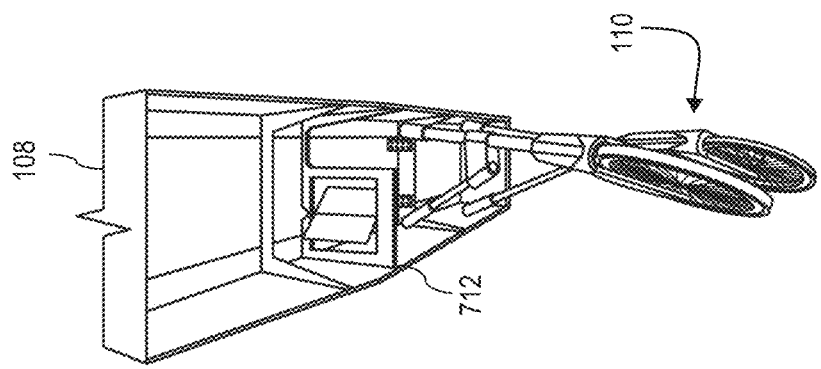
Figure 7H:
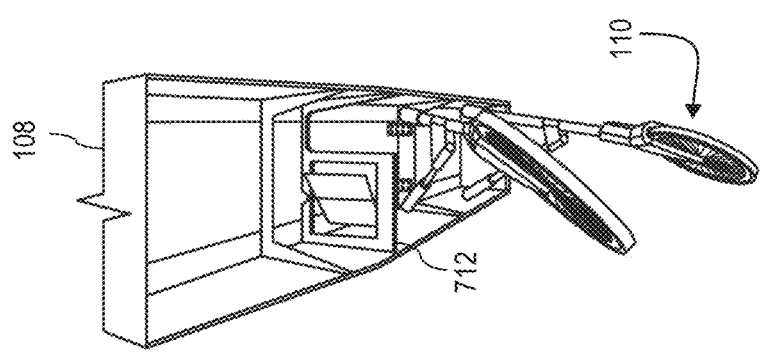
Figure 7G:
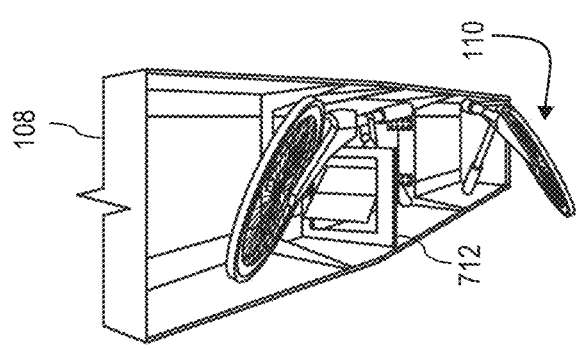

In some embodiments, the spool assembly 720 includes various gearing arrangements (e.g., a multiplying gear train) to achieve a desired spool payout speed, which dictates the landing gear deployment speed. In particular, FIGS. 7E and 7F illustrate an example of a gearing arrangement for the air viscous regulator 712. For instance, the gearing arrangement illustrated in FIGS. 7E and 7F include a worm screw 728, a worm gear 732, and spur gears 734, 736, 738, and 740. Indeed, the various gears of the gearing arrangement may be secured in place and relative to one another via a plurality of alignment plates and/or gear shafts. In some embodiments, additional gearing can be utilized by using a block and tackle between the fuselage 102, housing 108, and/or the landing gear assembly 110.

Moreover, the gearing arrangement illustrated in FIGS. 7E and 7F can change the ratio of torque (or rotational force) translated between the pivot shaft 724 (which is coupled to the rotor 713) and a gear shaft 746 (which is coupled to the spool 722) when the spool 722 or the rotor 713 rotate (e.g., during deployment of the landing gear assembly 110). In some embodiments, the gearing arrangement (e.g., worm screw 728, worm gear 732, and spur gears 734-740) can be arranged to configure the pivotal shaft 724 to have more rotational force in comparison to the gear shaft 746 (e.g., configure the rotor 713 to have more control, via rotational force, than the spool 722). The one or more gears of the gearing arrangement can include different sizes of gears and/or different numbers of gearing ratios between the one or more gears in the gearing arrangement. In some embodiments, the pivotal shaft 724 and the spool 722 can be coupled such that the size of the spool could enable a desired rotational speed for the spool 722 during deployment of the landing gear assembly 110.

As an example, FIGS. 7G-7J illustrate the air viscous regulator 712 reducing the acceleration at which the landing gear assembly 110 pivots downwards when deployed by from the housing 108. Indeed, as shown in FIGS. 7G-7J, the air viscous regulator 712 is enabled to rotate the rotor 713 (via air resistance) to counteract the speed at which the landing gear assembly 110 pulls string 726 from the spool 722 of the air viscous regulator 712 (as shown in FIGS. 7C through 7F).

In one or more embodiments, the dampeners prevent the structural components of the landing gear assembly 110 from becoming damaged due to abrupt deployment. For example, the dampeners can reduce the acceleration and/or velocity at which the landing gear assembly 110 deploys to prevent damage to the struts and other components of the landing gear assembly 110. In some embodiments, the dampeners can prevent damage to the landing gear assembly 110 such as, but not limited to, snapping struts, deforming struts, or deforming hinges of the landing gear assembly 110.

Furthermore, in one or more embodiments, the UAV 100 can dampen the deployment of the landing gear assembly 110 without utilizing motorized and/or power-driven components to slow down or control the deployment of the landing gear assembly 110. For example, the UAV 100 can utilize the dampener 702 to control the deployment of the landing gear assembly 110 without utilizing additional motorized and/or power-driven components such as a power-driven hydraulic piston to push or pull the landing gear assembly 110. Indeed, the UAV 100 can operate with less weight by utilizing the dampener 702 and/or the air viscous regulator 712.

Figure 8A:
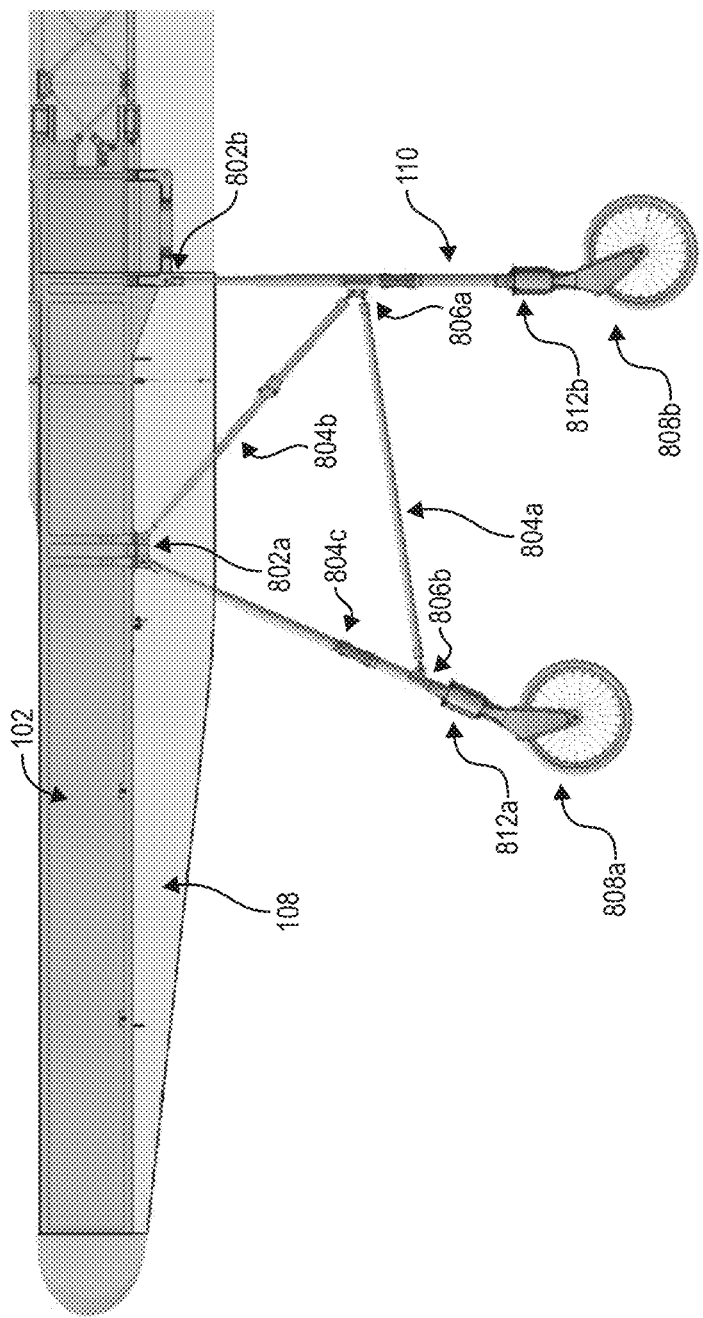
FIGS. 8A-8B illustrate an example landing gear assembly that is fully deployed from a UAV and engaged to a fuselage in accordance with one or more embodiments.

As just mentioned, the landing gear assembly 110 can pivot to an open position outside the housing 108 of the fuselage 102 to prepare the UAV 100 for landing. For instance, FIG. 8A illustrates a final position of the landing gear assembly 110 after the landing gear assembly 110 fully deploys. Indeed, as described above in FIG. 6 and shown in FIG. 8A, the landing gear assembly 110 can pivot into the final landing position by pivoting out of the housing 108 on hinges 802a and 802b. Furthermore, as shown in FIG. 8A, the landing gear assembly 110 can fold open into the final landing position by enabling the structural members 804a, 804b, and 804c to pivot upon the landing gear assembly pivot points 806a and 806b.

Although FIG. 8A illustrates the nose wheel 808a at a different height than the rear wheel 808b, it will be appreciated that the attitude of the UAV can change during landing to modify the position of the wheels. For example, in one or more embodiments, the UAV lands at a negative attitude (e.g., an angle of −2 degrees), such that the front wheel 808a and the rear wheel 808b are at the same height (e.g., both wheels touch the ground).

In one or more embodiments, the landing gear assembly 110 includes a castering mechanism in both the nose wheel and rear wheel. For instance, as shown in FIG. 8A, both the nose wheel 808a and the rear wheel 808b are respectively engaged to a rotational component 812a and 812b (sometimes referred to as a castering component or a rotational member). Furthermore, both castering components 812a and 812b include a weight-induced multi-disk braking system (sometimes referred to as a rotational braking device) to reduce rotation of the castering components 812a and 812b (described in greater detail below). For example, in some embodiments, the landing gear assembly 110 reduces the rotation of the rotational component 812b engaged to the rear wheel 808b after the rear wheel 808b contacts the ground (i.e., utilizing the weight-induced multi-disk brakes in the rotational component 812b). Similarly, the landing gear assembly 110 reduces the rotation of the rotational component 812a engaged to the nose wheel 808a after the nose wheel 808a contacts the ground.

Figure 8B:
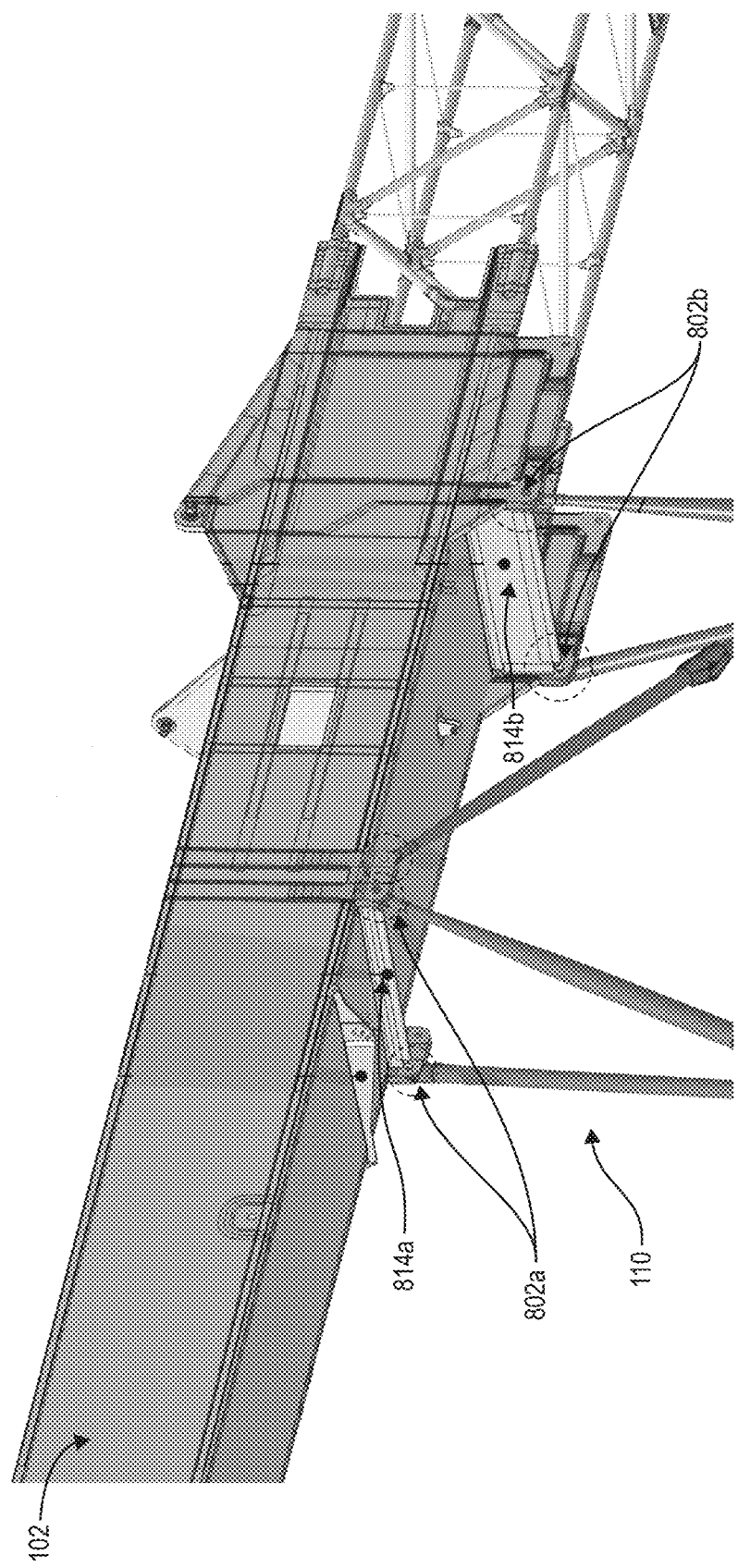

Furthermore, as mentioned above, the landing gear assembly 110 can remain attached to the fuselage 102 after deploying. For example, FIG. 8B illustrates the landing gear assembly 110 engaged to the fuselage 102 after deployment of the landing gear assembly 110. In particular, as shown in FIG. 8B, the fuselage 102 includes strut brackets 814a and 814b. Indeed, as illustrated in FIG. 8B, the strut brackets 814a and 814b engage (or secure) the hinges 802a and 802b to the fuselage 102. Furthermore, the landing gear assembly 110 engages to the fuselage 102 by attaching to the hinges 802a and 802b. In one or more embodiments, the fuselage 102 and the landing gear assembly 110 are partially positioned within the housing 108 (not shown in FIG. 8B) of the UAV 100.

Figure 9:
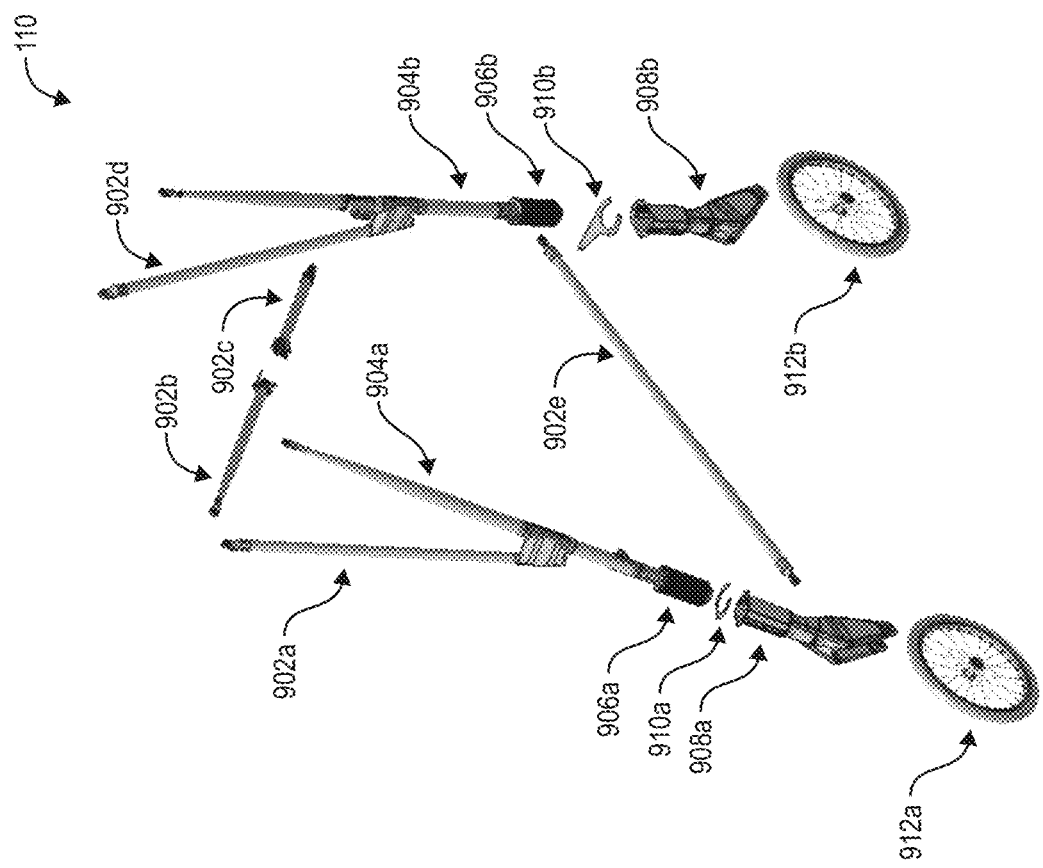
FIG. 9 illustrates an example landing gear assembly of a UAV in accordance with one or more embodiments.

As just mentioned above, the landing gear assembly 110 can align wheels to the runway during landing. For example, FIG. 9 illustrates an embodiment of the landing gear assembly 110 that includes castering wheels that align to the direction of movement of the UAV during landing. For example, as shown in FIG. 9, the landing gear assembly 110 includes multiple structural strut members 902a-902e, castering strut members 904a-904b, multi-disk braking strut components 906a-906b, wheel forks 908a-908b, wheel fork lugs 910a-910b, and wheels 912a-912b.

In particular, the landing gear assembly 110 can include multiple structural strut members. For example, as shown in FIG. 9, the landing gear assembly 110 includes structural strut members 902a-902e. Indeed, in one or more embodiments, the structural strut members 902a-902e enable the landing gear assembly 110 to fold into a closed position for storage within a housing 108 of the UAV and to fold into an opened position upon deployment of the landing gear assembly 110. Furthermore, the structural strut members 902a-902e can provide stability and/or strength to the landing gear assembly 110 during landing. Additionally, the structural strut members 902a-902e can absorb shock upon landing the UAV 100.

Furthermore, the landing gear assembly 110 can include castering strut members. For instance, as illustrated in FIG. 9, the landing gear assembly 110 includes castering strut members 904a-904b. Moreover, the castering strut members 904a-904b engage the multiple structural strut members 902a-902e to produce the top portion of the landing gear assembly 110. Furthermore, the castering strut members 904a-904b include multi-disk braking strut components 906a-906b at the bottom end of the castering strut members 904a-904b. Additionally, the castering strut members 904a-904b engage the wheel forks 908a-908b to enable the wheel forks 908a-908b to rotate relative to the castering strut members 904a-904b. Indeed, the castering strut members 904a-904b engage the wheel forks 908a-908b such that the multi-disk braking strut components 906a-906b are positioned within the wheel forks 908a-908b. The functionalities of the multi-disk braking components and the castering wheels are described in greater detail in the figures below.

Additionally, the landing gear assembly 110 can include wheel forks. For example, as shown in FIG. 9, the landing gear assembly 110 includes wheel forks 908a-908b. Furthermore, the top ends of the wheel forks 908a-908b engage the castering strut members 904a-904b (and the bottom ends of the wheel forks 908a-908b engage the wheels 912a-912b) to produce the bottom portion of the landing gear assembly 110. Indeed, as mentioned above, the wheel forks 908a-908b can rotate relative to the castering strut members 904a-904b to enable the wheels 912a-912b to rotate (i.e., swivel) relative to the castering strut members 904a-904b. Furthermore, in one or more embodiments, the wheel forks 908a-908b also include multi-disk braking components within the wheel forks 908a-908b. The multi-disk braking components and the castering wheels are described in greater detail in the figures below.

Moreover, the landing gear assembly 110 can include wheels. For instance, as illustrated in FIG. 9, the landing gear assembly 110 includes wheels 912a-912b. In one or more embodiments, the wheels 912a-912b engage the bottom portion of the wheel forks 908a-908b with axles. Indeed, the wheels 912a-912b can rotate relative to the wheel forks 908a-908b. In one or more embodiments, the landing gear assembly 110 utilizes wheels 912a-912b with spokes.

Additionally, as shown in FIG. 9, the wheel forks 908a-908b can remain engaged to the castering strut members 904a-904b by engaging wheel fork lug members 910a-910b to both the wheel forks 908a-908b and the castering strut members 904a-904b. In one or more embodiments, the wheel fork lug members 910a-910b couple the wheel forks 908a-908b to the castering strut members 904a-904b without reducing the rotational capability of the wheel forks 908a-908b.

Moreover, FIG. 9 illustrates one exemplary embodiment of the landing gear assembly 110. Indeed, the landing gear assembly 110 can utilize other components and/or other combinations of components. For example, the landing gear assembly 110 can include any number of wheels (e.g., three wheels or four wheels). Furthermore, the landing gear assembly 110 can utilize different configurations of structural members. For instance, the landing gear assembly 110 can utilize any number of structural members (e.g., castering strut members, wheel forks, and/or structural strut members). Additionally, the landing gear assembly 110 can utilize structural members that are configured in different positions (e.g., a trapezoidal, a triangular, a pentagonal, and/or a rectangular shape).

Figure 10:
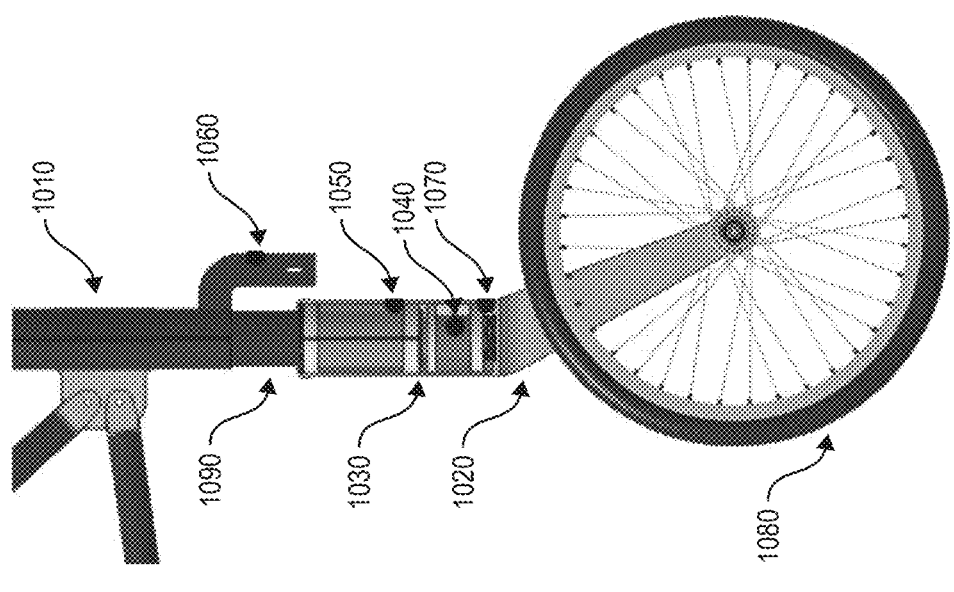
FIG. 10 illustrates an example castering wheel of a landing gear assembly of a UAV in accordance with one or more embodiments.

As just mentioned, the landing gear assembly 110 can utilize a weight-induced multi-disk braking system to reduce the rotation of a castering wheel upon the wheel contacting the ground. For example, FIG. 10 illustrates an overview of the multi-disk braking system for landing gear assembly 110. For instance, as shown in FIG. 10, the castering wheel includes a strut 1010 and a wheel fork 1020. Additionally, as shown in FIG. 10, the castering wheel of the landing gear assembly 110 includes disks 1030, a compression member 1040, bearings 1050, a weight-on-wheel sensor 1060, a spring element 1070, and a wheel 1080.

For instance, in one or more embodiments, a strut engages a wheel fork to enable the wheel fork to rotate relative to the strut to form a castering wheel. For example, as shown in FIG. 10, the strut 1010 is partially positioned within a hollow end of the wheel fork 1020. Indeed, as illustrated in FIG. 10, the wheel fork 1020 can rotate relative to the strut 1010 to enable free rotation of the wheel 1080 relative to the strut 1010.

Furthermore, the castering wheel of the landing gear assembly 110 can also include bearings. For example, as shown in FIG. 10, the castering wheel of the landing gear assembly 110 includes bearings 1050. Indeed, in one or more embodiments, the bearings 1050 are coupled to the strut 1010. Additionally, as shown in FIG. 10, the bearings 1050 are positioned between the strut 1010 and the inside wall of the wheel fork 1020. Furthermore, in some embodiments, the bearings reduce friction between the strut 1010 and the wheel fork 1020.

Moreover, the castering wheel of the landing gear assembly 110 can also include friction-disks. For instance, as illustrated in FIG. 10, the castering wheel of the landing gear assembly 110 includes disks 1030. For example, in one or more embodiments, the one or more disks 1030 can be coupled to the inside wall of the wheel fork 1020 and have an opening to rotate around the strut 1010. Furthermore, the one or more disks 1030 can also be coupled to the strut 1010. In one or more embodiments, the disks 1030 include one or more disks that are coupled to the wheel fork 1020 and one or more disks that are coupled to the strut 1010. Indeed, in some embodiments, the disks can press together and create friction to reduce rotation (or mobility) of the wheel fork 1020 relative to the strut 1010, as discussed in greater detail in the below figures.

Furthermore, the castering wheel of the landing gear assembly 110 can also include a compression member. For example, as illustrated in FIG. 10, the castering wheel of the landing gear assembly 110 includes compression member 1040. For instance, in one or more embodiments, the compression member 1040 is positioned between the strut 1010 and the wheel fork 1020. Additionally, in one or more embodiments, the compression member 1040 is wider than the lower point of the wheel fork 1020 such that the compression member cannot pass through the bottom of the hollow portion of the wheel fork 1020.

Additionally, in one or more embodiments, the compression member can compress when the compression member is subjected to a threshold weight (e.g., the weight of the UAV 100). Indeed, the compression member 1040 can compress to enable the wheel fork 1020 to move vertically relative to the strut 1010 and cover the strut clearance section 1090. Indeed, the wheel fork 1020 can move upwards to the strut clearance section 1090 when the wheel fork 1020 and the compression member 1040 receive the threshold weight (i.e., when the wheel 1080 of the UAV 100 is on the ground).

Furthermore, in one or more embodiments, the compression member can compress when the compression member receives the threshold weight and press together disks within a castering wheel of the landing gear assembly. For example, referring to FIG. 10, the compression member 1040 can compress and contact the disks 1030. Indeed, in one or more embodiments, the compression member 1040 can cause the disks 1030 to press against each other when the compression member 1040 contacts the disks 1030. Indeed, the compression member 1040 can cause a reduction in the rotation of the wheel fork 1020 relative to the strut 1010 when the compression member 1040 compresses and contacts the disks 1030.

Moreover, in one or more embodiments, the castering wheel of the landing gear assembly 110 also includes a weight-on-wheel sensor. For example, as illustrated in FIG. 10, the castering wheel of the landing gear assembly 110 includes a weight-on-wheel sensor 1060. For instance, as shown in FIG. 10, the weight-on-wheel sensor 1060 attaches to the strut 1010. In some embodiments, the weight-on-wheel sensor 1060 can be attached to other components such as the wheel fork 1020. Furthermore, in one or more embodiments, the weight-on-wheel sensor 1060 activates when the wheel fork 1020 moves upward into the strut clearance section 1090. Indeed, the weight-on-wheel sensor 1060 can send a signal to the UAV 100 when the UAV 100 lands (i.e., the weight of the UAV 100 causes the wheel fork 1020 to move upward). Furthermore, the weight-on-wheel sensor 1060 can cause the UAV 100 to initiate a roll stop mechanism.

Moreover, in one or more embodiments, a weight-on-wheel sensor can detect when the UAV 100 lands in various ways. For instance, referring to FIG. 10, the weight-on-wheel sensor 1060 can detect the presence of the wheel fork 1020 when the wheel fork 1020 moves upward (i.e., when the UAV 100 lands). In some embodiments, the weight-on-wheel sensor 1060 detects that the UAV 100 landed when the wheel fork 1020 moves upward and contacts (or toggles) a switch on the weight-on-wheel sensor 1060. Furthermore, a weight-on-wheel sensor can be activated by utilizing an activation pin as described below in FIGS. 14A and 14B.

Additionally, the castering wheel of the landing gear assembly 110 can also include a spring element. For example, as illustrated in FIG. 10, the castering wheel of the landing gear assembly 110 includes a spring element 1070. Furthermore, as shown in FIG. 10, the spring element 1070 can be positioned between the strut 1010 and the wheel fork 1020. Indeed, as shown in FIG. 10, the spring element 1070 engages the strut 1010 inside the wheel fork 1020. Furthermore, in one or more embodiments the spring element 1070 compresses when the spring element 1070 is subjected to a threshold weight (e.g., the weight of the UAV 100). Indeed, in some embodiments, the spring element 1070 prevents the wheel fork from completely moving upward until the threshold weight is received to prevent accidental activation of the weight-on-wheel sensor. Additionally, in some embodiments, the spring element 1070 requires more (or less) force to compress than the compression member 1040.

As just mentioned, the landing gear assembly 110 can include a wheel fork having a hollow portion to engage a strut in order to enable the wheel fork to rotate relative to the strut. For example, FIG. 11 illustrates a wheel fork 1100 that includes a hollow portion 1110 to overlap (or engage) a strut 1120. Indeed, as shown in FIG. 11, the strut 1120 includes bearings 1130a and 1130b to enable the wheel fork 1100 to rotate relative to the strut 1120. Indeed, in one or more embodiments, the wheel fork 1100 is enabled to have 360 degrees of rotation relative to the strut 1120.

Additionally, in some embodiments, a wheel fork and/or a strut includes a locking mechanism to limit the rotation of the wheel fork relative to the strut. For example, the wheel fork and/or the strut can include a locking mechanism that limits the rotation of the wheel fork to 180 degrees of rotation relative to the strut. Indeed, in some embodiments, the wheel fork and/or strut can limit the rotation of the wheel fork to any number of degrees relative to the strut (e.g., 45 degrees or 90 degrees).

In some embodiments, the hollow portion 1110 of the wheel fork 1100 accommodates a weight-induced multi-disk braking system as described in greater detail in the below figures. For example, the wheel fork 1100 can accommodate disks that are coupled to the wheel fork 1100 and/or the strut 1120. Furthermore, the wheel fork 1100 can also accommodate a compression member. Moreover, in one or more embodiments, the compression member is positioned between the wheel fork 1100 and the strut 1120 inside the hollow portion 1110.

Figure 12A:
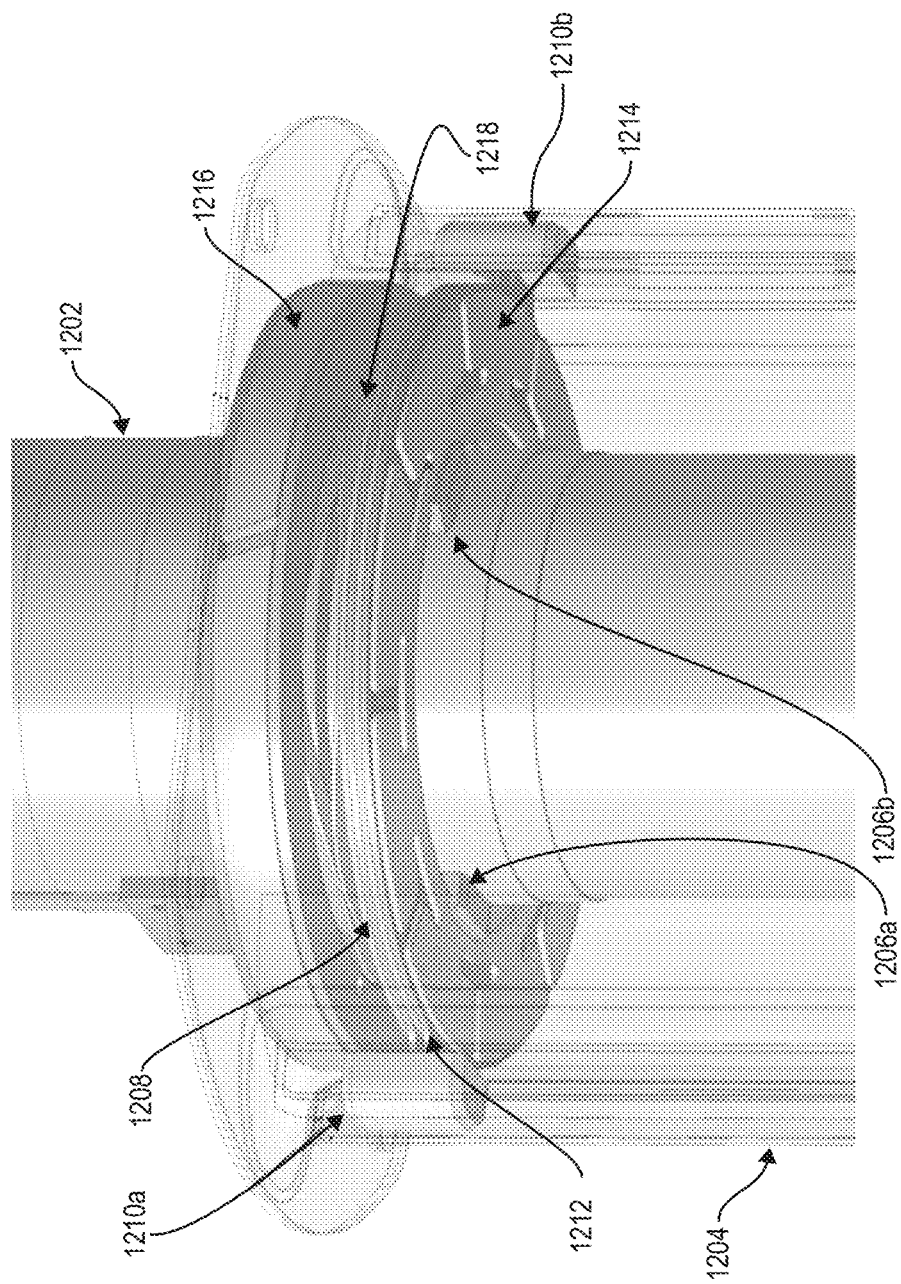
FIGS. 12A-12D illustrate an example multi-disk braking system of a landing gear assembly of a UAV in accordance with one or more embodiments.
Figure 12D:
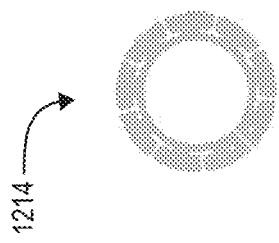
Figure 12C:
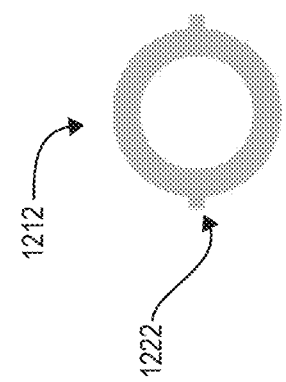
Figure 12B:
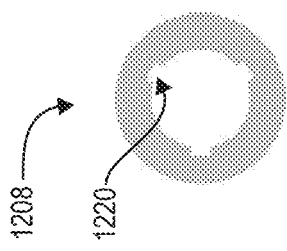

As just mentioned, the landing gear assembly 110 can utilize a weight-induced multi-disk braking system which includes friction-disks to reduce the rotation of a castering wheel upon the wheel contacting the ground (i.e., receiving the weight of the UAV 100). For example, FIGS. 12A-12D illustrate an exemplary embodiment of a weight-induced multi-disk braking system that utilizes friction-disks in a castering wheel to reduce the rotation of a castering wheel upon receiving a threshold weight (e.g., the weight of the UAV 100). For instance, FIG. 12A illustrates friction-disks, engaged with a wheel fork and a strut, that are configured to reduce rotational movement of a castering wheel. Furthermore, FIG. 12B illustrates an exemplary friction-disk that can engage to a strut, FIG. 12C illustrates an exemplary friction-disk that can engage to a wheel fork, and FIG. 12D illustrates an exemplary disk that can prevent one or more friction-disks from separating.

For example, FIG. 12A illustrates an assembly of friction-disks for a weight-induced multi-disk braking system for the landing gear assembly 110. For instance, FIG. 12A illustrates a strut 1202, a wheel fork 1204, and multiple friction-disks enabled to reduce the rotation of the wheel fork 1204 relative to the strut 1202 (i.e., when the wheel fork 1204 receives the weight of the UAV 100). Indeed, as illustrated in FIG. 12A, the strut 1202 includes strut locking features 1206a and 1206b, strut friction-disks 1208, a retaining disk 1214, a bearing 1216, and a spring element 1218. Furthermore, as shown in FIG. 12A, the wheel fork 1204 includes wheel fork locking features 1210a and 1210b and wheel fork friction-disks 1212.

As just mentioned, the landing gear assembly 110 can include a strut that engages a wheel fork to create a castering wheel. For example, FIG. 12A illustrates the strut 1202 engaged within the wheel fork 1204. Furthermore, as described above, the wheel fork 1204 can rotate relative to the strut 1202. Indeed, the wheel fork 1204 can also move vertically relative to the strut 1202. For example, the wheel fork 1204 can slide upwards relative to the strut 1202 when the wheel fork 1204 is subjected to a threshold weight (e.g., the weight of the UAV 100).

Moreover, the strut 1202 includes strut locking features 1206a and 1206b. For example, as shown in FIG. 12A, the strut locking features 1206a and 1206b are coupled to the strut 1202. Indeed, as illustrated in FIG. 12A, the strut locking features 1206a and 1206b enable components of the landing gear assembly 110 to engage the strut 1202. For example, as shown in FIG. 12A, the strut locking features 1206a and 1206b connect to the strut friction-disks 1208 and the bearings 1216 to engage the strut friction-disks 1208 and the bearings 1216 to the strut 1202. For instance, as shown in FIG. 12A, the strut locking features 1206a and 1206b protrude from the strut 1202 to engage notches in the strut friction-disks 1208. Indeed, the strut locking features 1206a and 1206b can engage notches in the strut friction-disks 1208 as described in FIG. 12B.

Additionally, strut locking features can prevent rotation of the strut friction-disks relative to a strut. For example, as illustrated in FIG. 12A, the strut locking features 1206a and 1206b engage with the strut friction-disks 1208 such that the strut friction-disks 1208 cannot rotate relative to the strut. Furthermore, in some embodiments, the strut locking features engage the strut friction-disks to couple the strut friction-disks to the strut such that the strut friction-disks become an extension of the strut. Indeed, in some embodiments, the strut friction-disks only rotate if the strut rotates.

Moreover, strut locking features can enable strut friction-disks to move vertically relative to the strut. For example, as shown in FIG. 12A, the strut locking features 1206a and 1206b engage the strut friction-disks 1208 such that the strut friction-disks 1208 can slide vertically along the strut locking features 1206a and 1206b. Indeed, the strut locking features can be configured to enable strut friction-disks to slide vertically such that the strut friction-disks can move to press together with other friction-disks in the landing gear assembly 110.

Furthermore, the strut locking feature can include an apparatus of any shape, size, configuration, or material that enables components to engage a strut of the landing gear assembly 110. For instance, the strut locking feature can include carved out protrusions of a strut of the landing gear assembly 110 that can engage to other components of the landing gear assembly 110. FIG. 12A illustrates the strut locking features 1206a and 1206b as L-shaped brackets that prevent components from sliding downwards on the strut 1202.

Additionally, a strut can include any number of strut locking features. For example, FIG. 12A illustrates two strut locking features 1206a and 1206b. Indeed, the number of strut locking features can increase the strength of the engagement with components of the landing gear assembly 110. For instance, a strut can increase the strength of engagement with components of the landing gear assembly 110 by increasing the number of strut locking features that engage with the components of the landing gear assembly 110.

Moreover, the wheel fork 1204 includes wheel fork locking features 1210a and 1210b. For instance, as shown in FIG. 12A, the wheel fork locking features 1210a and 1210b are engaged to the wheel fork 1204. Indeed, as illustrated in FIG. 12A, the wheel fork locking features 1210a and 1210b enable components of the landing gear assembly 110 to engage the wheel fork 1204. For example, as shown in FIG. 12A, the wheel fork locking features 1210a and 1210b connect to the wheel fork friction-disks 1212 to engage the wheel fork friction-disks 1212 to the wheel fork 1204. For example, as illustrated in FIG. 12A, the wheel fork locking features 1210a and 1210b include an insert that receives a protrusion from the wheel fork friction-disks 1212. Indeed, the wheel fork locking features 1210a and 1210b can receive and engage protrusions from wheel fork friction-disks 1212 as described in FIG. 12C.

Furthermore, wheel fork locking features can prevent rotation of the wheel fork friction-disks relative to a wheel fork. For instance, as illustrated in FIG. 12A, the wheel fork locking features 1210a and 1210b engage with the wheel fork friction-disks 1212 such that the wheel fork friction-disks become an extension of the wheel fork. Indeed, in one or more embodiments, the wheel fork friction-disks only rotate if the wheel fork rotates when the wheel fork locking features couple the wheel fork friction-disks to the wheel fork.

Additionally, wheel fork locking features can enable wheel fork friction-disks to move vertically relative to the wheel fork. For example, as shown in FIG. 12A, the wheel fork locking features 1210a and 1210b engage the wheel fork 1204 such that the wheel fork locking features 1210a and 1210b can slide vertically along the wheel fork 1204. Indeed, as shown in FIG. 12A, the wheel fork locking features 1210a and 1210b are sliders that include an insert to engage the wheel fork friction-disks 1212. Additionally, as illustrated in FIG. 12A, the wheel fork locking features 1210a and 1210b are sliders that are configured to slide vertically in a notch (or channel) on the inside wall of the wheel fork 1204. Moreover, as illustrated in FIG. 12A, the wheel fork locking features 1210a and 1210b are engaged in the notch on the inside wall of the wheel fork 1204 such that the wheel fork locking features 1210a and 1210b cannot horizontally move along the wheel fork. Furthermore, the wheel fork locking features can be configured to enable wheel fork friction-disks to slide vertically such that the wheel fork friction-disks can move to press together with other friction-disks in the landing gear assembly 110.

Moreover, the wheel fork locking feature can include an apparatus of any shape, size, configuration, or material that enables components to engage a wheel fork of the landing gear assembly 110. For instance, the wheel fork locking feature can include carved out notches on the inside wall of the wheel fork of the landing gear assembly 110 that can engage to other components of the landing gear assembly 110. Indeed, in some embodiments, the wheel fork friction-disks directly insert into notches in the wheel fork to engage with the wheel fork.

Additionally, a wheel fork can include any number of wheel fork locking features. For example, FIG. 12A illustrates two wheel fork locking features 1210a and 1210b. Indeed, the number of wheel fork locking features can increase the strength of the engagement between a wheel fork and components of the landing gear assembly 110. For instance, a wheel fork can increase the strength of engagement with components of the landing gear assembly 110 by increasing the number of wheel fork locking features that engage with the components of the landing gear assembly 110.

Furthermore, as shown in FIG. 12A, the strut friction-disks 1208 are adjacent to the wheel fork friction-disks 1212. For example, as illustrated in FIG. 12A, the strut friction-disks 1208 are positioned such that each strut friction-disk 1208 is adjacent to at least one wheel fork friction-disk (e.g., the disks are arranged such that the strut fiction-disks alternate with the wheel fork friction-disks). Indeed, as shown in FIG. 12A, the strut friction-disks and the wheel fork friction-disks are positioned such that each strut friction-disk generates friction with at least one wheel fork friction-disk. Additionally, as shown in FIG. 12A, both the strut friction-disks 1208 and the wheel fork friction-disks 1212 encircle the strut 1202.

Additionally, as described above, in one or more embodiments, the landing gear assembly 110 includes friction-disks that are configured to enable a wheel fork to rotate relative to the strut when the friction-disks are not pressed together by a threshold weight (e.g., the weight of the UAV 100). Indeed, as shown in FIG. 12A, the strut friction-disks 1208 are engaged to the strut 1202 via the strut locking features 1206a and 1206b such that the strut friction-disks remain rotationally stationary. Furthermore, as shown in FIG. 12A, the wheel fork friction-disks 1212 are engaged to the wheel fork 1204 via the wheel fork locking features 1210a and 1210b such that the wheel fork friction-disks 1212 rotate with the wheel fork 1204 relative to the strut 1202. Furthermore, the strut friction-disks and the wheel fork friction-disks can enable the wheel fork to rotate relative to the strut even when the strut friction-disks and the wheel fork friction-disks are adjacent and in contact with one another (i.e., when the contact generates a low amount of friction). In some embodiments, the strut friction-disks 1208 are configured to rotate while the wheel fork friction-disks 1212 are stationary.

Furthermore, in one or more embodiments, strut friction-disks and wheel fork friction-disks can press together to reduce the rotation of a wheel fork relative to a strut. For example, upon receiving an upward force from a threshold weight (e.g., the castering wheel begins supporting the weight of the UAV 100) one or more components of the landing gear assembly 110 can move to press together strut friction-disks and wheel fork friction-disks. For instance, as shown in FIG. 12A, the strut friction-disks 1208 can press against the wheel fork friction-disks 1212 to generate friction and reduce the ability of the strut friction-disks 1208 and the wheel fork friction-disks 1212 to move. Indeed, in some embodiments, a reduction in movement in the wheel fork friction-disks causes a reduction in movement of the wheel fork relative to the strut because the wheel fork friction-disks are engaged to the wheel fork (e.g., like a multiple plate clutch). Moreover, in one or more embodiments, the reduction in movement of the wheel fork and the wheel fork friction-disks increases as the strut friction-disks and the wheel fork friction-disks are pressed together with increased pressure and/or force (i.e., an increase in anti-shimmy torque).

Furthermore, various components of the landing gear assembly 110 can cause the friction-disks of the landing gear assembly 110 to press together. In particular, in one or more embodiments, components of the landing gear assembly 110 can move due to a force from a threshold weight to press together friction-disks of the landing gear assembly 110. In one or more embodiments, a bottom portion of a wheel fork can contact the friction-disks and cause the friction-disks to press together when the wheel fork moves due to a force from the threshold weight. Furthermore, the landing gear assembly 110 can include a compression member that is positioned between a wheel fork and a strut that compresses and presses against the friction-disks when the compression member receives a force from the threshold weight (e.g., the weight of the UAV 100). Indeed, utilizing a compression member to cause the friction-disks to press together and reduce movement of the wheel fork is described in greater detail in FIG. 13.

Moreover, the landing gear assembly 110 can utilize any number of friction-disks in the weight-induced multi-disk braking system for the castering wheels. For example, in one or more embodiments, the landing gear assembly 110 includes only a single strut friction-disk and a single wheel fork friction-disk. Additionally, as shown in FIG. 12A, the landing gear assembly 110 utilizes two strut friction-disks 1208 and two wheel fork friction-disks 1212. Indeed, in some embodiments, an increase in the number of friction-disks results in an increase in the reduction of rotation of a wheel fork relative to a strut (i.e., an increase in anti-shimmy torque). For example, increasing the number of friction-disks causes a stronger resistance (i.e., generates more friction) against the rotation of a wheel fork relative to a strut.

Additionally, as shown in FIG. 12A, the strut 1202 can include a retaining disk 1214. For example, as illustrated in FIG. 12A, the retaining disk 1214 engages the strut 1202 and the strut locking features 1206a and 1206b. Furthermore, as shown in FIG. 12A, the retaining disk 1214 is positioned under one or more friction-disks to prevent the friction-disks from moving downwards relative to the strut 1202. Indeed, in one or more embodiments, the retaining disk holds one or more friction-disks in a designated position.

Additionally, as illustrated in FIG. 12A, the strut 1202 also includes a bearing 1216. For example, as described in FIG. 11, a bearing can enable a wheel fork to rotate relative to the strut (i.e., rotate smoothly). For instance, as shown in FIG. 12A, the bearing 1216 is coupled to the strut 1202. Furthermore, as illustrated in FIG. 12A, the bearing 1216 contacts the inner wall of the wheel fork 1204 to enable the wheel fork 1204 to rotate relative to the strut 1202. Furthermore, in one or more embodiments, the bearing 1216 can include a fixed inner member and a rotating outer member that contacts the wheel fork. Additionally, a strut can include more than one bearing.

Moreover, in some embodiments, a moving component of the bearing can lock upon receiving a threshold weight (e.g., the weight of the UAV 100). Indeed, in one or more embodiments, the bearing can engage a strut friction-disk. Furthermore, the moving component of the bearing can lock when the friction-disks press together to generate friction. Indeed, in some embodiments, a bearing can reduce the movement of a wheel fork relative to a strut when the bearing locks from friction-disks pressing together.

Furthermore, as shown in FIG. 12A, the strut 1202 can include a spring element 1218. For example, as illustrated in FIG. 12A, the spring element 1218 is positioned between the strut 1202 and the wheel fork 1204. In one or more embodiments, the spring element 1218 can compress when the spring element 1218 receives enough force (i.e., the full weight of the UAV 100). Indeed, the spring element and the functionalities of the spring element are described in greater detail in FIG. 14.

Additionally, the UAV 100 can reduce the rotation of the wheel fork 1204 relative to the strut 1202 (e.g., the castering wheel) without utilizing conventional mechanical or power-driven components for reducing the rotational movement of a castering wheel in a landing gear system. In particular, the landing gear assembly 110 reduces the rotational movement of a castering wheel without utilizing power-driven and/or motorized components such as brakes that utilize hydraulic systems, electric components, or motors to reduce (or control) the rotational movement of a castering wheel. Indeed, by utilizing the weight-induced multi-disk braking system, the landing gear assembly 110 is able to reduce the movement of a castering wheel with less components and/or without adding additional weight to the UAV 100 compared to conventional landing gear systems.

As just mentioned, the landing gear assembly 110 can include a strut friction-disk that engages a strut. For example, FIG. 12B illustrates a strut friction-disk 1208 that is utilized in the multi-disk friction brake system illustrated in FIG. 12A. Indeed, as shown in FIG. 12B, the strut friction-disk 1208 is a circular disk that is hollow and is configured to engage a strut. Furthermore, as shown in FIG. 12B, the strut friction-disk 1208 includes one or more notches 1220. Indeed, referring to FIG. 12A, the one or more notches 1220 of the strut friction-disk 1208 engage the protruding strut locking features 1206a and 1206b.

As just mentioned, the landing gear assembly 110 can include a wheel fork friction-disk that engages a wheel fork. For example, FIG. 12C illustrates a wheel fork friction-disk 1212 that is utilized in the multi-disk friction brake system illustrated in FIG. 12A. Indeed, as shown in FIG. 12C, the wheel fork friction-disk 1212 is a circular disk that is hollow and is configured to engage a strut. Furthermore, as shown in FIG. 12C, the wheel fork friction-disk 1212 includes one or more protrusions 1222. Indeed, referring to FIG. 12A, the one or more protrusions 1222 of the wheel fork friction-disk 1212 engage the wheel fork locking features 1210a and 1210b by inserting into the wheel fork locking features 1210a and 1210b.

As just mentioned, the landing gear assembly 110 can include a retaining disk that engages a strut. For example, FIG. 12D illustrates a retaining disk 1214 that is utilized in the multi-disk friction brake system illustrated in FIG. 12A. Indeed, as shown in FIG. 12D, the retaining disk 1214 is a circular disk that is hollow and is configured to engage a strut and to hold one or more friction-disks in a designated position as described above.

Furthermore, FIGS. 12B-12D illustrate an exemplary set of friction-disks for the landing gear assembly 110. Indeed, the friction-disks can be configured in various ways. For example, the strut friction-disk 1208 can include protrusions that insert into notches on the strut 1202. Indeed, the strut friction disk 1208 can also slide vertically relative to the strut 1202 when the strut friction-disk 1208 is engaged to the strut 1202 by inserting protrusions of the strut friction-disk 1208 into notches of the strut 1202. Moreover, the wheel fork friction-disk 1212 can include notches that receive protrusions of the wheel fork 1204. Indeed, the wheel fork friction-disk 1212 can also slide vertically relative to the strut 1202 when the wheel fork friction-disk 1212 is engaged to the wheel fork 1204 by inserting protrusions of the wheel fork 1204 into notches of the wheel fork friction-disk 1212.

Figure 13A:
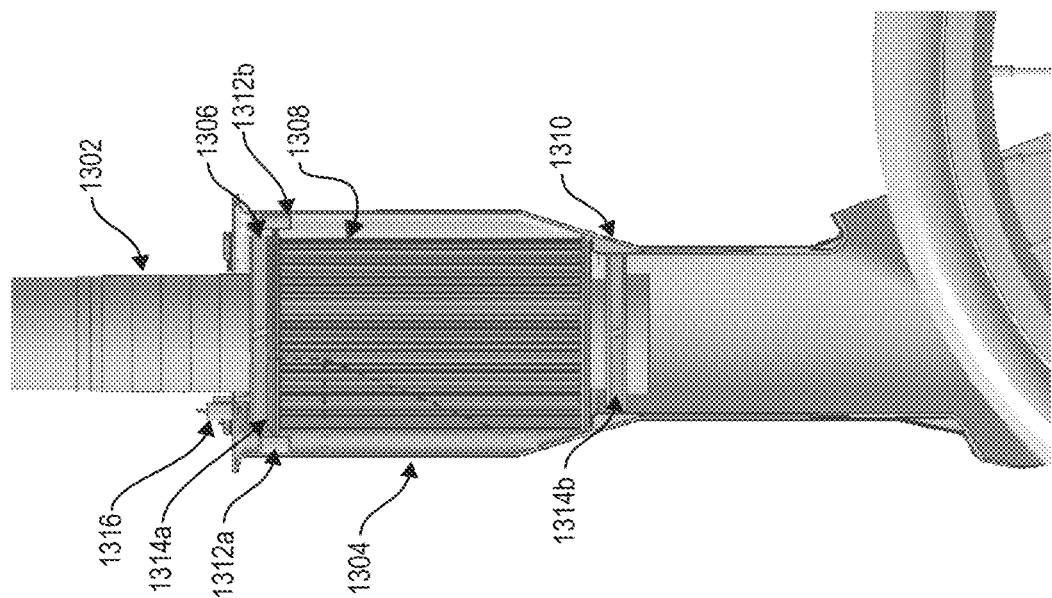
FIGS. 13A-13B illustrate an example multi-disk braking system of a landing gear assembly of a UAV including a compression member in accordance with one or more embodiments.
Figure 13B:
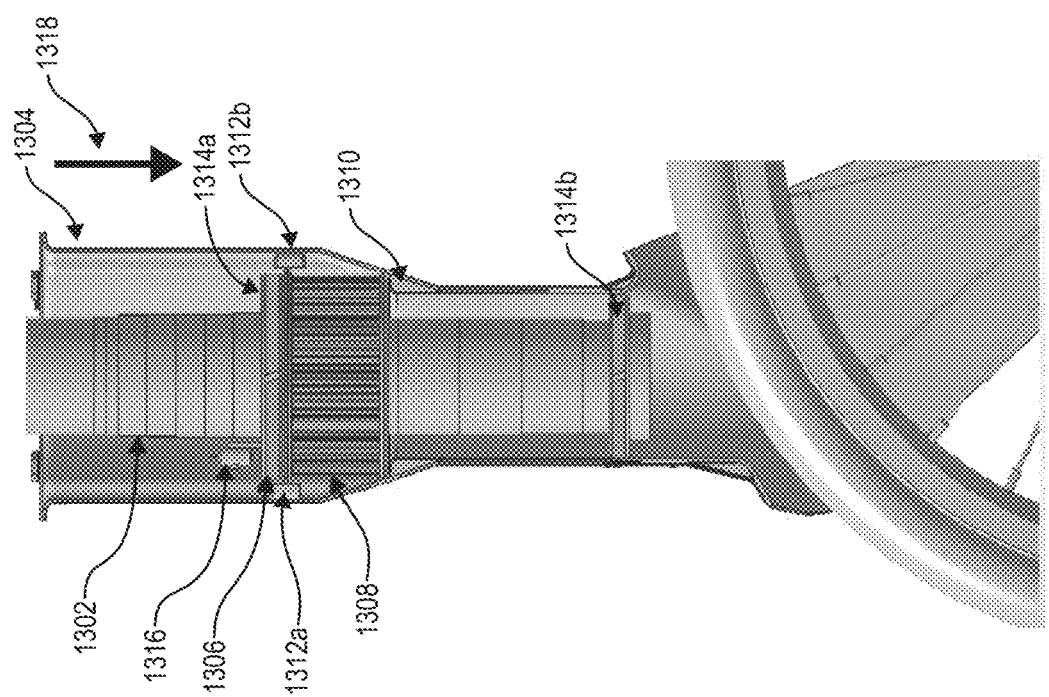

As just mentioned, the landing gear assembly 110 can include a compression member that compresses upon receiving a threshold weight. In particular, in one or more embodiments, the compression member compresses to contact friction-disks and cause the friction-disks to reduce rotational movement of a wheel fork relative to a strut. For example, FIGS. 13A and 13B illustrate the landing gear assembly 110 utilizing a compression member to activate a multi-disk friction brake in a castering wheel. In particular, FIG. 13A illustrates the landing gear assembly 110, which includes a compression member for the multi-disk friction brake (illustrated at a time before the compression member has been compressed by a threshold weight). Furthermore, FIG. 13B illustrates a compression member compressing within a landing gear assembly 110 to activate the multi-disk friction brake (illustrated at a time the compression member has been compressed by a threshold weight).

As just mentioned, FIG. 13A illustrates the landing gear assembly 110 including a compression member for the multi-disk friction brake at a time before the compression member has been compressed (e.g., before touching the ground). For example, as shown in FIG. 13A, the castering wheel of the landing gear assembly 110 includes a strut 1302, a wheel fork 1304, friction-disks 1306 (i.e., strut friction-disks and wheel fork friction-disks), a tapered wheel fork edge 1310, wheel fork locking features 1312a and 1312b, bearings 1314a and 1314b, and a weight-on-wheel sensor 1316. Indeed, the above-mentioned components provide functionalities of a castering wheel and a multi-disk brake in accordance with one or more embodiments. Furthermore, as illustrated in FIG. 13A, the landing gear assembly 110 includes compression member 1308.

Moreover, the landing gear assembly 110 can include a compression member between a strut and a wheel fork. For example, as shown in FIG. 13A, the compression member 1308 is positioned between the strut 1302 and the wheel fork 1304. Furthermore, as shown in FIG. 13A, the compression member 1308 is cylindrical (or circular) and encircles the strut 1302 (i.e., surrounds the strut 1302). Indeed, in one or more embodiments, the compression member 1308 is not coupled to either the strut 1302 or the wheel fork 1304. For example, the compression member 1308 can be placed between the wheel fork 1304 and the strut 1302 such that the compression member can freely move relative to the strut 1302. Additionally, as shown in FIG. 13A, the compression member 1308 is wider than the tapered wheel fork edge 1310 to retain the compression member 1308 within the wheel fork 1304.

Furthermore, the landing gear assembly 110 can include a compression member that remains in a non-compressed state when a below threshold weight is applied to the compression member. For example, as illustrated in FIG. 13A, the compression member 1308 remains in a non-compressed state when the wheel fork 1304 does not experience a threshold weight (i.e., when the UAV 100 is not on the ground). Furthermore, in one or more embodiments, the friction-disks 1306 do not receive pressure and do not generate an adequate amount of friction necessary to cause a significant reduction of movement in the wheel fork 1304 relative to the strut 1302. Indeed, the wheel fork 1304 can rotate relative to the strut 1302 when the compression member 1308 is in a non-compressed state.

As just mentioned, FIG. 13B illustrates the landing gear assembly 110 including a compression member for the multi-disk friction brake at a time after the compression member has been compressed due to a threshold weight (e.g., after receiving the weight of the UAV 100 on the landing gear assembly 110). For example, as illustrated in FIG. 13B, the landing gear assembly 110 can receive the threshold weight (e.g., the weight of the UAV 100) as a force 1318. Indeed, as shown in FIG. 13B, the threshold weight (e.g., the weight of the UAV 100) as a force 1318 can cause the compression member 1308 to press against the tapered wheel fork edge 1310 and the disks 1306 of the strut 1302 (i.e., a retaining disk and other friction-disks). Furthermore, upon pressing against the tapered wheel fork edge 1310 of the repositioned wheel fork 1304 and the disks 1306, the compression member 1308 compresses.

Additionally, a compression member of the landing gear assembly 110 can cause a wheel fork to move vertically relative to a strut upon compression. For example, as shown in FIG. 13B, the wheel fork 1304 moves upward relative to the strut 1302 by utilizing the sliding wheel fork lock features 1312a and 1312b when the compression member 1308 compresses. In one or more embodiments, the wheel fork 1304 moves vertically relative to the strut 1302 until the compression member 1308 is fully compressed.

Furthermore, a compression member can contact and activate a multi-disk friction brake upon compressing. For example, as shown in FIG. 13B, the compression member 1308, the friction-disks 1306, and the wheel fork 1304 all press against each other when the threshold weight (e.g., the weight of the UAV 100) is received. Furthermore, in one or more embodiments, the friction-disks 1306 press together when the compression member 1308 presses against the friction-disks 1306 from the threshold weight. Indeed, the compression member, when compressed, causes the friction-disks to reduce the rotational movement of the wheel fork 1304 relative to the strut 1302 (as described in the above figures).

Additionally, as shown in FIG. 13B, the strut 1302 remains stationary when a threshold weight (e.g., the weight of the UAV 100) is received by the landing gear assembly 110. For example, as shown in FIG. 13B, the wheel fork 1304 and compression member 1308 move relative to the strut 1302 when the landing gear assembly 110 receives the threshold weight. Moreover, as illustrated in FIG. 13B, the strut 1302 remains stationary and the bearings 1314a and 1314b remain the same distance apart before and after the threshold weight is applied to the landing gear assembly 110.

Furthermore, a compression member can cause a weight-on-wheel sensor (or ground-contact switch) to activate after compressing. For example, as illustrated in FIG. 13B, the movement of the wheel fork 1304 and the compression member 1308, upon receiving the force 1318 associated with the threshold weight, can activate the weight-on-wheel sensor 1316. Indeed, activating the weight-on-wheel sensor 1316 from the movement of the compression member 1308 and the wheel fork 1304 is described in greater detail in FIGS. 14A and 14B.

Figure 14A:
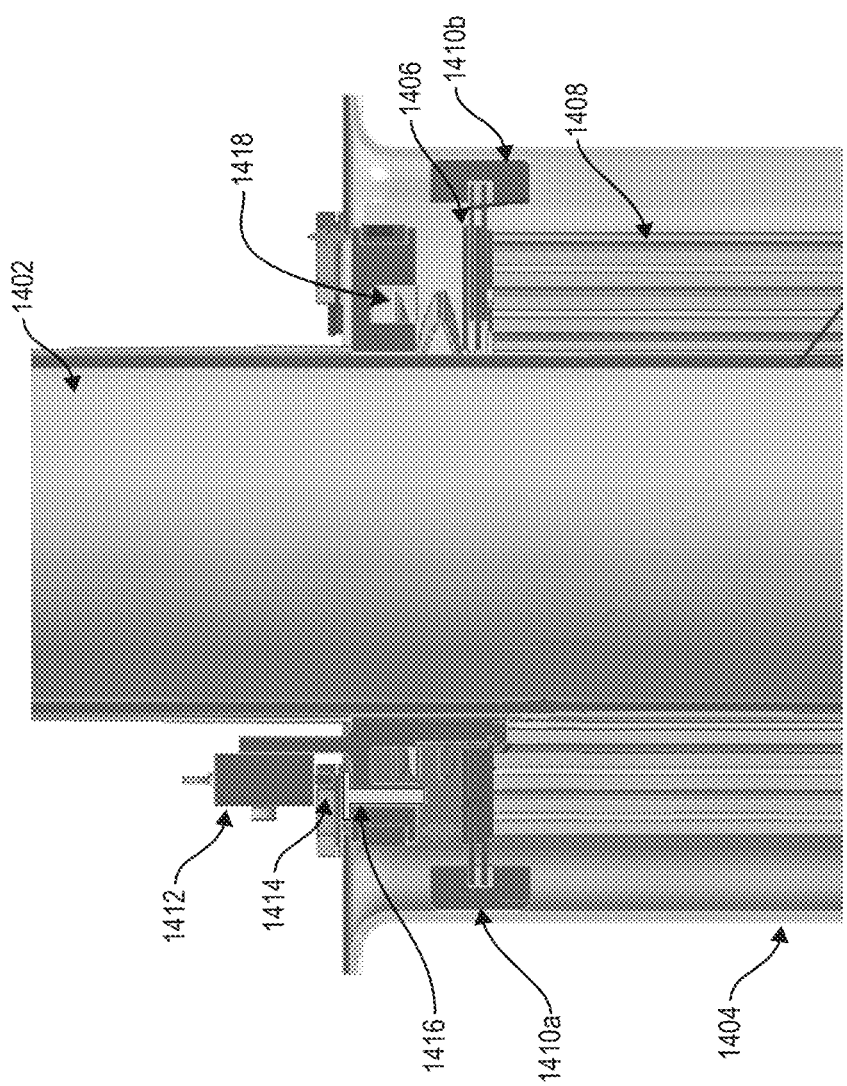
FIGS. 14A-14B illustrate an example landing gear assembly of a UAV including a weight-on-wheel sensor in accordance with one or more embodiments.
Figure 14B:
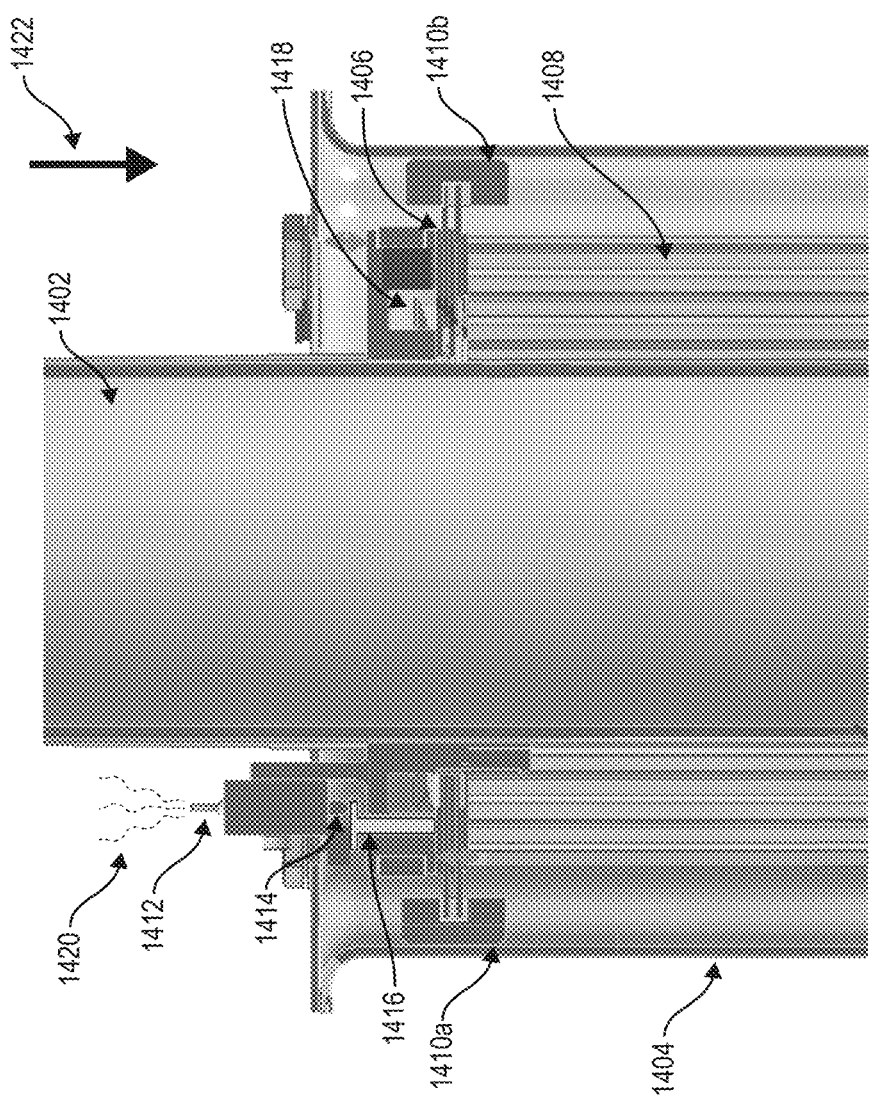

As just mentioned, the landing gear assembly 110 can include a weight-on-wheel sensor that activates when the landing gear assembly 110 receives a threshold weight (e.g., the weight of the UAV 100). For instance, FIGS. 14A and 14B illustrate a weight-on-wheel sensor that activates when the landing gear assembly 110 receives the threshold weight. In particular, FIG. 14A illustrates the landing gear assembly 110 including an inactive weight-on-wheel sensor at a time prior to receiving a threshold weight (e.g., before the UAV 100 touches the ground). Additionally, FIG. 14B illustrates an active weight-on-wheel sensor after receiving the threshold weight (e.g., after receiving the weight of the UAV 100 on the landing gear assembly 110).

As just mentioned, FIG. 14A illustrates the landing gear assembly 110 including an inactive weight-on-wheel sensor before receiving the threshold weight on the landing gear assembly 110. For example, as shown in FIG. 14A, the castering wheel of the landing gear assembly 110 includes a strut 1402, a wheel fork 1404, friction-disks 1406 (i.e., strut friction-disks and wheel fork friction-disks), a compression member 1408, and wheel fork locking features 1410a and 1410b. Indeed, the above-mentioned components provide functionalities of a castering wheel and a multi-disk brake for the castering wheel as described in above figures. Furthermore, as shown in FIG. 14A, the landing gear assembly 110 also includes weight-on-wheel sensor 1412, weight-on-wheel sensor button 1414, a weight-on-wheel sensor activation pin 1416, and a spring element 1418.

Specifically, as shown in FIG. 14A, the weight-on-wheel sensor 1412 is attached to a fixed portion of the strut 1402. Furthermore, as illustrated in FIG. 14A, the weight-on-wheel sensor 1412 attaches to the strut 1402 such that there is space between the friction-disks 1406 and the weight-on-wheel sensor 1412. Indeed, the space between the friction-disks 1406 and the weight-on-wheel sensor 1412 can be closed when the landing gear assembly 110 receives a threshold weight. Furthermore, as shown in FIG. 14A, the weight-on-wheel sensor 1412 includes a weight-on-wheel sensor button 1414 on the bottom side of the weight-on-wheel sensor 1412. For instance, the weight-on-wheel sensor button 1414 can be configured to contact components of the landing gear assembly 110 to activate the weight-on-wheel sensor when the landing gear assembly 110 receives the threshold weight.

Additionally, the landing gear assembly 110 can include a weight-on-wheel sensor activation pin. For example, as illustrated in FIG. 14A, a weight-on-wheel sensor activation pin 1416 is positioned on a fixed portion of the strut 1402. Furthermore, as illustrated in FIG. 14A, the weight-on-wheel sensor activation pin 1416 engages the fixed portion of the strut 1402 such that the activation pin 1416 is enabled to move vertically relative to the fixed portion of the strut 1402. Indeed, as shown in FIG. 14A, the activation pin 1416 is positioned between the friction-disks 1406 and the weight-on-wheel sensor button 1414.

Furthermore, the landing gear assembly 110 can include a spring element. For instance, as shown in FIG. 14A, the spring element 1418 is positioned between the friction-disks 1406 and a fixed portion of the strut 1402. In one or more embodiments, the spring element 1418 provides a protective barrier between the friction-disks 1406 and the activation pin 1416. Indeed, in some embodiments, the spring element 1418 is capable of compression when the spring element receives a force that is above a threshold force (i.e., the force of the weight of the UAV 100). In some embodiments, the threshold weight required to compress the spring element 1418 is different from the threshold weight required to compress the compression member 1408 (e.g., the spring element 1418 can require more or less weight to compress compared to the compression member 1408). By compressing only when the threshold weight is received by the spring element 1418, the spring element 1418 can prevent accidental movement of the activation pin 1416 and, therefore, accidental activation of the weight-on-wheel sensor 1412.

Additionally, the weight-on-wheel sensor can remain inactive when the landing gear assembly 110 does not receive the threshold weight. For example, as shown in FIG. 14A, the activation pin 1416 does not contact the weight-on-wheel sensor button 1414 when the compression member 1408 is not compressed and the friction-disks 1406 are not pressed upward due to the threshold weight. In one or more embodiments, the threshold weight can cause the activation pin 1416 to move upward and contact the weight-on-wheel sensor button 1414 to activate the weight-on-wheel sensor 1412.

As just mentioned, FIG. 14B illustrates the landing gear assembly 110 having an active weight-on-wheel sensor after receiving the threshold weight on the landing gear assembly 110. Specifically, as shown in FIG. 14B, the landing gear assembly 110 receives a force 1422 from the threshold weight and causes the activation pin 1416 to move upward to activate the weight-on-wheel sensor 1412. Additionally, as illustrated in FIG. 14B, the weight-on-wheel sensor 1412 can send a signal 1420 to the UAV 100 to initiate a roll stop mechanism.

In particular, a compression member of the landing gear assembly 110 can cause a weight-on-wheel sensor activation pin to move upward on a fixed portion of a strut. For example, as shown in FIG. 14B, the compression member 1408 receives a force 1422 from the threshold weight and compresses as described in FIG. 13. Additionally, as illustrated in FIG. 14B, compression of compression member 1408 also causes the wheel fork 1404 and the friction-disks 1406 to move upward by utilizing the wheel fork locking features 1410a and 1410b as described in FIG. 13. Indeed, as illustrated in FIG. 14B, the compression of the compression member 1408 closes the gap between the activation pin 1416 and the friction-disks 1406 to cause the activation pin 1416 to push upwards relative to the fixed portion of the strut 1402.

Furthermore, a weight-on-wheel sensor activation pin can contact a weight-on-wheel sensor button to activate the weight-on-wheel sensor. For example, as shown in FIG. 14B, the activation pin 1416 contacts the weight-on-wheel sensor button 1414 after the activation pin 416 is pushed upwards relative to the fixed portion of the strut 1402. Indeed, in one or more embodiments, the activation pin 1416 contacts the weight-on-wheel sensor button 1414 to activate the weight-on-wheel sensor 1412.

A weight-on-wheel sensor can activate and send a signal to the UAV 100 to initiate a roll stop mechanism. For example, as shown in FIG. 14B, the weight-on-wheel sensor 1412 activates after the activation pin 1416 contacts the weight-on-wheel sensor button 1414. Indeed, as illustrated in FIG. 14B, the weight-on-wheel sensor 1412 emits a signal 1420 to notify the UAV 100 to initiate a roll stop mechanism (i.e., notify the UAV 100 that the landing gear assembly 110 has landed). More specifically, in some embodiments, the weight-on-wheel sensor 1412 emits the signal 1420 to contact a computing device onboard the UAV 100 to initiate a roll stop mechanism for the UAV 100.

As described in relation to FIG. 10, the components of the landing gear assembly 110 can be arranged or positioned differently depending on the embodiment. For example, as shown in FIGS. 10 and 13A-14B, spring elements, compression members, and weight-on-wheel sensors can be placed in different locations depending on the embodiment.

As mentioned above, the landing gear assembly 110 can utilize castering wheels with a multi-disk friction brake to land the UAV 100. For example, FIGS. 15A-15C illustrate a landing sequence of the UAV 100 utilizing the landing gear assembly 110 including the castering wheels with a multi-disk friction brake. For instance, FIG. 15A illustrates the landing gear assembly 110 when the UAV 100 is airborne (e.g., on approach to a runway). Additionally, FIG. 15B illustrates the landing gear assembly 110 of the UAV 100 when the landing gear assembly 110 first contacts the ground. Moreover, FIG. 15C illustrates the landing gear assembly 110 of the UAV 100 when the landing gear assembly 110 contacts the ground and is loaded with the threshold weight (e.g., the weight of the UAV 100).

As just mentioned, the landing gear assembly 110 can include castering wheels that rotate relative to a strut of the landing gear assembly 110 when the UAV 100 is airborne. For example, FIG. 15A illustrates the landing gear assembly 110 when the UAV 100 is airborne. Furthermore, as shown in FIG. 15A, the landing gear assembly 110 includes a nose castering wheel 1502 and a rear castering wheel 1504. As shown in FIG. 15A, the nose castering wheel 1502 can rotate as indicated by rotational direction 1506 relative to the strut when the nose castering wheel 1502 is not on the ground 1510. Furthermore, as illustrated in FIG. 15A, the rear castering wheel 1504 can rotate as indicated by rotational direction 1508 relative to the strut when the rear castering wheel 1504 is not on the ground 1510. Indeed, in one or more embodiments, the castering wheels 1502 and 1504 can rotate to face the direction of air movement while the UAV 100 is airborne due to air passing the castering wheels 1502 and 1504.

As just mentioned, the castering wheels can rotate to align to the direction of movement relative to the ground upon first contacting the ground. For example, FIG. 15B illustrates the landing gear assembly 110 when the UAV first contacts the ground.

As shown, the nose castering wheel 1502 contacts the ground 1510 and is still capable of rotating in the direction 1506. Furthermore, as shown in FIG. 15B, the rear castering wheel 1504 contacts the ground 1510 and is still capable of rotating in the direction 1508. Indeed, in one or more embodiments, the castering wheels 1502 and 1504 rotate relative in directions 1506 and 1508 upon contacting the ground to align to the direction of movement of the UAV 100 (as described in greater detail in FIGS. 16 and 17A-17C).

Furthermore, in some embodiments, the landing gear assembly 110 is configured to enable the rear castering wheel to contact the ground before the nose castering wheel contacts the ground. For example, in some embodiments, the rear castering wheel contacts the ground and rotates to align prior to the nose castering wheel contacting the ground. Indeed, in one or more embodiments, the rear castering wheel can lock rotational movement prior to the nose castering wheel.

In one or more embodiments, the castering wheels continue to have rotational movement relative to struts of the landing gear assembly 110 upon contacting the ground because the landing gear assembly 110 has not received a threshold weight (e.g., a significant portion of the weight of the UAV 100). For example, the castering wheels can contact the ground while the UAV 100 is still experiencing some lift from under the wings of the UAV 100. Additionally, the UAV 100 can still be gliding when the castering wheels contact the ground 1510. Indeed, in relation to FIG. 15B, the weight-induced multi-disk friction brakes do not activate until the landing gear assembly 110 receives the threshold weight.

As just mentioned, the landing gear assembly 110 can include a weight-induced multi-disk friction braking system within the castering wheels that reduces the rotation of the castering wheels upon receiving the threshold weight when the UAV 100 is on the ground. For example, FIG. 15C illustrates the landing gear assembly 110 receiving the threshold weight when the UAV 100 is on the ground 1510. Furthermore, as shown in FIG. 15C, the nose castering wheel 1502 and the rear castering wheel 1504 are limited in rotational movement (or prohibited from rotational movement) relative to the struts of the landing gear assembly 110 when the landing gear assembly 110 receives the threshold weight. Indeed, in one or more embodiments, the castering wheels 1502 and 1504 include weight-induced multi-disk brakes within the castering wheels 1502 and 1504 to reduce the rotation of the castering wheels 1502 and 1504 as described in the above figures. For example, the rotational movement of the castering wheels 1502 and 1504 are reduced and/or prevented when the weight-induced multi-disk brakes within the castering wheels 1502 and 1504 receive the threshold weight as described in the above figures.

As just mentioned, the landing gear assembly 110 can assist in landing the UAV 100 when the UAV 100 is not aligned to the direction of the runway. For example, FIGS. 16A-16D illustrate the UAV 100 landing (e.g., during a cross-wind 1604) such that the UAV 100 is not aligned to the runway (e.g., the direction of movement 1608 of the UAV 100 is different from a direction of a longitudinal axis 1610 of the UAV 100).

Figures 16B, 16C, 16D:
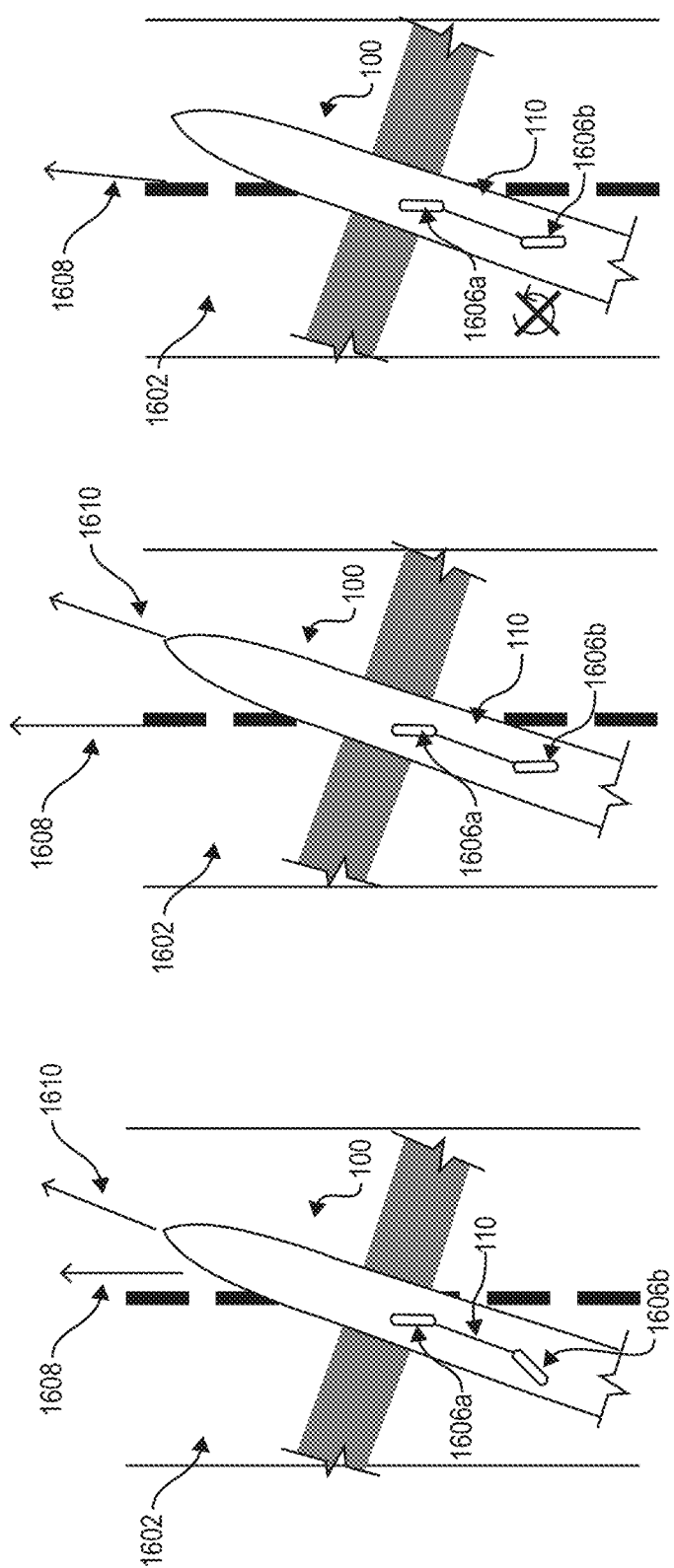

As just mentioned, the landing gear assembly 110 can include castering wheels that rotate while the UAV is airborne. For example, FIG. 16B illustrates a top view of one landing gear assembly 110 for the UAV 100 while the UAV 100 is airborne and the landing gear assembly 110 is not in contact with the ground. As shown in FIG. 16B, the castering wheels 1606a and 1606b can rotate according to the figures described above.

As shown in FIG. 16C, the castering wheels 1606a and 1606b can rotate relative to struts of the landing gear assembly 110 when the castering wheels 1606a and 1606b contact the runway 1602 to align to the direction of movement of the UAV 100 relative to the runway (e.g., align to the runway).

Moreover, as just mentioned, the landing gear assembly 110 can reduce the rotation of the castering wheels relative to the struts of the landing gear assembly 110 when the UAV 100 is on the ground. For example, FIG. 16D illustrates the castering wheels of the landing gear assembly 110 after the landing gear assembly 110 receives the threshold weight. The castering wheels 1606a and 1606b are prevented from rotating and/or significantly limited in rotational movement to keep the UAV 100 in the movement of direction of the UAV 1608. Indeed, in one or more embodiments, the landing gear assembly 110 utilizes weight-induced multi-disk friction brakes to reduce the rotational mobility of the castering wheels 1606a and 1606b when the landing gear assembly 110 receives the threshold weight as described in various figures above.

Figure 17B:
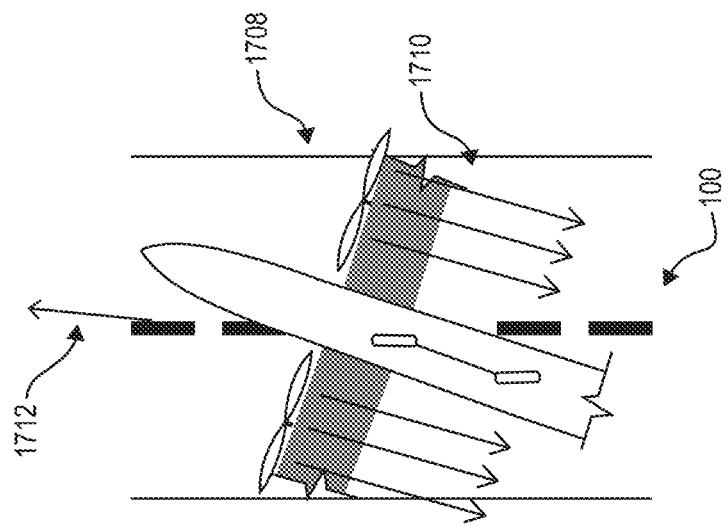
FIGS. 17A-17B illustrate an example landing gear assembly of a UAV utilizing a weight-on-wheel sensor to initiate a roll stop mechanism in accordance with one or more embodiments.
Figure 17A:
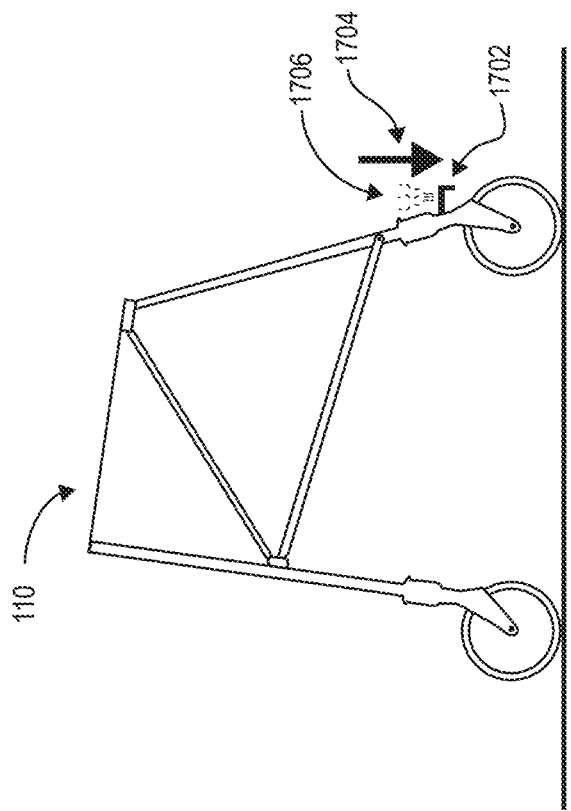

Furthermore, as just mentioned, the landing gear assembly 110 can detect that the UAV 100 has landed and can signal the UAV 100 to initiate a roll stop mechanism. For example, FIGS. 17A-17B illustrate the landing gear assembly 110 utilizing a weight-on-wheel sensor to detect that the UAV 100 has landed and send a signal to the UAV to initiate a roll stop mechanism. For instance, FIG. 17A illustrates the landing gear assembly receiving a threshold weight (e.g., the weight of the UAV 100) and sending a signal to the UAV 100. Furthermore, FIG. 17B illustrates the UAV 100 initiating a roll stop mechanism after receiving a signal from the weight-on-wheel sensor.

As just mentioned, the landing gear assembly 110 can utilize a weight-on-wheel sensor to detect that the UAV 100 has landed. For example, as shown in FIG. 17A, the landing gear assembly 110 includes a weight-on-wheel sensor 1702. Furthermore, the landing gear assembly 110 receives a force 1704 from the threshold weight upon contacting the ground to activate the weight-on-wheel sensor 1702. Indeed, the weight-on-wheel sensor 1702 can function in accordance with FIGS. 14A-14B. For instance, after the landing gear assembly 110 receives the force 1704, the components of the landing gear assembly 110 (as described in FIGS. 14A-14B) cause the weight-on-wheel sensor 1702 to activate. Furthermore, as shown in FIG. 17A, the weight-on-wheel sensor 1702 can emit a signal 1706 to the UAV to initiate a roll stop mechanism when the weight-on-wheel sensor is activated (as described in FIGS. 14A-14B).

Furthermore, as just mentioned, the UAV 100 can initiate a roll stop mechanism after a weight-on-wheel sensor sends a signal to the UAV 100. For example, FIG. 17B illustrates an exemplary roll stop mechanism for the UAV 100. For instance, as described above, in one or more embodiments, the UAV 100 can operate the propellers of the UAV 100 in reverse to slow down the UAV 100 upon landing. Indeed, as shown in FIG. 17B, the UAV 100 operates the propellers 1708 in reverse to provide a counteracting force 1710 to the momentum of the UAV in direction 1712. In one or more embodiments, the UAV 100 rolls to a stop after the roll stop mechanism counteracts the momentum of the UAV in direction 1712. Indeed, the landing gear assembly 110 can utilize a weight-on-wheel sensor cause the UAV 100 to stop after landing without utilizing braking components such as hydraulic brakes, motorized brakes, or conventional disk brakes to slow down the UAV 100.

Figure 18:
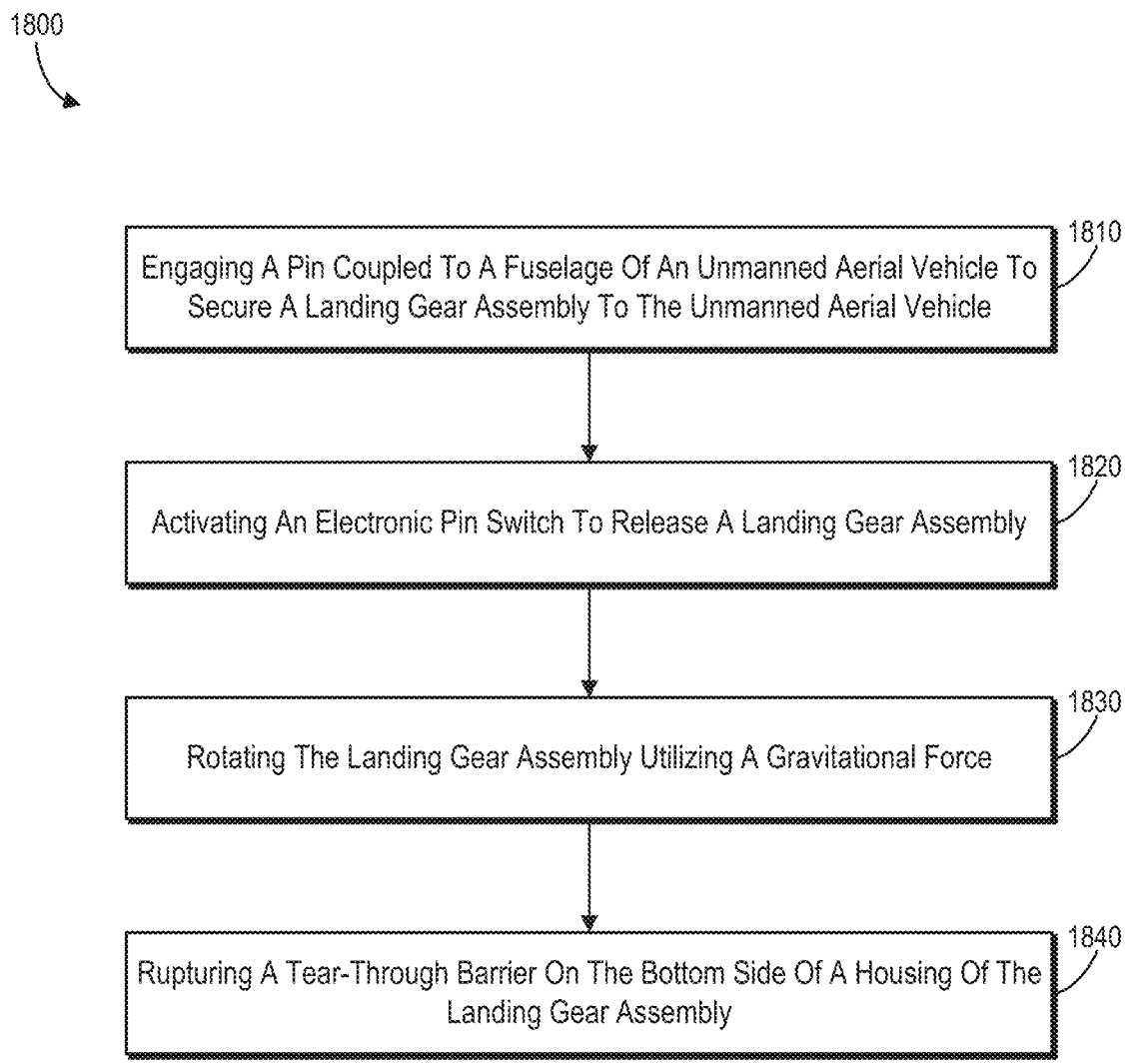
FIG. 18 illustrates a flowchart of a series of acts for deploying a landing gear assembly for an unmanned aerial vehicle in accordance with one or more embodiments.
Figure 19:
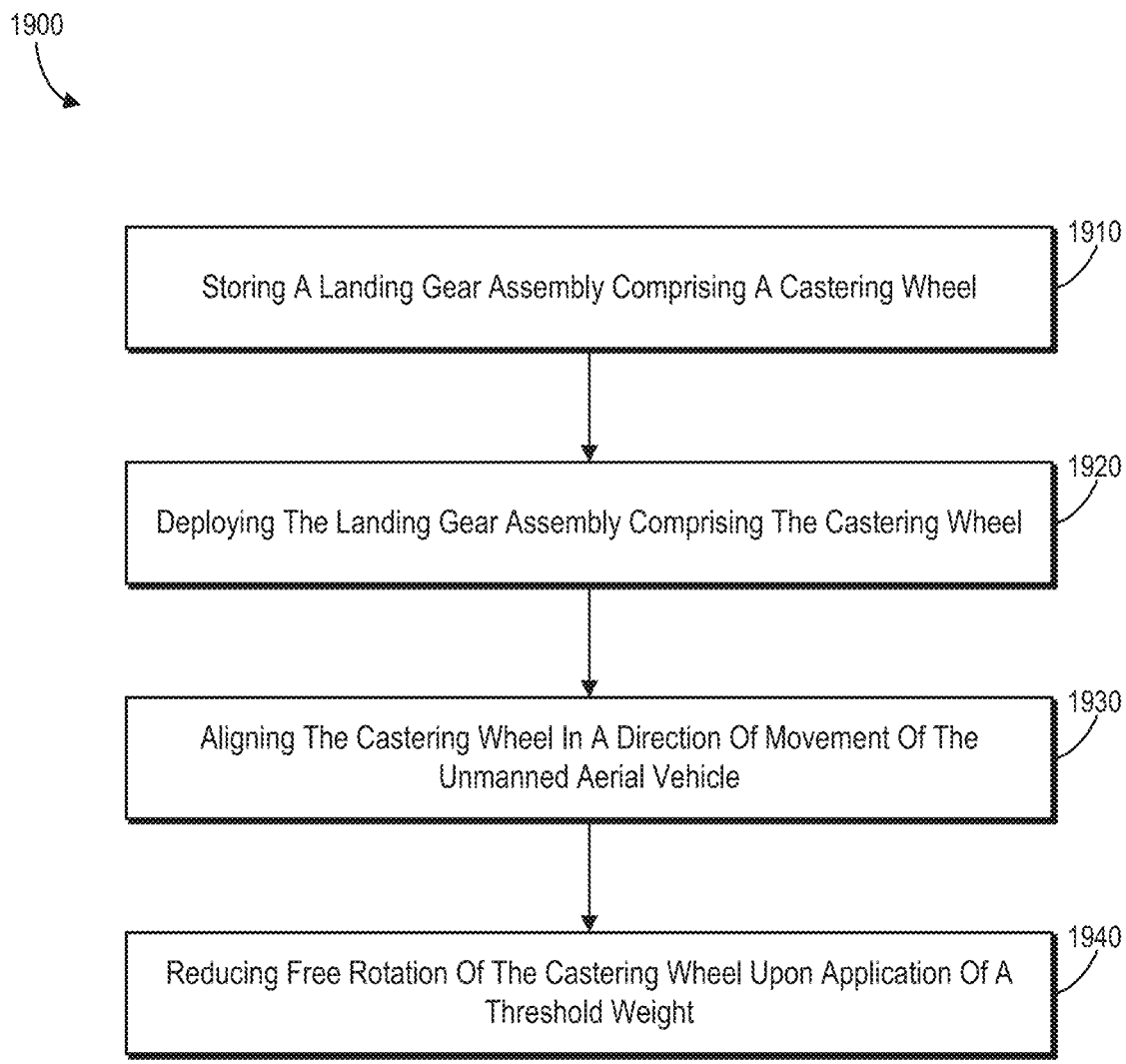
FIG. 19 illustrates a flowchart of a series of acts for landing unmanned aerial vehicles in accordance with one or more embodiments.
Figure 20:
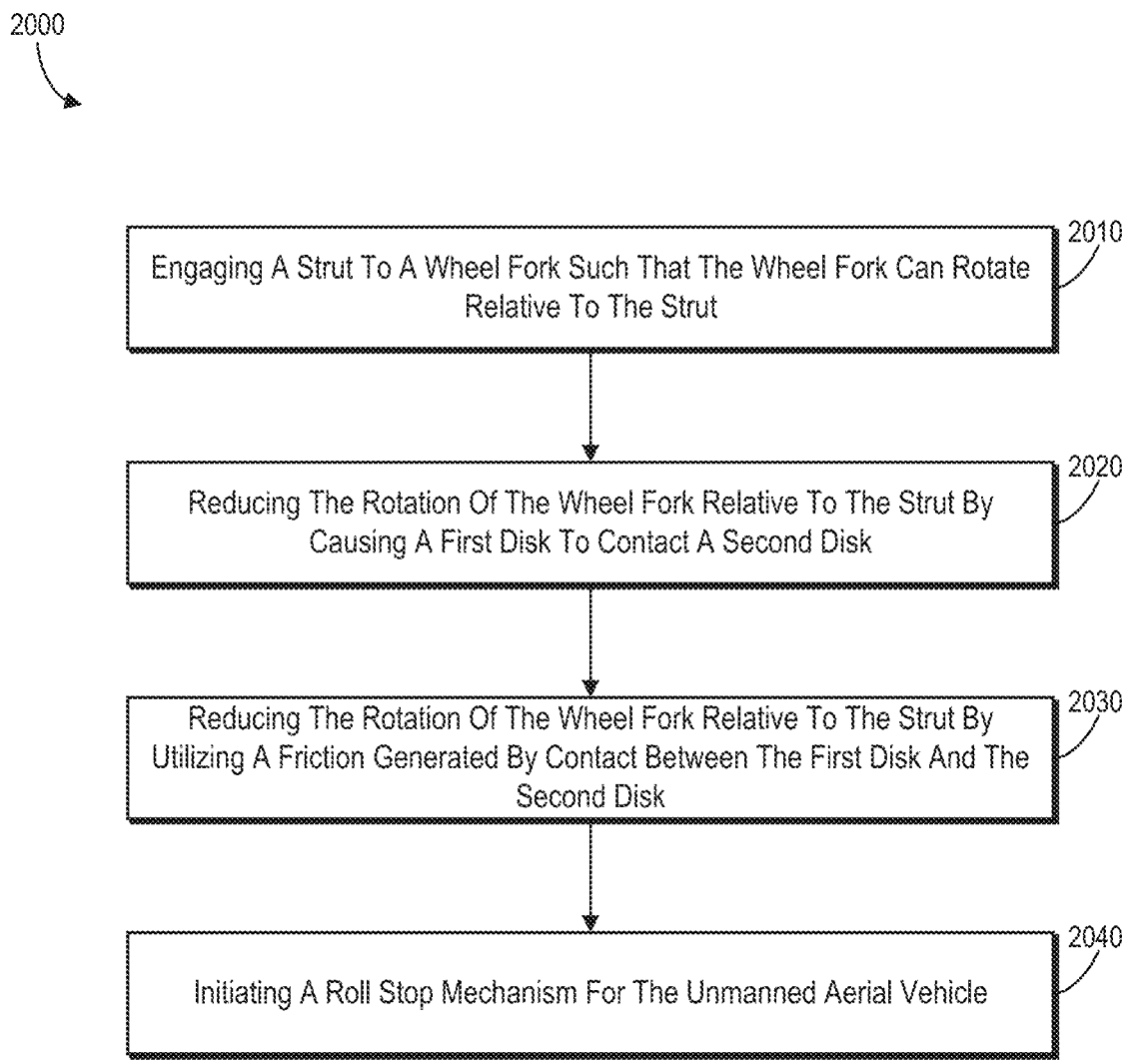
FIG. 20 illustrates a flowchart of a series of acts for utilizing a weight-induced rotational braking device for a castering wheel in accordance with one or more embodiments.

FIGS. 1-17, the corresponding text, and the examples provide a number of different methods, UAV embodiments, and landing gear systems. In addition to the foregoing, one or more embodiments can also be described in terms of flowcharts comprising acts for accomplishing a particular result, as shown in FIGS. 18-20. FIGS. 18-20 may be performed with more or fewer acts. Further, the acts may be performed in differing orders. Additionally, the acts described herein may be repeated or performed in parallel with one another or parallel with different instances of the same or similar acts.

As mentioned, FIG. 18 illustrates a flowchart of a series of acts 1800 for deploying a landing gear assembly for an unmanned aerial vehicle in accordance with one or more embodiments. While FIG. 18 illustrates acts according to one embodiment, alternative embodiments may omit, add to, reorder, and/or modify any of the acts shown in FIG. 18. The acts of FIG. 18 can be performed as part of a method. Alternatively, a UAV can comprise components to cause the UAV to perform the acts of FIG. 18. In some embodiments, a landing gear system can perform the acts of FIG. 18.

As shown in FIG. 18, the series of acts 1800 includes an act 1810 for engaging a pin coupled to a fuselage of an unmanned aerial vehicle to secure a landing gear assembly to the unmanned aerial vehicle. In particular, the act 1810 can include engaging a pin coupled to a fuselage of an unmanned aerial vehicle such that the pin secures (or engages) a first end portion of a structural member of a landing gear assembly within a main housing of the unmanned aerial vehicle. Furthermore, the act 1810 can include engaging a wheel stop coupled to the fuselage such that the wheel stop secures at least one wheel coupled to a rotating second end of the structural member to cause the at least one wheel to remain in a horizontal position within the main housing prior to deploying the landing gear.

As shown in FIG. 18, the series of acts 1800 includes an act 1820 for activating an electronic pin switch to release a landing gear assembly. In particular, the act 1820 can include, in response to determining that the unmanned aerial vehicle is landing, deploying the landing gear assembly by activating the electronic pin switch connected to the pin to release the first end of the structural member from the pin.

As shown in FIG. 18, the series of acts 1800 includes an act 1830 for rotating the landing gear assembly utilizing a gravitational force. In particular, the act 1830 can include, upon releasing the first end of the structural member from the pin, rotating the first end of the structural member downward utilizing the gravitational force.

Moreover, the act 1830 can include utilizing at least one dampener coupled to the structural member. In particular, the act 1830 can include utilizing the at least one dampener coupled to the structural member to rotate the first end of the structural member downward utilizing the gravitational force at a reduced acceleration. Furthermore, the act 1830 can include utilizing the at least one dampener coupled to the structural member to limit the rotation of the first end of the structural member downward utilizing the gravitational force to a threshold velocity. Moreover, the at least one dampener can include a hydraulic brake.

Additionally, the act 1830 can include causing a second end portion of the structural member of the gravity fed landing assembly to pivot away from the fuselage to the position outside the housing when the electronic pin switch (connected to the at least one pin) disengages the at least one pin from the structural member of the gravity fed landing gear assembly (when the first end portion of the structural member is coupled to the hinge). Moreover, the act 1830 can include disengaging the at least one pin from the structural member to cause the second end portion of the structural member to pivot downwards from the housing to the position outside the housing by utilizing a gravitational force.

As shown in FIG. 18, the series of acts 1800 includes an act 1840 for rupturing a tear-through barrier on a bottom side of a housing of the landing gear assembly. In particular, the act 1840 can include utilizing the rotating structural member to rupture the tear-through barrier on the bottom side of the main housing to deploy the landing gear assembly. Furthermore, the act 1840 can include the main housing of the unmanned aerial vehicle having the tear-through barrier on the bottom side of the main housing. Additionally, the tear-through barrier can comprise a resealable material.

Additionally, the act 1840 can include causing the second end portion of the structural member of the gravity fed landing gear assembly to pivot away from the fuselage (when the first end portion of the structural member is coupled to the hinge) to the position outside the housing and the gravity fed landing gear assembly to puncture the tear-through barrier on the bottom side of the housing. Furthermore, the act 1840 can include the gravity fed landing gear assembly puncturing (or protruding through) the tear-through barrier on the bottom side of the housing utilizing a gravitational force.

As mentioned, FIG. 19 illustrates a flowchart of a series of acts 1900 for landing unmanned aerial vehicles in accordance with one or more embodiments. While FIG. 19 illustrates acts according to one embodiment, alternative embodiments may omit, add to, reorder, and/or modify any of the acts shown in FIG. 19. The acts of FIG. 19 can be performed as part of a method. Alternatively, a UAV can comprise components to cause the UAV to perform the acts of FIG. 19. In some embodiments, a landing gear system can perform the acts of FIG. 19.

As shown in FIG. 19, the series of acts 1900 includes an act 1910 of storing a landing gear assembly comprising a castering wheel. In particular, the act 1910 can include storing, within a housing of an unmanned aerial vehicle during a flight mission, the landing gear assembly comprising the castering wheel by prohibiting rotation of the castering wheel.

As shown in FIG. 19, the series of acts 1900 includes an act 1920 of deploying the landing gear assembly comprising the castering wheel. In particular, the act 1920 can include deploying the landing gear assembly comprising the castering wheel while landing the unmanned aerial vehicle, such that the castering wheel is free to rotate. Additionally, the act 1920 can include the self-deploying, gravity fed landing gear puncturing the tear-through barrier when the self-deploying, gravity fed landing gear deploys. Furthermore, the act 1920 can include deploying the landing gear assembly by puncturing the tear-through barrier on the bottom of the housing (or the fuselage) by utilizing a gravitational force.

As shown in FIG. 19, the series of acts 1900 includes an act 1930 of aligning the castering wheel in a direction of movement of the unmanned aerial vehicle. In particular, the act 1930 can include, upon contacting a ground, aligning the castering wheel in the direction of movement of the unmanned aerial vehicle. Moreover, the direction of movement of the unmanned aerial vehicle can be different form a direction of a longitudinal axis of the unmanned aerial vehicle.

As shown in FIG. 19, the series of acts 1900 includes an act 1940 of reducing free rotation of the castering wheel upon application of a threshold weight. In particular, the act 1940 can include, upon application of a threshold weight to the castering wheel, reducing the free rotation of the castering wheel by utilizing a weight of the unmanned aerial vehicle to activate friction-disks positioned inside a rotational component of the castering wheels.

Additionally, the act 1940 can include initiating a roll stop mechanism upon application of a threshold weight to the castering wheel. Moreover, the act 1940 can include initiating the roll stop mechanism by sending a signal to the unmanned aerial vehicle upon application of the threshold weight to the castering wheel. Furthermore, the act 1940 can include utilizing a weight-on-wheel sensor to detect the application of the threshold weight to the castering wheel to prevent accidental initiation of the roll stop mechanism prior to the unmanned aerial vehicle contacting the ground. Additionally, the act 1940 can include initiating the roll stop mechanism by causing the unmanned aerial vehicle to operate the at least one propeller of the unmanned aerial vehicle in reverse to reduce a velocity of the unmanned aerial vehicle.

As mentioned, FIG. 20 illustrates a flowchart of a series of acts 2000 for providing a weight-induced rotational braking device for a castering wheel in accordance with one or more embodiments. While FIG. 20 illustrates acts according to one embodiment, alternative embodiments may omit, add to, reorder, and/or modify any of the acts shown in FIG. 20. The acts of FIG. 20 can be performed as part of a method. Alternatively, a UAV can comprise components to cause the UAV to perform the acts of FIG. 20. In some embodiments, a landing gear system can perform the acts of FIG. 20.

As shown in FIG. 20, the series of acts 2000 includes an act 2010 of engaging a strut to a wheel fork such that the wheel fork can rotate relative to the strut. In particular, the act 2010 can include engaging a strut coupled to a first disk to a wheel fork coupled to a second disk such that the wheel fork can rotate relative to the strut.

As shown in FIG. 20, the series of acts 2000 includes an act 2020 of reducing the rotation of the wheel fork relative to the strut by causing a first disk to contact a second disk. In particular, the act 2020 can include, in response to the wheel fork receiving a force at or above a threshold weight, reducing the rotation of the wheel fork relative to the strut by causing the first disk to contact the second disk. Furthermore, the act 2020 can include, in response to the wheel fork receiving the force at or above the threshold weight, compressing a compression member (sometimes a circular compression member) between the portion of the wheel fork and the portion of the strut to cause the first disk to contact the second disk. Moreover, the act 2020 can include the compression member compressing to cause the wheel fork to vertically move relative to the strut to cause the first disk to contact the second disk. Additionally, the wheel fork can receive the force at or above the threshold weight when the unmanned aerial vehicle contacts a ground. Furthermore, the act 2020 can include the compression member compressing, when the compression member receives the force at or above the threshold weight, to cause the plurality of first disks to contact the plurality of second disks to reduce rotation of the wheel fork relative to the strut.

As shown in FIG. 20, the series of acts 2000 includes an act 2030 of reducing the rotation of the wheel fork relative to the strut by utilizing a friction generated by contact between the first disk and the second disk. In particular, the act 2030 can include, in response to the wheel fork receiving the force at or above the threshold weight, reducing the rotation of the wheel fork relative to the strut by utilizing the friction generated by the contact between the first disk and the second disk to reduce mobility of the wheel fork to rotate relative to the strut. Furthermore, the act 2030 can include compressing a compression member (sometimes a circular compression member) between the portion of the wheel fork and the portion of the strut to cause the first disk to contact the second disk to generate friction between the first disk and the second disk to reduce the rotation of the wheel fork relative to the strut. Additionally, the act 2030 can include the first disk and the second disk generating friction when the first disk contacts the second disk to reduce the rotation of the wheel fork relative to the strut. Moreover, the act 2030 can include the compressing the compression member, when the compression member receives the force at or above the threshold weight, to cause the plurality of first disks to contact the plurality of second disks to increase an amount of friction to reduce rotation of the wheel fork relative to the strut.

As shown in FIG. 20, the series of acts 2000 includes an act 2040 of initiating a roll stop mechanism for the unmanned aerial vehicle. In particular, the act 2040 can include initiating the roll stop mechanism for the unmanned aerial vehicle in response to the wheel fork receiving the force at or above the threshold weight. Moreover, the act 2040 can include initiating the roll stop mechanism for the unmanned aerial vehicle after receiving the signal from the weight-on-wheel sensor positioned on the strut.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. An unmanned aerial vehicle, comprising:
    a fuselage coupled to a wing assembly;
    a self-deploying, gravity fed landing gear assembly coupled to the fuselage, the landing gear assembly comprising at least one castering wheel positioned at a first end of the landing gear assembly, the at least one castering wheel configured to:
        freely rotate during landing when the landing gear assembly receives a force below a threshold weight;
        rotate to align in a direction of movement of the unmanned aerial vehicle upon contacting a ground; and
        reduce free rotation of the at least one cantering wheel when the landing gear assembly receives a force at or above the threshold weight; and
    a tear-through barrier at a bottom of the fuselage, wherein the self-deploying, gravity fed landing gear assembly punctures the tear-through barrier when the self-deploying, gravity fed landing assembly deploys.

2. The unmanned aerial vehicle of claim 1, wherein the direction of movement of the unmanned aerial vehicle is different from a direction of a longitudinal axis of the unmanned aerial vehicle.

3. The unmanned aerial vehicle of claim 1, further comprising a weight-on-wheel sensor coupled to the landing gear assembly, the weight-on-wheel sensor configured to initiate a roll stop mechanism when the landing gear assembly receives the force at or above the threshold weight.

4. The unmanned aerial vehicle of claim 3, wherein the weight-on-wheel sensor is configured to initiate the roll stop mechanism by causing the unmanned aerial vehicle to operate at least one propeller, coupled to the wing assembly, in reverse.

5. The unmanned aerial vehicle of claim 3, wherein the weight-on-wheel sensor prevents accidental initiation of the roll stop mechanism prior to the unmanned aerial vehicle contacting the ground.

6. The unmanned aerial vehicle of claim 1, wherein at least one castering wheel is configured to reduce free rotation of the at least one castering wheel when the landing gear assembly receives the force at or above the threshold weight by utilizing at least one friction-disk positioned inside a rotation component of the at least one castering wheel.

7. An unmanned aerial vehicle landing system for an unmanned aerial vehicle, comprising:
    a housing having a cavity for storing a landing gear assembly during flight;
    a structural member of the landing gear assembly, the structural member having a first end portion coupled to the housing and a second end portion;
    a castering wheel coupled to the second end portion of the structural member, the castering wheel configured to:
        remain stationary in flight when within the cavity of the housing;
        freely rotate during landing when the landing gear assembly receives a force below a threshold weight; and
        rotate to align in a direction of movement of the unmanned aerial vehicle upon contacting a ground; and
    wherein the castering wheel comprises at least one friction-disk coupled to the second end portion of the landing gear assembly, wherein the at least one friction-disk is configured to reduce free rotation of the castering wheel when the landing gear assembly receives a force at or above the threshold weight.

8. The unmanned aerial vehicle system of claim 7, wherein, upon contacting the ground, the direction of movement of the unmanned aerial vehicle is different from a direction of a longitudinal axis of the unmanned aerial vehicle.

9. The unmanned aerial vehicle system of claim 8, further comprising a weight-on-wheel sensor coupled to the second end portion of the structural member, the weight-on-wheel sensor configured to initiate a roll stop mechanism when the landing gear assembly receives the force at or above the threshold weight.

10. The unmanned aerial vehicle system of claim 9, wherein the weight-on-wheel sensor is configured to initiate the roll stop mechanism by causing the unmanned aerial vehicle to operate at least one propeller, coupled to the unmanned aerial vehicle, in reverse.

11. The unmanned aerial vehicle system of claim 9, wherein the weight-on-wheel sensor prevents accidental initiation of the roll stop mechanism prior to the unmanned aerial vehicle contacting the ground.

12. The unmanned aerial vehicle system of claim 8, further comprising a tear-through barrier at the bottom of the housing, wherein the landing gear assembly punctures the to barrier when the landing gear assembly deploys from the unmanned aerial vehicle.

13. A method for landing unmanned aerial vehicles, the method comprising:
storing, within a housing of an unmanned aerial vehicle during a flight mission, a landing gear assembly comprising a castering wheel by prohibiting rotation of the castering wheel;
deploying the landing gear assembly comprising the castering wheel while landing the unmanned aerial vehicle, such that the castering wheel is free to rotate;
upon contacting a ground, aligning the castering wheel in a direction of movement of the unmanned aerial vehicle; and
upon application of a threshold weight to the castering wheel, reducing the free rotation of the castering wheel by utilizing a weight of the unmanned aerial vehicle to activate friction-disks positioned inside a rotational component of the castering wheel.

14. The method of claim 13, wherein, upon contacting the ground, the direction of movement of the unmanned aerial vehicle is different from a direction of a longitudinal axis of the unmanned aerial vehicle.

15. The method of claim 13, further comprising initiating a roll stop mechanism by sending a signal to the unmanned aerial vehicle upon application of a threshold weight to the castering wheel.

16. The method of claim 15, wherein initiating the roll stop mechanism comprises causing the unmanned aerial vehicle to operate at least one propeller of the unmanned aerial vehicle in reverse to reduce a velocity of the unmanned aerial vehicle.

17. The method of claim 16, further comprising utilizing a weight-on-wheel sensor to detect the application of the threshold weight to the castering wheel to prevent accidental initiation of the roll stop mechanism prior to the unmanned aerial vehicle contacting the ground.

18. The method of claim 15, further comprising deploying the landing gear assembly by puncturing a tear-through barrier on the bottom of the housing by utilizing a gravitational force.

* * * * *